US012426763B2

(12) United States Patent
Rideout

(10) Patent No.: US 12,426,763 B2
(45) **Date of Patent: *Sep. 30, 2025**

(54) DECK CLEANING TOOL

(71) Applicant: Leif William Rideout, Beaverton, OR (US)

(72) Inventor: Leif William Rideout, Beaverton, OR (US)

( * ) Notice: Subject to any disclaimer, the term of this patent is extended or adjusted under 35 U.S.C. 154(b) by 123 days.

This patent is subject to a terminal disclaimer.

(21) Appl. No.: 17/869,753

(22) Filed: Jul. 20, 2022

(65) Prior Publication Data

US 2023/0372979 A1 Nov. 23, 2023

Related U.S. Application Data

(63) Continuation of application No. 17/750,327, filed on May 21, 2022, now abandoned.

(51) Int. Cl.

| | |
|---|---|
| ***A47L 13/08*** | (2006.01) |
| ***A47L 9/06*** | (2006.01) |
| ***B08B 1/16*** | (2024.01) |
| ***B08B 5/04*** | (2006.01) |

(52) U.S. Cl.

CPC ............. *A47L 13/08* (2013.01); *A47L 9/0673* (2013.01); *B08B 1/165* (2024.01); *B08B 5/04* (2013.01)

(58) Field of Classification Search

CPC ... B08B 1/005; B08B 5/04; A47L 9/02; A47L 13/08; A47L 13/02; A47L 9/06; A47L 9/0673; A47L 9/0693; A47L 9/066; A47L 9/0666; A47L 9/08; E01H 2001/1293; E01H 11/00; A01G 3/06

USPC .... 15/104.001, 236.01, 236.07, 236.09, 400, 15/401, 144.1–144.2; 30/169

See application file for complete search history.

(56) References Cited

U.S. PATENT DOCUMENTS

| | | | | | |
|---|---|---|---|---|---|
| 833,869 | A | | 10/1906 | Bowen | |
| 988,457 | A | | 4/1911 | Glasscock | |
| 1,223,064 | A | | 4/1917 | Meader | |
| 2,089,245 | A | * | 8/1937 | Barron | E21B 7/003 172/372 |
| 2,623,234 | A | * | 12/1952 | Brown | E04D 13/0765 15/352 |

(Continued)

FOREIGN PATENT DOCUMENTS

| | | | | | |
|---|---|---|---|---|---|
| CA | 2449328 | A1 | | 5/2005 | |
| DE | 102019207727 | A1 | * | 12/2020 | A01M 21/02 |
| DE | 202021001337 | U1 | * | 5/2021 | A47L 13/02 |

OTHER PUBLICATIONS

Dermody, Todd, "How to Build a Boardwalk", Apr. 18, 2017, https://diy.dunnlumber.com/projects/how-to-build-a-boardwalk. (Year: 2017).*

*Primary Examiner* — Laura C Guidotti
(74) *Attorney, Agent, or Firm* — Patrick Reilly

(57) ABSTRACT

A tool for clearing debris out of gaps between wooden or composite boards in a deck is provided, including a slanted blade, an optional horizontal guide plate, and an attachment point for coupling with a handle, vacuum cleaner tube, or leaf blower tube. In preferred operation, the tool is pushed along a deck gap, with the blade protruding ahead and dislodging the debris from the deck gap, up onto the deck to be removed. Other features in certain embodiments might include a detachable blade, a brush attachment, or a nozzle attachment.

22 Claims, 53 Drawing Sheets

CLIP-ON VACUUM OR BLOWER

(56) References Cited

U.S. PATENT DOCUMENTS 2,816,306 A * 12/1957 Davis .................. A46B 11/063 401/268
2,899,225 A * 8/1959 Birr ...................... A46B 5/0058 403/58
4,229,032 A 10/1980 Murphy
5,054,159 A * 10/1991 Richardson ............... A47L 5/14 15/393
5,058,275 A 10/1991 Staubli
5,350,021 A * 9/1994 Walker .................... E01H 1/105 172/13
5,471,696 A * 12/1995 Linfoot ................... A47L 13/00 15/104.001
5,740,577 A * 4/1998 Wade ........................ E01H 1/12 15/236.01
5,774,933 A * 7/1998 Jannicelli, Jr. ............ A47L 5/14 15/344
5,839,161 A * 11/1998 Liang .................... A47L 9/0673 15/393
6,205,608 B1 * 3/2001 Bowen .................... A47L 13/08 15/236.01
8,069,531 B2 * 12/2011 Ruston ...................... A47L 9/02 15/93.4
8,079,423 B2 * 12/2011 Cole ........................ A01B 1/16 81/489
8,800,103 B2 8/2014 Hong et al.
9,770,094 B1 * 9/2017 Gresham ................ A46B 17/08
10,041,261 B2 * 8/2018 Shank ................... E04F 21/165
10,932,642 B2 * 3/2021 Bardo ..................... A47L 13/08
2002/0189037 A1 * 12/2002 Lee ........................... E01H 1/12 15/236.01
2008/0256737 A1 * 10/2008 Ruston ...................... A47L 9/02 15/236.01
2015/0182091 A1 * 7/2015 Epting ..................... A01B 1/20 15/236.07
2016/0374530 A1 12/2016 Shank
2017/0238781 A1 * 8/2017 Walsh ..................... A47L 13/08
2018/0132425 A1 * 5/2018 Grovum ................... A01G 3/06

* cited by examiner

BASIC TOOL
FIXED ANGLE BLADE
DETACHABLE HANDLE

BASIC TOOL

BASIC TOOL

BASIC TOOL

BASIC TOOL - SWIVEL
300
302
304
306
308
310
312
312A
312B
312C
5 1/16"
2 1/2"
X
Y
Z

SWIVEL HANDLE

SWIVEL HANDLE

BASIC TOOL - 2 AXIS SWIVEL

2-AXIS SWIVEL HANDLE

SHORT HANDLE

INTERCHANGABLE BLADE
614
602
Z
Y
X 614
606
604
602
Z
X
Y 604
602
X
Y
Z
3"
616D
616C
614
1 1/4"

INTERCHANGABLE BLADE

INTERCHANGABLE BLADE

CLIP-ON VACUUM OR BLOWER

CLIP-ON VACUUM OR BLOWER

SLIP-ON VACUUM OR BLOWER

SLIP-ON VACUUM OR BLOWER
INTERCHANGABLE BLADE

SLIP-ON VACUUM OR BLOWER INTERCHANGABLE BLADE

SLIP-ON VACUUM OR BLOWER
INTERCHANGABLE BLADE
INTERCHANGABLE BRUSH
1200
1202
1204
1206
1208
1210
1212
1214
1214A
1214B
1214C
1214D
1216
1218
X
Y
Z

SLIP-ON VACUUM OR BLOWER
INTERCHANGABLE BLADE
INTERCHANGABLE BRUSH

SLIP-ON VACUUM OR BLOWER
INTERCHANGABLE BLADE
INTERCHANGABLE BRUSH 1300
1302
1304
1306
1308
1310
1312
1314
1314A
1314B
1314C
1314D
1316
1318
1320
X
Y
Z
SLIP-ON VACUUM OR BLOWER
INTERCHANGABLE BLADE
INTERCHANGABLE BRUSH
AIR OR WATER NOZZLE

SLIP-ON VACUUM OR BLOWER
INTERCHANGABLE BLADE
INTERCHANGABLE BRUSH
AIR NOZZLE

SLIP-ON VACUUM OR BLOWER
INTERCHANGABLE BLADE
INTERCHANGABLE BRUSH
AIR NOZZLE

BASIC TOOL
FIXED BLADE
FIXED HANDLE

SLIP-ON VACUUM OR BLOWER
MULTIPLE NOZZLE DIAMETERS 1900
1904
1902

SLIP-ON VACUUM OR BLOWER
1900
1904
1906
1908
1902

1904
1902
1900

1900
1904
1902

CLIP-ON VACUUM OR BLOWER

DECK CLEANING TOOL

FIELD OF THE INVENTION

This invention is generally in the field of home and yard maintenance tools, and specifically in the field of tools for cleaning the gaps between planks of an outdoor deck.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Maintaining a home includes a wide variety of chores and cleaning tasks, such as touching up paint, repairing damage, cleaning roof gutters, and so on. One of these, if the home happens to include an outdoor deck made of wooden planks (or something similar), is to regularly scrape between those planks to dislodge whatever may accumulate in the gaps, such as dead leaves or dirt. This practice makes for a nice clean deck, but is also crucial to the ongoing health of the deck, especially if made of wood. These pockets of debris might prevent water from running off the deck when it rains or snows and leave moisture to soak in instead, might harbor moisture, and might provide a growing ground for moss, lichen, bacteria, and fungi; any or all of these factors might also rot the wood of the deck, leading to expensive repairs or potential hazards. All of this is a good reason to regularly clean the gaps of one's deck, but this chore sometimes gets neglected at least for an absence of a tool that makes this task convenient or straightforward to do.

In the absence of a special tool or product to recommend for this task, home maintenance wisdom (such as a quick internet search for 'how to clean deck boards') will generally recommend simply finding something to use as a chiseling tool that fits between the planks, such as a putty knife, chisel, long screwdriver, or similar, and crouching down on one's knees to start scraping. This is not only laborious and time-consuming, but potentially inaccessible to someone who is elderly or impaired (even though such individuals may own decks and have a need to maintain them). Even some tools developed specifically for this task might be difficult or cumbersome to use, may include blades that can gouge into the deck wood if not handled carefully, or might be otherwise unideal for this task.

Therefore, there is a long-felt need for better and more optimized solutions to this common concern, and for improved accommodation and ease in the field of deck gap maintenance.

SUMMARY OF THE INVENTION

Towards these and other objects of the method of the present invention (hereinafter, "the invented method") that are made obvious to one of ordinary skill in the art in light of the present disclosure, what is provided is a tool (hereinafter "the invented tool") for cleaning gaps between wooden boards, which may comprise a shaped tool end (hereinafter "the invented tool end"), comprising or including a blade and/or brush, optionally coupled with a handle or a vacuum cleaner or leaf blower attachment to operate from a standing, kneeling, or sitting position.

In a preferred embodiment and utilizing a preferred method for operation, a user may utilize the threading on a standard broom handle or similar to couple the handle to the top of the invented tool end, then fit the blade and/or brush of the invented tool into a gap in a wooden deck between two boards, and push the invented tool forward by means of the handle, similar to operating a push broom, causing the slanted blade of the invented tool end to pry any debris such as dirt and dead leaves up and out from between the deck boards and causing the brush to sweep debris and dirt from the tops of the deck joists. The blade and/or brush with or without an optional base plate, keeping the tool moving along the path of the gap between the deck boards. The tool end may be fixed, or include a one or two axis swivel joint between the handle coupling point and the rest of the tool end, permitting further range of motion when utilizing the tool. The blade of the tool preferably extends ahead of the tool and the handle behind, such that the tool can be pushed like a push broom. The blade is preferably slanted, with a forward point tapering up to the end of the base plate, such that debris stuck between the deck boards is forced upward in a 'shoveling' or 'plowing' manner as the tool is moved forward. The blade is preferably blunt or made of somewhat flexible material, as a sharp blade may be more likely to damage the deck boards or be a potential safety hazard. This tool might further optionally include a brush, which is generally deep enough to sweep debris and dirt from the tops of the deck joists as the tool passes over the deck, and/or an air or water nozzle, which can loosen debris and/or blow or wash debris and dirt loosened by the brush off of the joists' top surfaces.

An optional rigidity of the fixed or detachable attachment of the handle to the tool end of certain alternate preferred embodiments of the present invention and the invented tool enables a user to pass the invented tool end up and over clip elements that are used in certain decks to maintain deck planks in position within a deck and present a clean 'hidden fastener' or 'blind nailed' look. This optional aspect of the invented tool thereby enables a user to clean between deck planks without colliding with or jamming against such plank clip elements.

It is noted and understood that the above summary is intended only as a general introductory overview regarding the 'big picture' of this invention and its intended use, and nothing stated above should be construed as definitive or limiting. It is noted also that the described tool, or a variation thereof, might have other applications, and the invented tool is not limited to use on deck boards.

A first preferred embodiment of the invented tool may comprise or include a tool for cleaning between boards comprising a non-detachable handle, long or short, with a tool end having a fixed blade and/or brush shaped and sized for cleaning a wooden deck, with the handle held at a fixed angle to the blade. A further variation of this embodiment may instead have a fixed blade and/or brush shaped and sized for cleaning a composite deck. A further variation may include detachable blade and/or brush attachment, allowing for interchangeable inclusion of either a wooden deck blade and/or brush or composite deck blade and/or brush, or replacement of either as required, such as due to wear from use.

A second preferred embodiment of the invented tool may comprise or include a tool for cleaning between boards comprising a non-detachable handle, long or short, with a tool end having a fixed blade and/or brush shaped and sized for cleaning a wooden deck, with the handle including a swivel feature such as a one or two axis hinged joint, allowing the angle of the handle to shift with the user's movement or need. A further variation of this embodiment may instead have a fixed blade and/or brush shaped and sized for cleaning a composite deck. A further variation may include detachable blade and/or brush attachment, allowing for interchangeable inclusion of either a wooden deck blade and/or brush or composite deck blade and/or brush, or replacement of either as required, such as due to wear from use.

A third preferred embodiment of the invented tool may comprise or include a tool for cleaning between boards comprising a detachable handle, long or short, with a tool end having a blade and/or brush shaped and sized for cleaning a wooden deck, with the handle held at a fixed angle to the blade. A further variation of this embodiment may instead have a fixed blade and/or brush shaped and sized for cleaning a composite deck. A further variation may include detachable blade and/or brush attachment, allowing for interchangeable inclusion of either a wooden deck blade and/or brush or composite deck blade and/or brush, or replacement of either as required, such as due to wear from use.

A fourth preferred embodiment of the invented tool may comprise or include a tool for cleaning between boards comprising a detachable handle, long or short, with a tool end having a blade and/or brush shaped and sized for cleaning a wooden deck, with the connection point between the handle and tool end further including a swivel feature such as a one or two axis joint, allowing the angle of the handle to shift with the user's movement or need. A further variation of this embodiment may instead have a fixed blade and/or brush shaped and sized for cleaning a composite deck. A further variation may include detachable blade and/or brush attachment, allowing for interchangeable inclusion of either a wooden deck blade and/or brush or composite deck blade and/or brush, or replacement of either as required, such as due to wear from use.

A fifth preferred embodiment of the invented tool may comprise or include a vacuum or leaf blower attachment which can be slipped onto the end of a vacuum cleaner tube or wand, or leaf blower tube or wand, at a fixed angle to the blade, or by way of a swivel feature such as a one or two axis joint. This embodiment may have a fixed blade and/or brush for use with a wooden deck; a fixed blade and/or brush for use with a composite deck; or detachable attachment, allowing for interchangeable inclusion of either a wooden deck blade and/or brush or composite deck blade and/or brush, or replacement of either as required, such as due to wear from use. This embodiment may further additionally include an air or water nozzle.

A sixth preferred embodiment of the invented tool may comprise or include a vacuum or leaf blower attachment tool end which can be clipped to the end of a vacuum cleaner tube or wand, or leaf blower tube or wand, at a fixed angle to the blade, or by way of a swivel feature such as a one or two axis joint. The tool end may be clipped to the tube or wand by various means including, but not limited to, rubber bands, or straps or belts made of plastic or metal. This embodiment may have a fixed blade and/or brush for use with a wooden deck; a fixed blade and/or brush for use with a composite deck; or detachable blade and/or brush attachment, allowing for interchangeable inclusion of either a wooden deck blade and/or brush or composite deck blade and/or brush, or replacement of either as required, such as due to wear from use. This embodiment may further additionally include an air or water nozzle.

Further variations in preferred design of this tool which may also constitute distinct embodiments of the invention include at least the following. A shorter handle might also be coupled to the invented tool end, rather than a full-length handle such as a broom handle. The handle might be a simple straight wooden or plastic shaft. The handle might have additional features such as a D-shaped grip at the non-coupling end, telescoping, a comfort grip, an aperture or fixture for storage such as hanging on a hook, or any other sort of feature as known in the art of providing tools with such handles in general. The handle might be of a standard design for coupling with a standard-shaped coupling point on the tool end, or both handle and tool end might be of a specialized design. Some tool ends may include a joint below the attachment point of the handle (or vacuum or blower), so the angle of the tool end relative to the handle is more flexible; other embodiments may not include this feature, and variations in type of joint and range of motion are also possible. Providing this flexibility may include at least the benefit of making the tool easier to use and more accessible to people having different heights and postures. Another variation may be in the precise shape of the slanted blade, particularly in optimizing for use with different varieties of deck boarding, such as composite deck boarding instead of actual wood, or a longer blade provided for use with a deeper deck surface. The blade may also be tapered to reduce the likelihood of binding to the deck boards. Interchangeable or replaceable blades may be a feature. Further, tool ends having different types of attachment end may be provided, such as a threaded one for a standard broom handle, a friction fit, different sizes, and so on. All of these are anticipated variations constituting a diverse array of possible embodiments of the described invention. Further, other similar variation, within a reasonable degree of obviousness, may also be considered as anticipated by the disclosure of this invention, including adding or alteration of features not mentioned above. Some anticipated additional features may include hand controls for the air or water nozzles. Nothing stated here should be construed as limiting on what variation or special features an embodiment of the invented tool might comprise or include.

Regarding suitable materials for constructing the invented tool, the invented tool may be constructed of any material deemed suitable by one skilled in the art as presently considered or discovered in the future to be suitable, including but not limited to plastics, wood, metal, rubber, synthetic polymers, and similar. It is understood that this statement and any other regarding preferred or possible materials is not intended as a limitation, and is offered only as additional guidance in constructing an instance of the invention in an optimal fashion as understood presently by the inventor.

It is understood that any measurements given herein as to the size or scale of the various alternative preferred embodiments of the invented tool as disclosed herein pertain only to the examples given, and does not constitute a limitation regarding size or scale of the invention. Certain alternate preferred embodiments of the invented tool disclosed herein may be substantially scalable depending on factors such as but not limited to the size or composition of the deck being cleaned or the concerns relevant to some non-deck-cleaning application, making various sizes of embodiments entirely possible and potentially useful depending upon the intended application. Any sizes or measurements included in this disclosure should be viewed as presenting of functional or preferred examples, rather than construed as limitations.

This disclosure should not be construed as insisting upon or specifying any particular size or scale of the invention, nor should any examples of suitable measurements or dimensions provided herein be construed as limiting.

Further alternate preferred embodiments of the invented tool might preferably comprise or include a device adapted for coupling with a handle, the device comprising a plate having a plate top side and a plate planar bottom surface ("bottom surface"), the bottom surface extending along an X axis in length and a Y axis in width and the bottom surface displaced in a downward position along a Z axis in depth from the plate top side, whereby a plate front side is defined in a forward position along the X axis, wherein the X axis, the Y axis and the Z axis are each mutually orthogonal to remaining axes; a blade descending downward from the plate along the Z axis, the blade having a leading edge that extends downward in direction from the plate top side within a plane defined by the X axis and the Z axis, and the leading edge defined along an edge axis extending forward from the plate top side at an acute downward angle from the Z axis, wherein the leading edge descends from the plate top side at the plate front side; and an attachment feature extending the plate top side, the attachment feature adapted for coupling with the handle.

Certain preferred embodiments of this invented device might further include an elongate handle.

Certain preferred embodiments of this invented device might further include the attachment feature comprising a tapped inner channel adapted to engage with a threaded end of the handle.

Certain preferred embodiments of this invented device might further include the attachment feature comprising an inner channel that is undersized relative to an insertion end of the handle, and the inner channel being sized and shaped to enable a friction fit of at least a portion of the insertion end of the handle when the at least a portion of the insertion end of the handle is positioned within the inner channel.

Certain preferred embodiments of this invented device might further include the attachment feature comprising an inner channel that extends along a channel axis from the plate top side, wherein the inner channel extends away from the plate front side.

Certain preferred embodiments of the invented tool might further include the channel axis extending from a plane formed by the X axis and the Y axis ("the X-Y plane") at an acute angle relative to the top plate.

Certain preferred embodiments of the invented tool might further include the channel axis extending from the X-Y plane at an acute angle no less than 25 degrees relative to the top plate.

Certain preferred embodiments of the invented tool might further include the channel axis extending from the X-Y plane at an acute angle relative to the top plate no more than 50 degrees.

Certain preferred embodiments of the invented tool might further include the edge axis extending from a plane formed by the X axis and the Y axis ("the X-Y plane") at an acute angle no less than 25 degrees relative to the bottom surface.

Certain preferred embodiments of the invented tool might further include the edge axis extending from the X-Y plane at an acute angle no less than no more than 50 degrees relative to the bottom surface.

Certain preferred embodiments of the invented tool might further include the blade edge preferably extending no deeper than the bottom surface of the deck board along a Z dimension defined by the Z axis. Certain preferred embodiments of the invented tool might further include the blade edge extending at or greater than two inches below the bottom surface along Z dimension defined by the Z axis. Certain preferred embodiments of the invented tool might further include the attachment feature being adapted to couple with a vacuum or blower element and thereby enable delivery of a vacuum or blower force proximate to the plate front side, wherein the vacuum element is comprised within the handle. Certain preferred embodiments of the invented tool might further include the attachment feature being adapted to couple with a vacuum or blower element and thereby enable delivery of a vacuum or blower force proximate to the plate front side.

Even other alternate preferred embodiments of the present invention comprise or include a device adapted for coupling with a vacuum or blower system having an elongate portion, the device comprising a plate having a plate top side and a plate planar bottom surface ("bottom surface"), the bottom surface extending along an X axis in length and a Y axis in width and the bottom surface displaced in a downward position along a Z axis in depth from the plate top side, whereby a plate front side is defined in a forward position along the X axis, wherein the X axis, the Y axis and the Z axis are each mutually orthogonal to remaining axes; a blade descending downward from the plate along the Z axis, the blade having a leading edge that extends downward in direction from the plate top side within a plane defined by the X axis and the Z axis, and the leading edge defined along an edge axis extending forward from the plate top side at an acute downward angle from Z axis, wherein the leading edge descends from the plate top side at the plate front side; and an attachment feature extending from the plate top side, the attachment feature adapted for coupling with the vacuum or blower system.

Certain still alternate preferred embodiments of the invented tool might further include the attachment feature being adapted to couple with the vacuum or blower system elongate portion.

Certain yet alternate preferred embodiments of the invented tool might further include the attachment feature comprising a cradling shape, to include but not limited to, a V shape extending along a handle axis, a handle axis from the plate top side, wherein the V shape extends away from the plate front side. Certain preferred embodiments of the invented tool might further include the attachment feature further comprising a strapping element, the strapping element adapted to press the vacuum or blower system elongate element against the V shape. Certain preferred embodiments of the invented tool might further include the strapping element being adapted to detachably couple the vacuum or blower system elongate element with the V shape.

Even still other alternate preferred embodiments of the present invention might comprise or include a system comprising a handle; a plate detachably coupled with the handle, the plate having a plate top side and a plate planar bottom surface ("bottom surface"), the bottom surface extending along an X axis in length and a Y axis in width and the bottom surface displaced in a downward position along a Z axis in depth from the plate top side, whereby a plate front side is defined in a forward position along the X axis, wherein the X axis, the Y axis and the Z axis are each mutually orthogonal to remaining axes; a blade descending downward from the plate along the Z axis, the blade having a leading edge that extends downward in direction from the plate top side within a plane defined by the X axis and the Z axis, and the leading edge defined along an edge axis extending forward from the plate top side at an acute downward angle from Z axis, wherein the leading edge descends from the plate top side at the plate front side; and an attachment feature extending the plate top side, the attachment feature adapted for coupling with the handle.

Further still alternate preferred embodiments of the invented tool may be adapted for coupling with a handle, and further comprise an attachment feature adapted for coupling with the handle and a blade extending downward from the attachment feature along a Z axis of depth and forward from the attachment feature along an X axis of length, whereby a front side is defined in a forward position along the X axis, the blade having a leading edge that extends downward in direction from the attachment feature within a plane defined by the X axis and the Z axis, wherein the X axis, the Z axis, and a Y axis of width are each mutually orthogonal to remaining axes; and the leading edge defined along an edge axis extending forward from the front side at an acute downward angle from the Z axis, wherein the leading edge descends from the attachment feature at the front side.

This Summary is provided to introduce a selection of concepts in a simplified form that are further described below in the Detailed Description. This Summary is not intended to identify key features or essential features of the claimed subject matter, nor is this Summary intended to be used to limit the scope of the claimed subject matter.

BRIEF DESCRIPTION OF DRAWINGS

The detailed description of some embodiments of the invention is made below with reference to the accompanying figures, wherein like numerals represent corresponding parts of the figures.

DETAILED DESCRIPTION OF DRAWINGS

In the following detailed description of the invention, numerous details, examples, and embodiments of the invention are described. However, it will be clear and apparent to one skilled in the art that the invention is not limited to the embodiments set forth and that the invention can be adapted for any of several applications.

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims. Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the range's limits, an excluding of either or both of those included limits is also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms “a”, “an”, and “the” include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

When elements are referred to as being "connected" or "coupled," the elements can be directly connected or coupled together or one or more intervening elements may also be present. In contrast, when elements are referred to as being "directly connected" or "directly coupled," there are no intervening elements present.

Throughout this specification, like reference numbers signify the same elements throughout the description of the figures.

Figure 1:
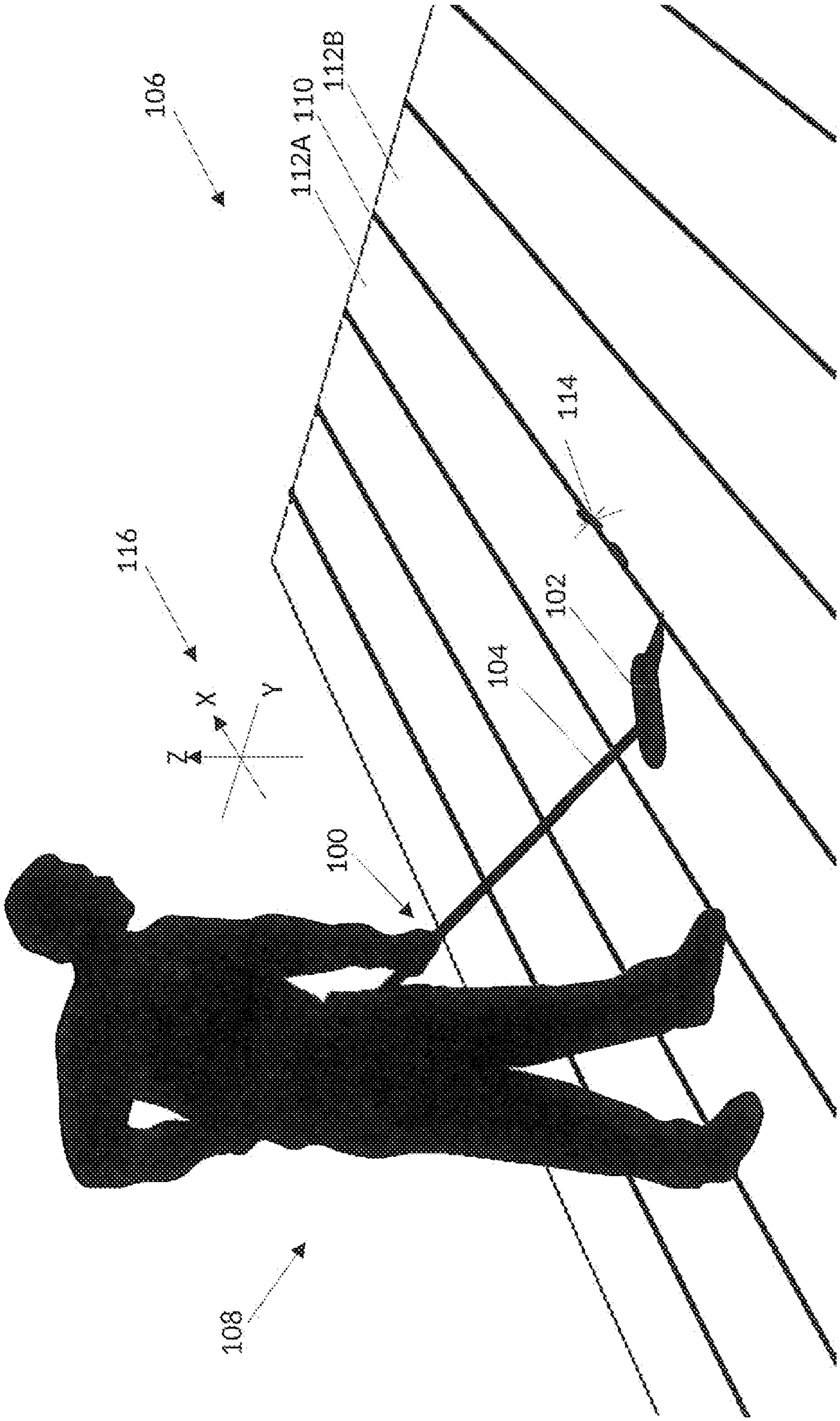
FIG. 1 is an overview diagram presenting a first embodiment of an invented tool being used as generally intended for cleaning a deck.

Referring now generally to the Figures and particularly to FIG. 1, FIG. 1 is an overview diagram presenting a first embodiment of the invented tool 100 (hereinafter, "the first tool 100") comprising a tool end 102 coupled with a handle 104 being used for cleaning a deck 106. In preferred operation, a user 108 couples the handle 104 (such as a standard broom handle) to the top of the tool end 102, then fits the tool end 102 into a gap 110 in a wooden deck between a first deck board 112A and a second deck board 112B ("the deck boards 112"), and pushes the first tool 100 forward by means of the handle 104, similar to operating a push broom, utilizing the tool end 102 to pry any material 114 such as dirt and dead leaves up and out from between the boards 112. This disclosure includes several different embodiments of the tool end 102, such as to present tool shaping preferred for cleaning a wooden as opposed to a composite deck 106, or present additional features such as a joint allowing the handle 104 to be swiveled relative to the tool end 102. It is understood that any embodiment or feature of the invented tool end outlined and described herein might be fitted into the context presented in FIG. 1 as the tool end 102, included those tool ends presented in the context of use with a leaf blower, vacuum cleaner, or something else, as deemed appropriate. It is noted and understood that the above summary is intended only as a general introductory overview regarding the 'big picture' of this invention and its intended method of use to provide context, and nothing stated above should be construed as definitive or limiting. It is noted also that the described tool, or a variation thereof, might have other applications, and the invented tool is not limited to use on deck boards.

Further presented here for reference is a compass 116 having an X axis, a Y axis, and a Z axis, wherein the X axis, the Y axis, and the Z axis are each mutually orthogonal to the other two axes. X axis runs parallel to both the surface of the deck 106 and the line of the deck gap 110 currently being cleaned, and the length of the tool 100 from front to rear is measured along the X axis; an arrowhead on the X axis line of the compass indicates 'forward'. The Y axis runs parallel to the surface of the deck 106 and perpendicular to the line of the deck gap 110 currently being cleaned, and the width of the tool is measured along the Y axis. The Z axis is perpendicular to the surface of the deck 106 and orthogonal to both the Y axis and the X axis; assuming that the deck 106 surface is flat and horizontal, the Z axis is substantively vertical, and the height of the tool is measured along the Z axis. It is noted that, as in most embodiments the handle 104 extends on a slant or can vary, that the Z axis is generally NOT parallel to the handle 104 and shouldn't be mistaken this way, but rather 'straight up and down' and parallel to the blade 202 and the depth dimension of the deck 106, regardless of the angle of the handle 104. An arrowhead on the Z axis line of the compass indicates 'up'. (It is noted that this direction of 'up' assumes that the tool is being used on a flat horizontal deck, and that the tool 100 could of course also be used to clean a non-flat or non-horizontal set of boards that may require such cleaning.) It is further noted that, as many of these images are two-dimensional, one of the three dimensions will usually overlap the viewer's line of sight; the letter representing this dimension will be positioned close to the intersection of the other two axes, representing that the line representing this dimension would extend 'straight out of the page' from the intersection of the other two and therefore not be visible except as represented by the intersection point itself. For instance, the side view of FIG. 2A includes the X dimension (front-to-back) and the Z dimension (up-and-down), but the Y dimension (side-to-side) would coincide with the dimension of toward and away from the viewer. In the front view of FIG. 2B, the X dimension is toward the viewer instead.

Figure 2A:
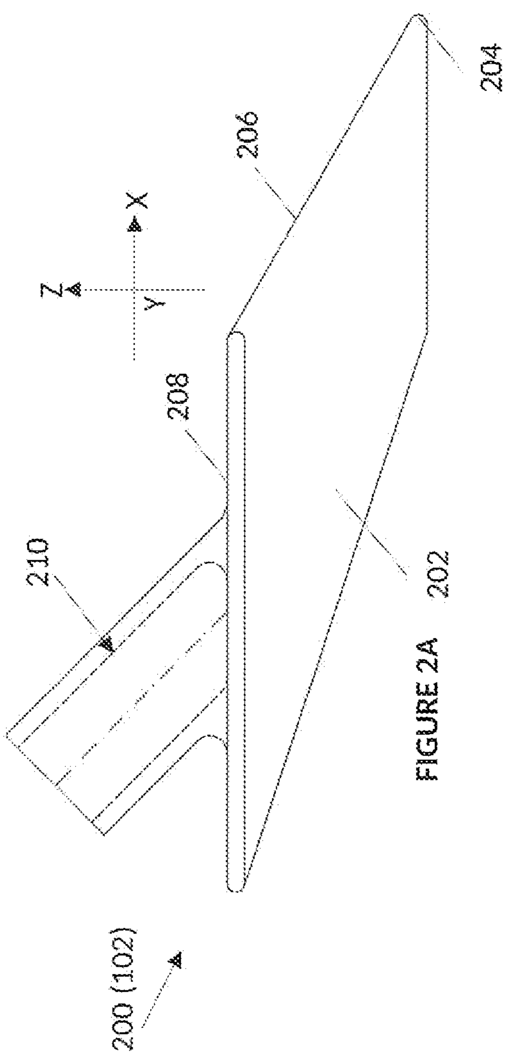
FIG. 2A is a side view of a first embodiment of the tool end for the tool of FIG. 1, having a fixed blade and a fixed-angle handle attachment point.

Referring now generally to the Figures and particularly to FIG. 2A, FIG. 2A is a side view of a first tool end 200, a preferred embodiment of the tool end 102 for the first tool 100 of FIG. 1, having a fixed blade that does not detach and a fixed collar that doesn't swivel. It is noted that all measurements and ranges offered herein are for demonstrative or example purposes only, and should not be read as limitations on the scope of the invention. The first tool end 200 includes at least a blade 202 with a point 204 and a slope 206, a baseplate 208, and a collar 210. The baseplate 208 forms a substantively right angle to the blade 202 (that is, parallel to the Y axis and orthogonal to the Z axis), which extends over the surfaces of the boards 112 to either side, supporting the tool end 102 to slide along over the deck boards 112 and maintain a straight path with minimal user 108 effort. It is noted that the baseplate 208 may be most useful if generally flat at least on the underside, i.e. the surface contacting the deck boards 112, but may include additional features on top or underside if considered appropriate to this element's function as illustrated herein. One skilled in the art may recognize that plenty of additional features might be experimented with to augment or optimize this basic concept. The blade 202 preferably extends ahead of the tool 100 and the collar 210 (and thus the handle 104, which is coupled to the tool end 102 by the collar 210) behind the tool 100, such that the tool 100 can be pushed from behind, similar to a push broom, shovel, or rake. The blade 202 is preferably shaped approximately as presented in the image, with the intention that material 114 stuck between the deck boards 112 is caught above the point 204 and forced upward by the slope 206 out of the gap 110 as the tool 100 is propelled forward. This may either scatter the material 114 loose on top of the deck 106 above (making the material 114 easy to then sweep off the side of the deck 106 with a broom or gather with a dustpan) or dislodge the material 114 to fall down into a space underneath the deck 106.

It is noted and understood that the exact dimensions of the blade 202 may vary, such as to provide a shape and size optimized for a wooden deck 106 as opposed to a deck 106 made of something else, such as a composite or plastic material. Further, additional experimentation with exact shaping and dimensions may yield optimization, such as improving performance, providing greater ease of use, providing improved durability or longevity, or providing comparable tool performance with reduced effort or material used in manufacture.

Figure 2B:
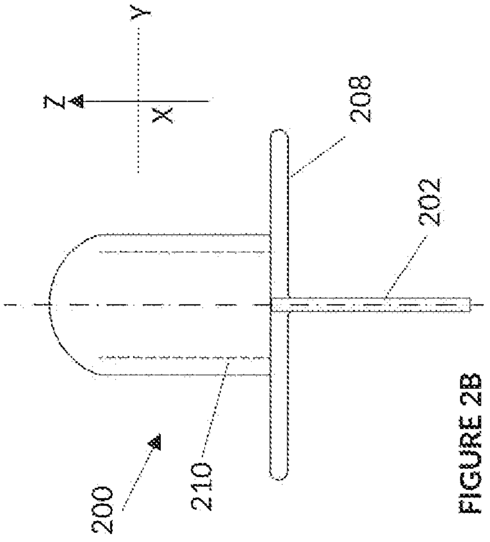
FIG. 2B is a front view of the first tool end of FIG. 2A.

Referring now generally to the Figures and particularly to FIG. 2B, FIG. 2B is a front view of the first tool end 200 of FIG. 2A. It is noted that all measurements and ranges offered herein are for demonstrative or example purposes only, and should not be read as limitations on the scope of the invention. Specifically, an exemplary baseplate 208 width of 2½ inches and length of 4 inches is suggested in the image, as an example of some dimensions considered suitable for this application. Labeled here for spatial reference are the collar 210, the baseplate 208, and the blade 202.

Figure 2C:
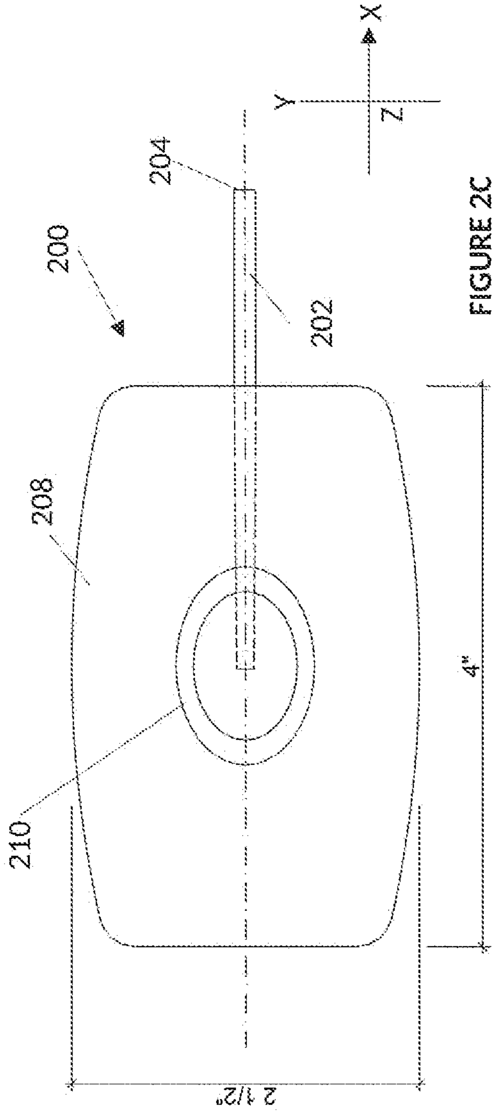
FIG. 2C is a top view of the first tool end of FIG. 2A.

Referring now generally to the Figures and particularly to FIG. 2C, FIG. 2C is a top view of the first tool end 200 of FIG. 2A. It is noted that all measurements and ranges offered herein are for demonstrative or example purposes only, and should not be read as limitations on the scope of the invention. Labeled here are the collar 210, the baseplate 208, the blade 202, and the point 204 of the blade 202. The blade 202 may preferably taper in width from front to back, starting with a maximum width at the point 204 and tapering to a minimum width at the rearmost part of the blade 202.

Figure 2D:
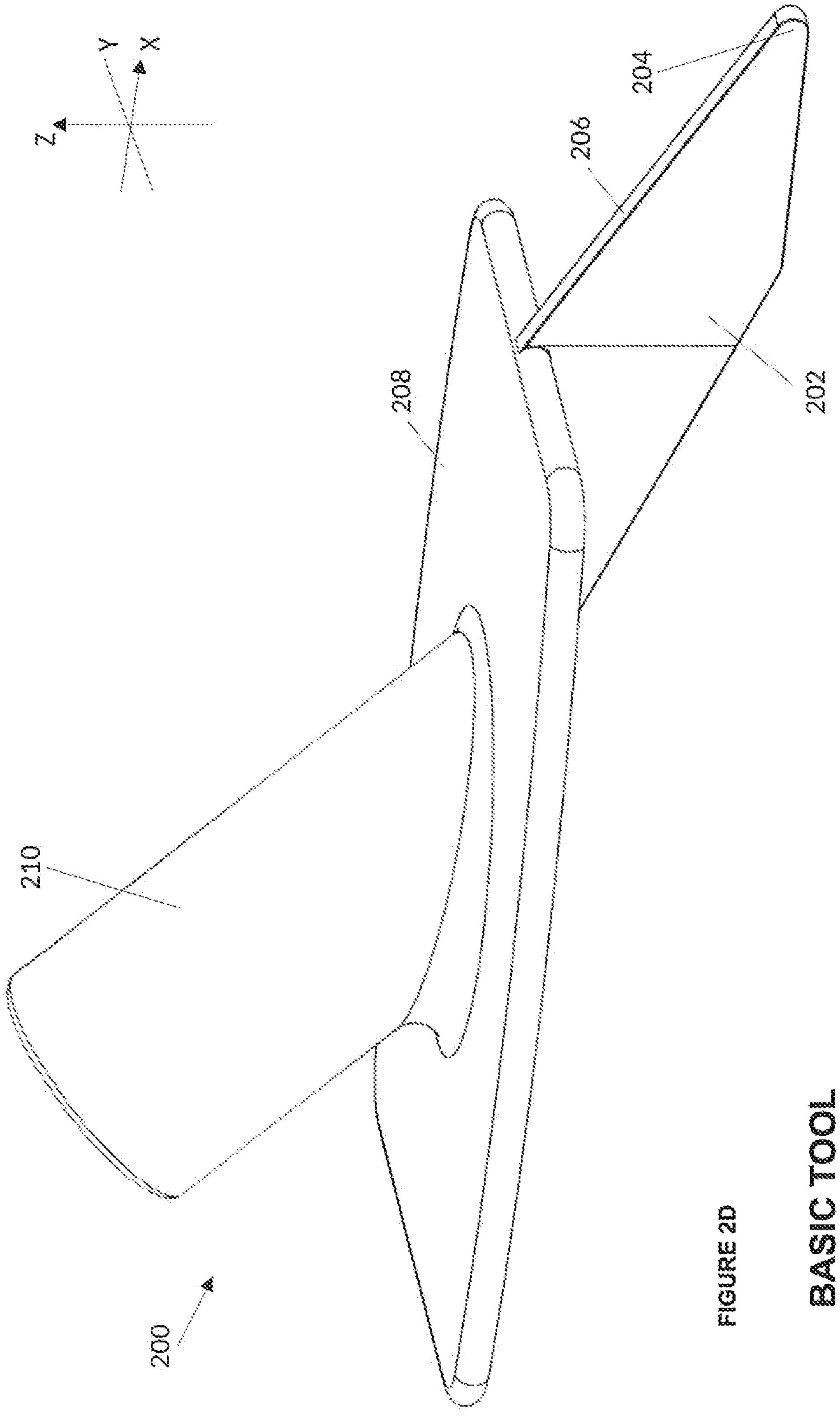
FIG. 2D is a first image of a 3D model of the first tool end of FIG. 2A.

Referring now generally to the Figures and particularly to FIG. 2D, FIG. 2D is a first image of a 3D model presenting the first tool end 200 of FIG. 2A. Labeled here are the blade 202, the point 204, the slope 206, the baseplate 208, the collar 210, and the threaded collar interior 212.

Figure 2E:
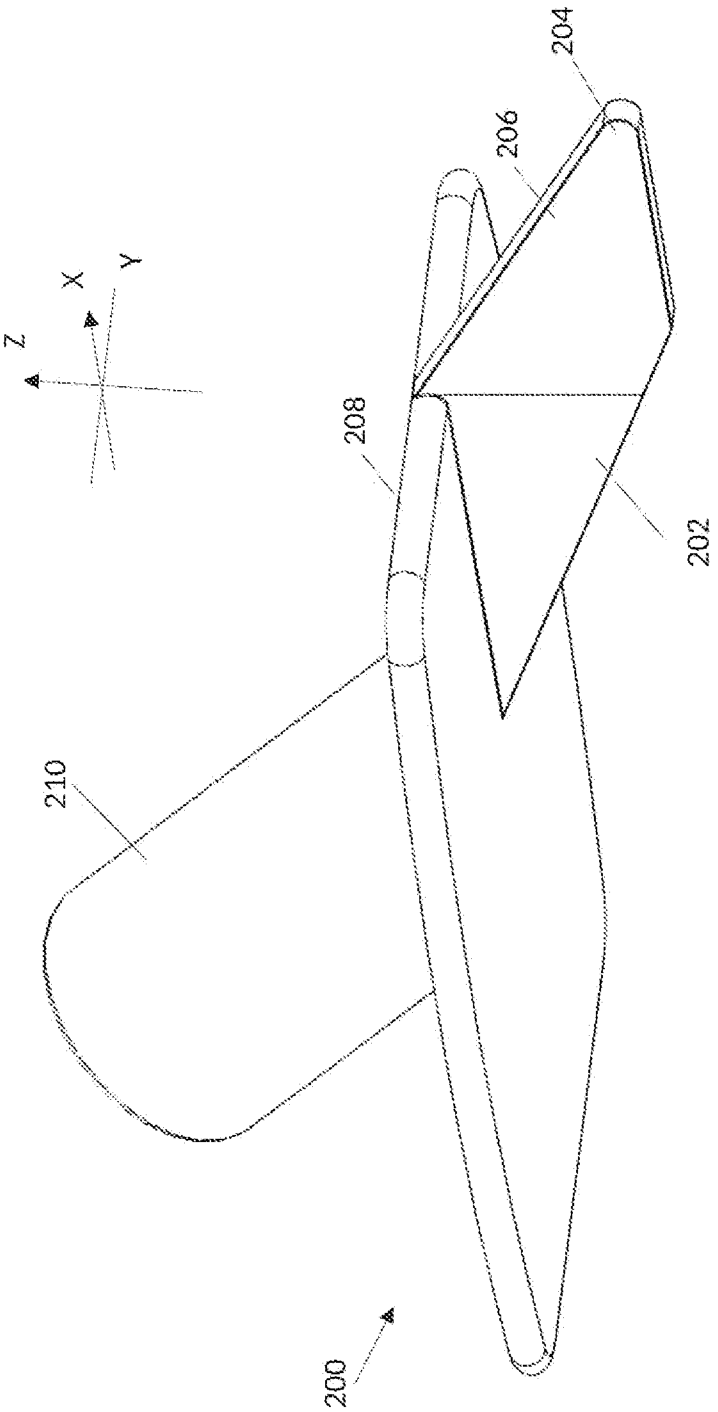
FIG. 2E is a second image of a 3D model of the first tool end of FIG. 2A.

Referring now generally to the Figures and particularly to FIG. 2E, FIG. 2E is a second image of a 3D model presenting the first tool end 200 of FIG. 2A. Labeled here are the blade 202, the point 204, the slope 206, the baseplate 208, and the collar 210.

Figure 2F:
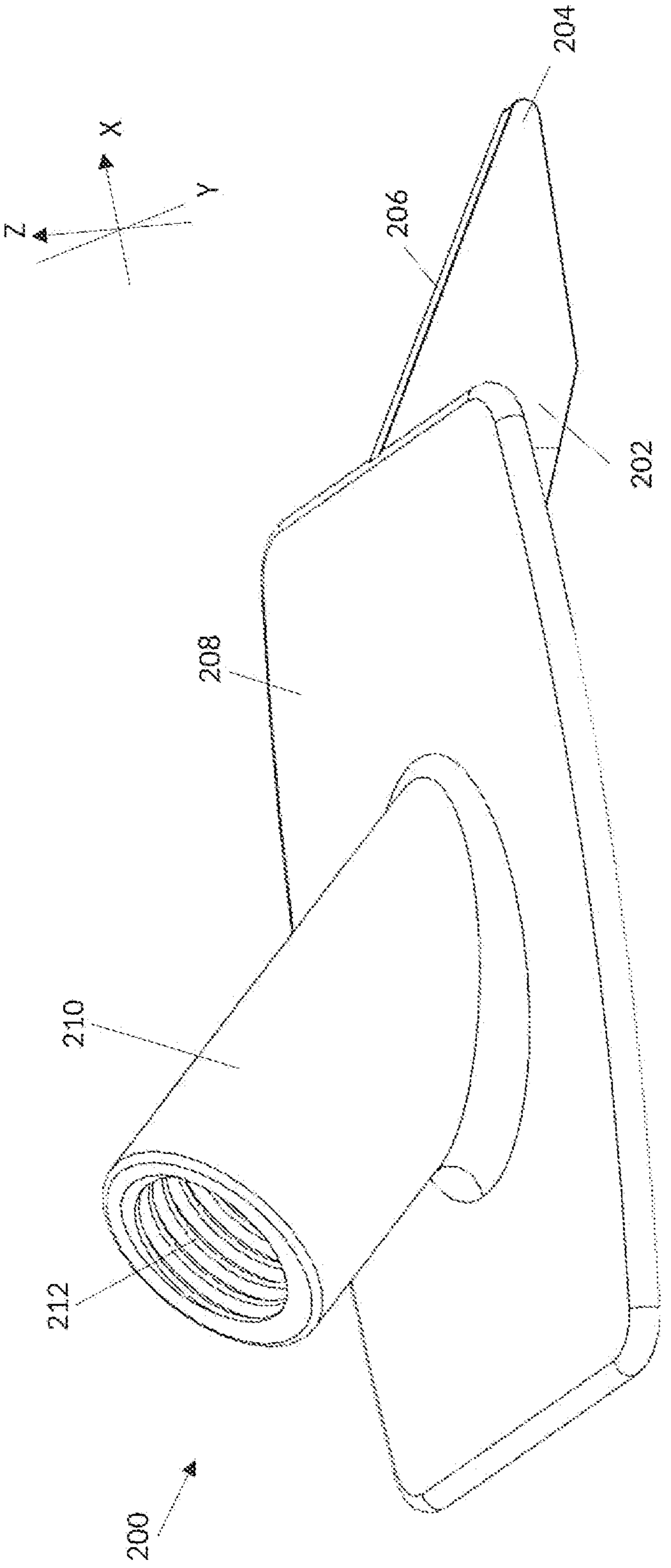
FIG. 2F is a third image of a 3D model of the first tool end of FIG. 2A.

Referring now generally to the Figures and particularly to FIG. 2F, FIG. 2F is a third image of a 3D model presenting the first tool end 200, a preferred embodiment of the tool end 102 for the tool 100 of FIG. 1. Labeled here are the collar 210, the baseplate 208, the blade 202, and the slope 206 and the point 204 of the blade 202. Further visible is a threaded collar interior 212, suitable for coupling the first tool end 200 with a handle 104 having threading at one end, such as the handle 104 that might be detached or borrowed from a standard push broom or another standard-sized handle 104 having threading. It is noted that this is only one possible means of coupling as preferred for one specific anticipated variety of the handle 104, and other variations are possible, such as a friction-fit version of the collar 210 suitable for fitting onto a non-threaded end of the handle 104, or a differently-sized or -shaped version of the collar 210 suitable for fitting onto a differently-sized or -shaped shaft to be employed as the handle 104.

Figure 2G:
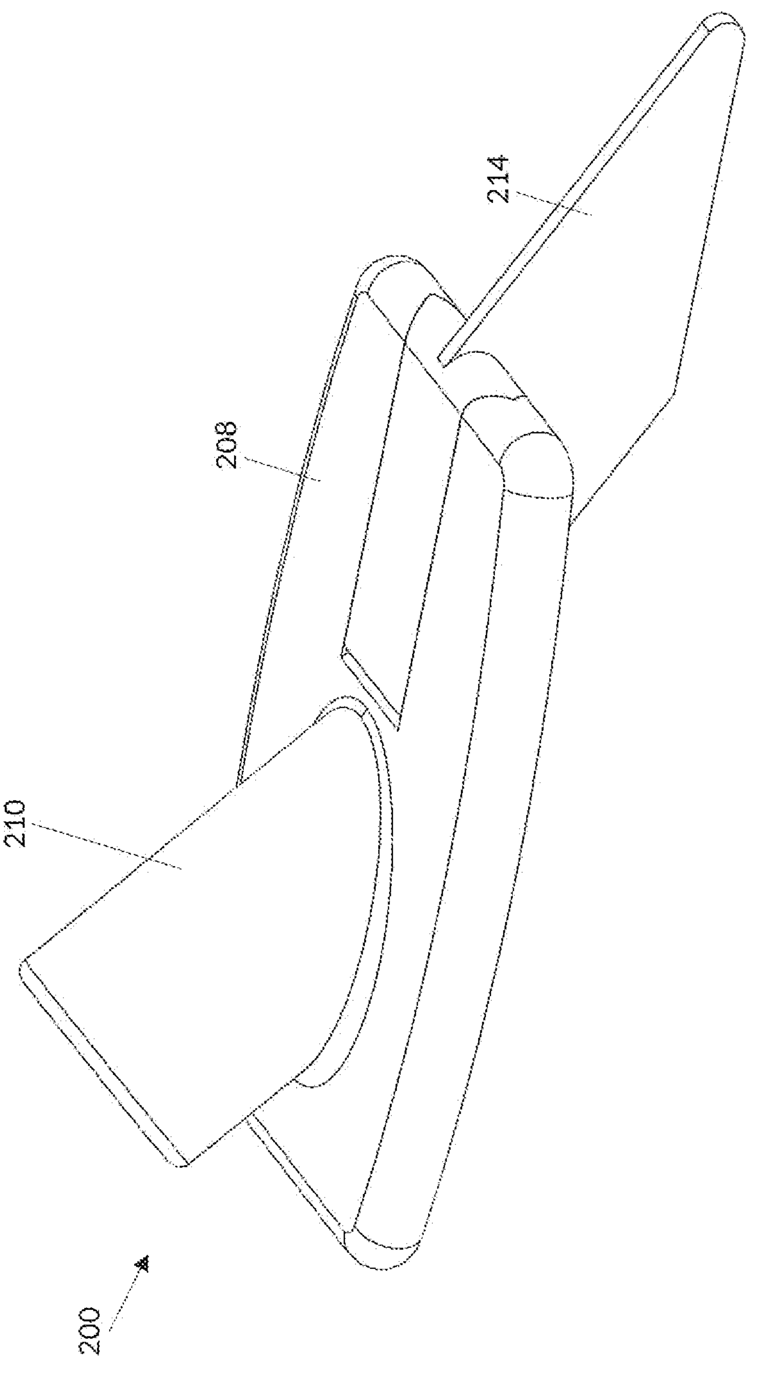
FIG. 2G is an image of a 3D model presenting an embodiment of the first tool end of FIG. 2A, further comprising a detachable blade.

Referring now generally to the Figures and particularly to FIG. 2G, FIG. 2C is an image of a 3D model presenting an embodiment of the first tool end 200 which includes a detachable blade 214. Further labeled here for reference are the collar 210 and the baseplate 208.

Figure 2H:
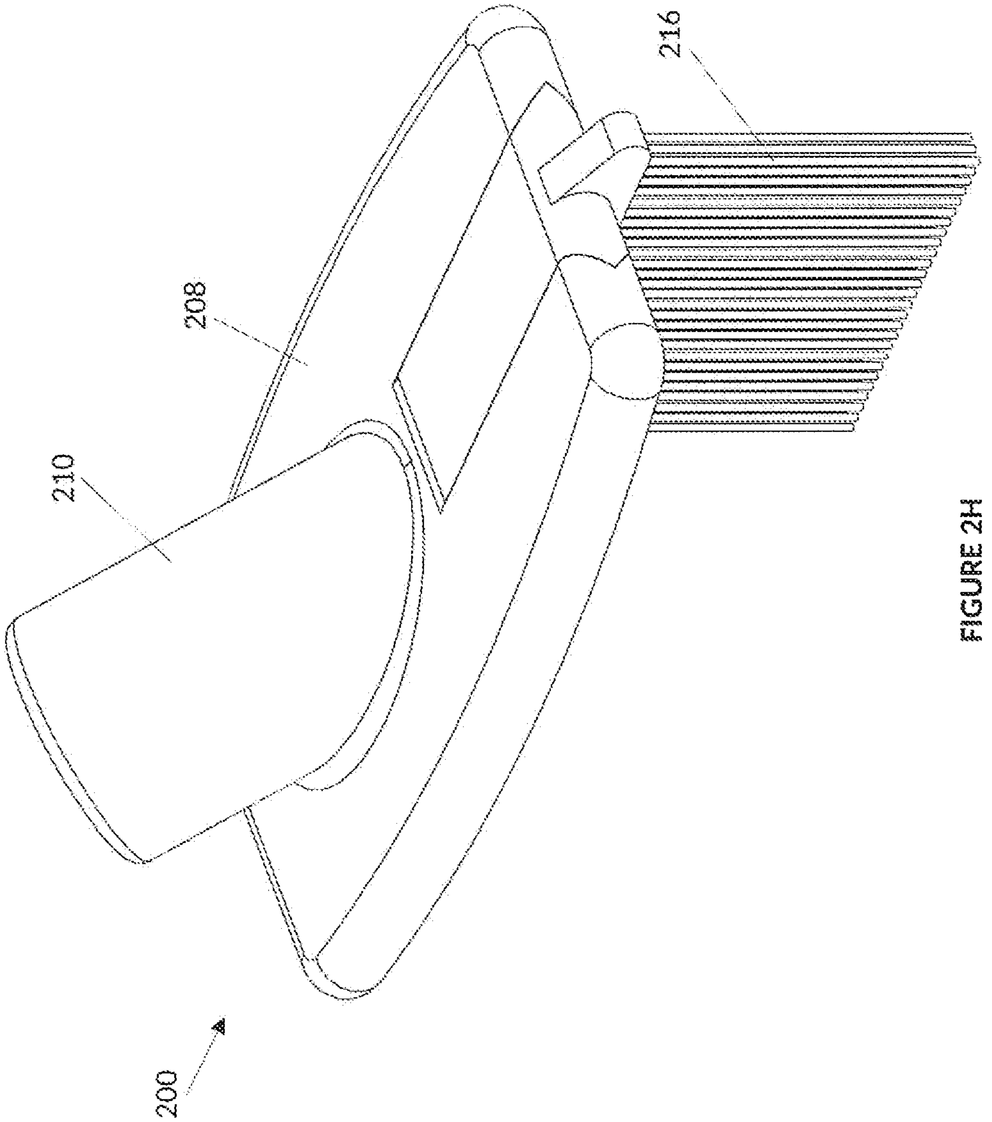
FIG. 2H is an image of a 3D model presenting an embodiment of the first tool end of FIG. 2A, further comprising a detachable brush.

Referring now generally to the Figures and particularly to FIG. 2H, FIG. 2H is an image of a 3D model presenting an embodiment of the first tool end 200 which includes a detachable brush 216. Further labeled here for reference are the collar 210 and the baseplate 208.

Figure 2I:
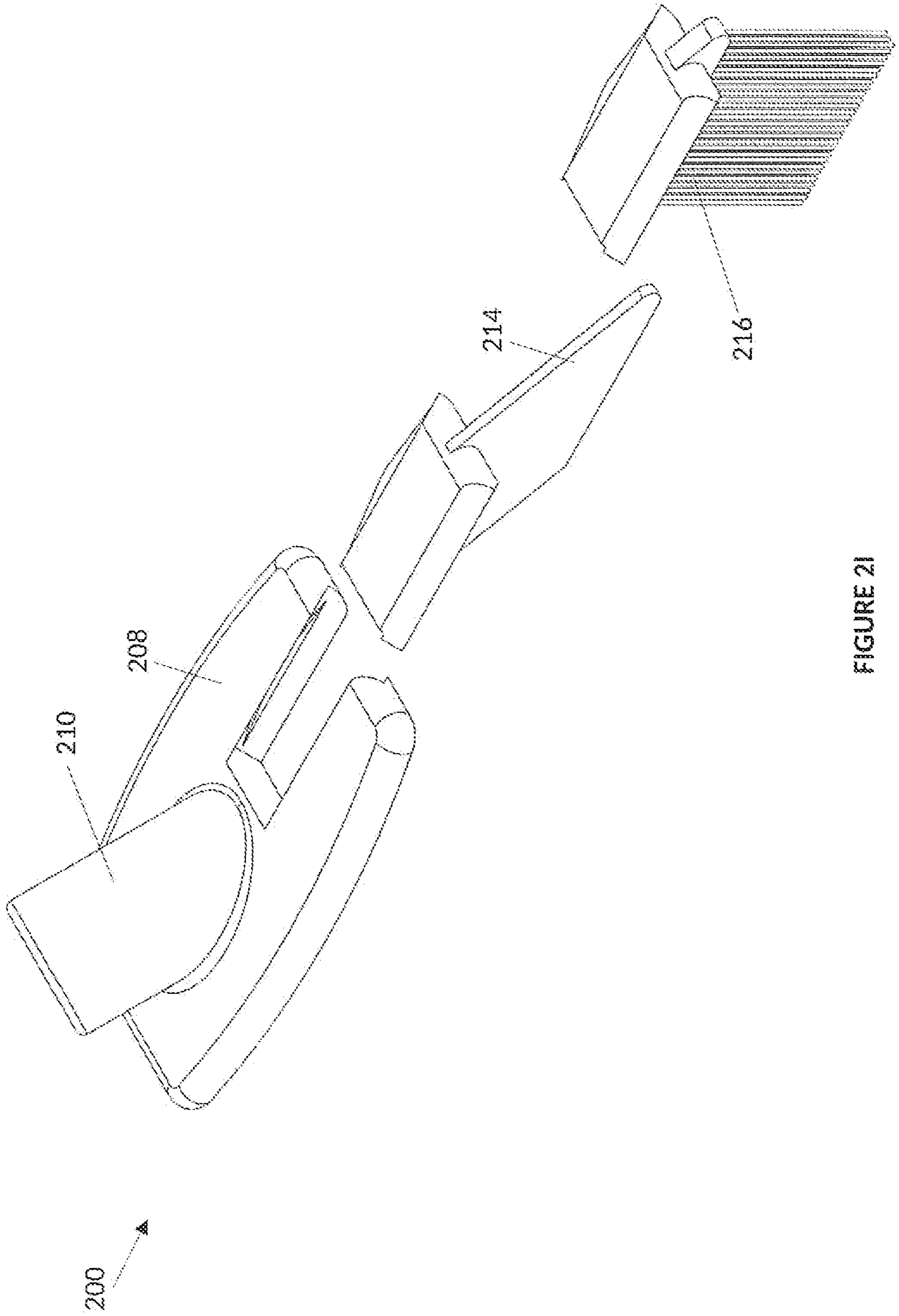
FIG. 2I is an image of a 3D model presenting the first tool end detached from the detachable blade of FIG. 2G and the detachable brush of FIG. 2H, and couplable to either option.

Referring now generally to the Figures and particularly to FIG. 2I, FIG. 2I is an image of a 3D model presenting an embodiment of the first tool end 200 as presented in FIGS. 2G and 2H, with the detachable blade 214 and the detachable brush 216 each detached, showing that either of these attachment ends might be coupled onto the same first tool end 200 interchangeably. Further labeled here for reference are the collar 210 and the baseplate 208.

Figures 3A, 3B, 3C:
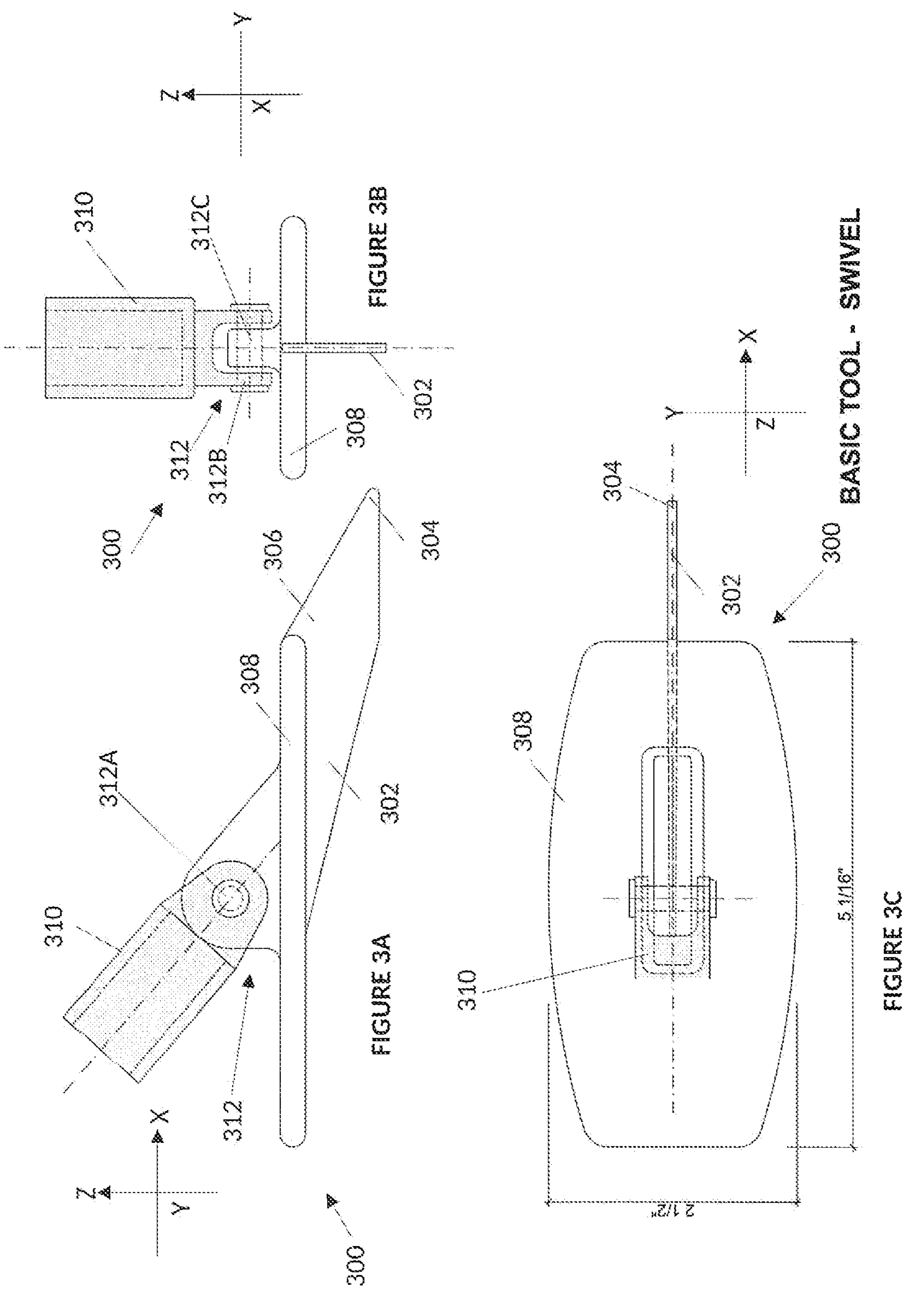
FIG. 3A is a side view of a second embodiment of the tool end for the tool of FIG. 1 which includes a swivel joint.
FIG. 3B is a front view of the second tool end of FIG. 3A.
FIG. 3C is a top view of the second tool end of FIG. 3A.

Referring now generally to the Figures and particularly to FIG. 3A, FIG. 3A is a side view of a second tool end 300, a preferred embodiment of the tool end 102 for the tool 100 of FIG. 1, which includes a swivel joint. It is noted that all measurements and ranges offered herein are for demonstrative or example purposes only, and should not be read as limitations on the scope of the invention. The second tool end 300 includes at least a second blade 302 with a second point 304 and a second slope 306, a second baseplate 308, and a second collar 310. The second tool end 300 further comprises a joint 312, allowing the second collar 310, and thus the handle 104 when the handle 104 is attached, to swivel or change angle relative to the second blade 302. The joint 312 further comprises at least a joint axle 312A, a top joint side 312B, and a bottom joint side 312C, such that the top joint side 312B and the bottom joint side 312C are coupled to each other indirectly via the joint axle 312A, and both the top joint side 312B and the bottom joint side 312C can pivot around the joint axle 312A. It is obvious to one skilled in the art that other varieties of hinge or joint might be considered suitable here besides the implementation shown, and that this also includes varieties having a broader range of motion, such as a ball joint. One possible embodiment of this is presented in FIGS. 4A through 4C.

It is noted that similar joint, swivel, or bendy features allowing for flexibility of the cleaning tool end relative to the part gripped by a user are known in the art of cleaning instruments overall, generally allowing a user to wield the tool more comfortably, providing accessibility making the tool suitable even for a less able-bodied user, and allowing the tool to be applied to less accessible spaces such as awkward corners and areas that are difficult to reach. The present invention has a similar intent generally in mind with this embodiment and others including joint or swivel features. It is further noted that the purpose or usefulness of this feature is not limited to the generally intuitive applicability mentioned above, though such applicability is a notable benefit of the described invention.

Referring now generally to the Figures and particularly to FIG. 3B, FIG. 3B is a front view of the second tool end of FIG. 3A. It is noted that all measurements and ranges offered herein are for demonstrative or example purposes only, and should not be read as limitations on the scope of the invention. Labeled here are the second tool end 300, the second blade 302, the second baseplate 308, the second collar 310, and further components of the joint 312 that are visible from this angle, specifically the top joint side 312B and the bottom joint side 312C.

Referring now generally to the Figures and particularly to FIG. 3C, FIG. 3C is a top view of the second tool end 300 of FIG. 3A. It is noted that all measurements and ranges offered herein are for demonstrative or example purposes only, and should not be read as limitations on the scope of the invention. Specifically, an exemplary second baseplate 308 width of 2½ inches and length of 5¹⁄₁₆ inches is suggested in the image, as an example of some dimensions considered suitable for this application. Labeled here are the second tool end 300, the second blade 302, the second point 304, the second baseplate 308, and the second collar 310.

Figure 3D:
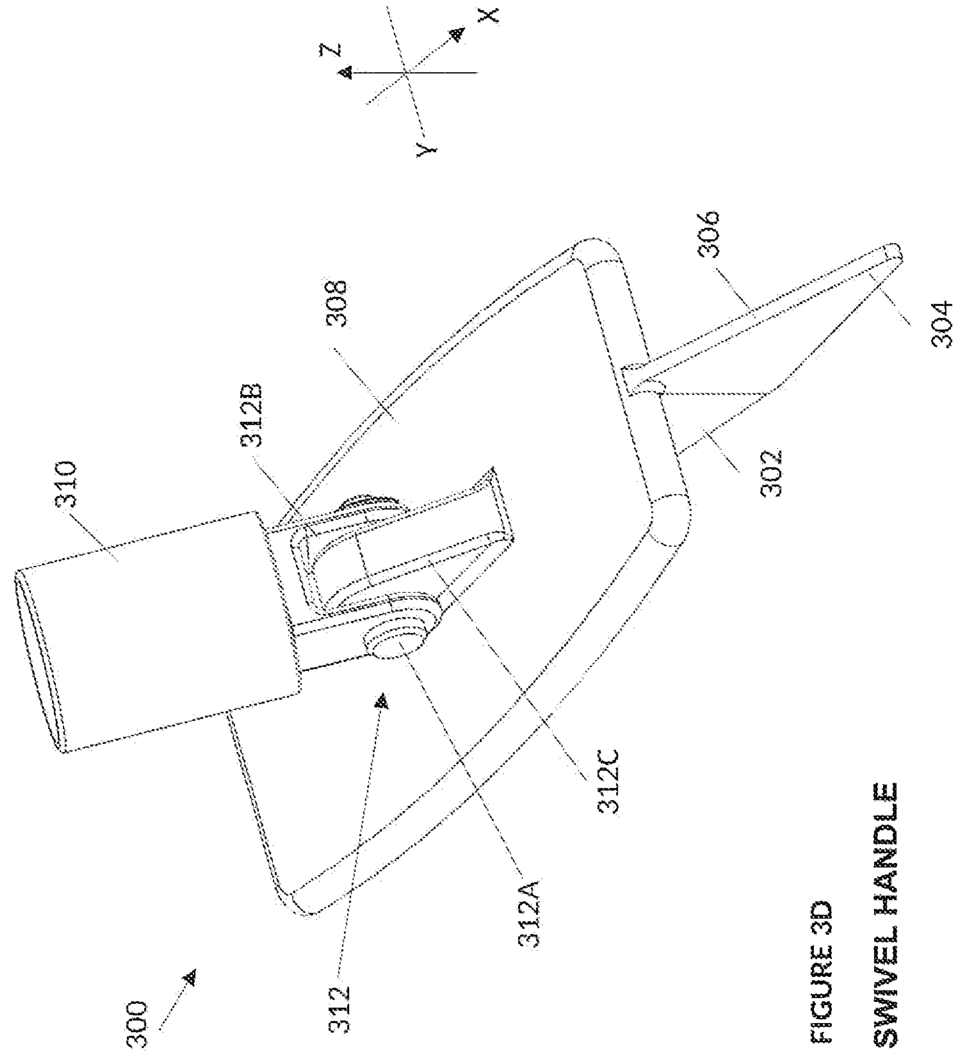
FIG. 3D is a first image of a 3D model of the second tool end of FIG. 3A.

Referring now generally to the Figures and particularly to FIG. 3D, FIG. 3D is a first image of a three-dimensional model of the second tool end 300 of FIG. 3A, as viewed from the front right and slightly above. Labeled here are the second tool end 300, the second blade 302, the second point 304, the second slope 306, the second baseplate 308, the second collar 310, and the joint 312 further consisting of the joint axle 312A, the top joint side 312B, and the bottom joint side 312C.

Figure 3E:
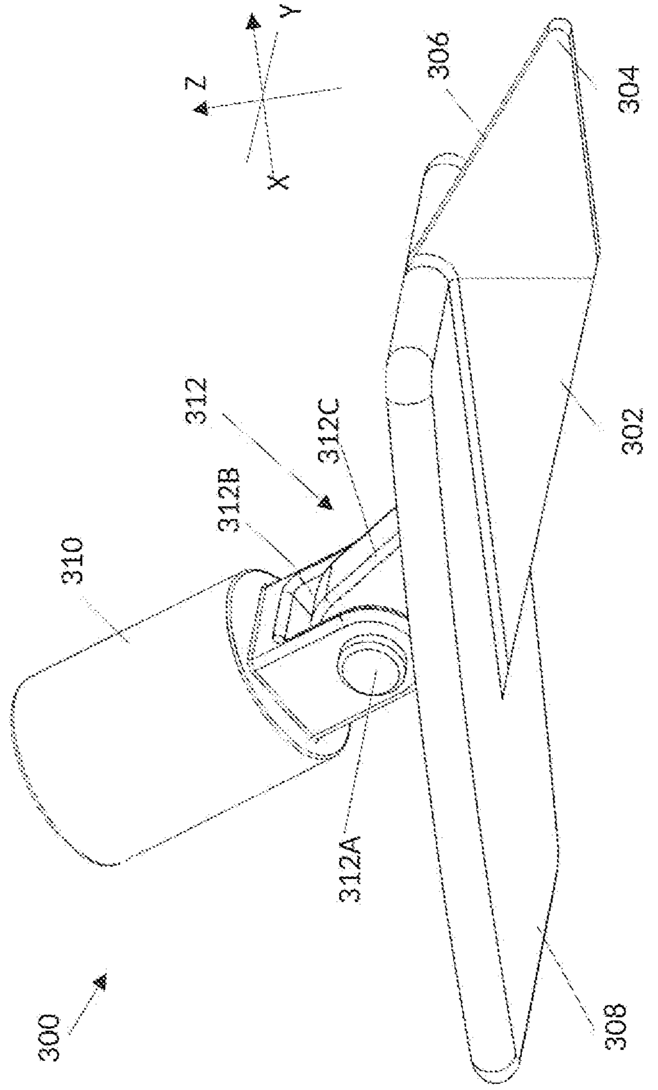
FIG. 3E is a second image of a 3D model of the second tool end of FIG. 3A.

Referring now generally to the Figures and particularly to FIG. 3E, FIG. 3E is a second image of a three-dimensional model of the second tool end 300 of FIG. 3A, as viewed from the front right and slightly below. Labeled here are the second tool end 300, the second blade 302, the second point

304, the second slope 306, the second baseplate 308, the second collar 310, and the joint 312 further consisting of the joint axle 312A, the top joint side 312B, and the bottom joint side 312C.

Figures 4A, 4B, 4C:
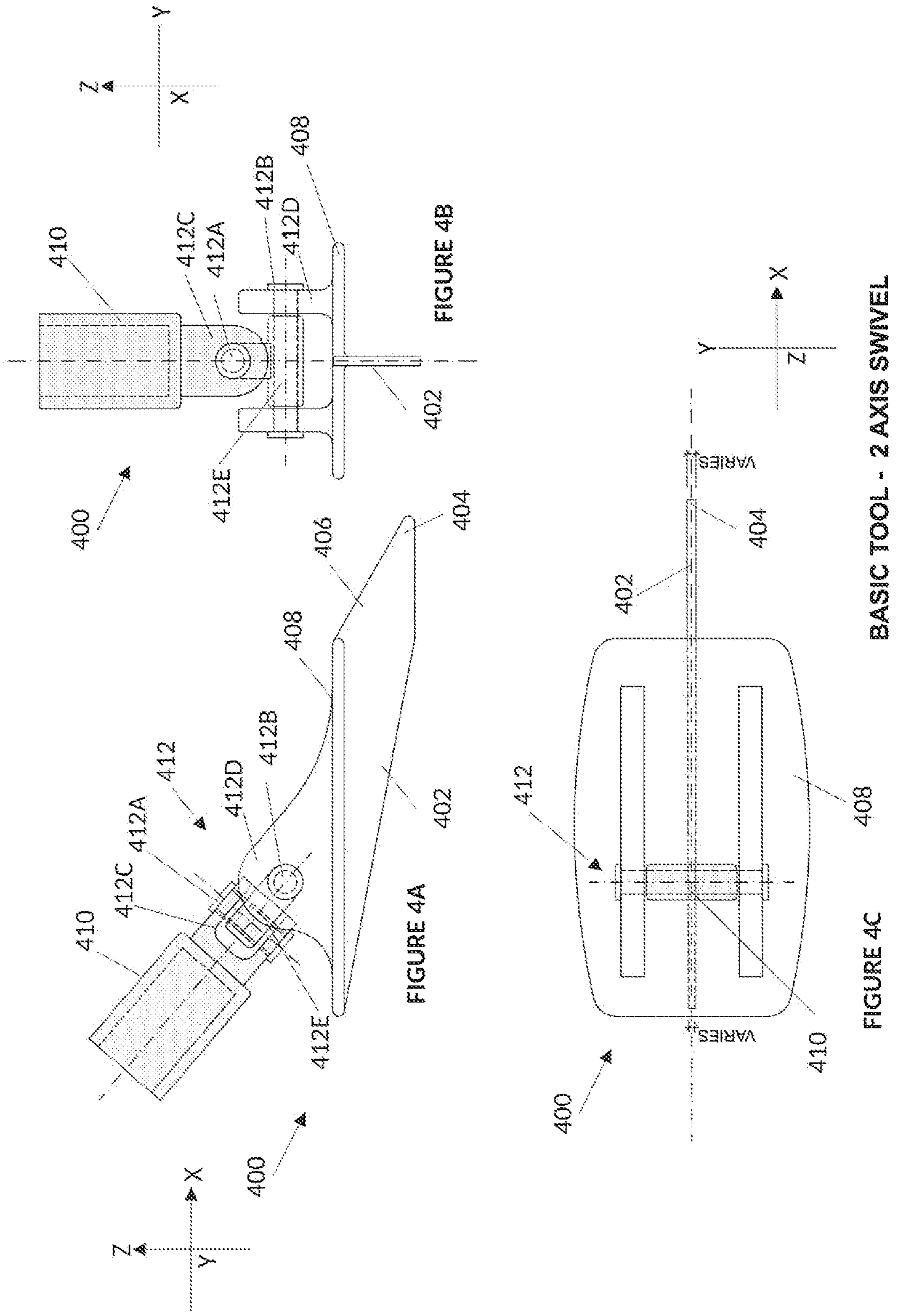
FIG. 4A is a side view of a third embodiment of the tool end for the tool of FIG. 1 having a two axis swivel joint.
FIG. 4B is a front view of the third tool end of FIG. 4A.
FIG. 4C is a top view of the third tool end of FIG. 4A.

Referring now generally to the Figures and particularly to FIG. 4A, FIG. 4A is a side view of a third tool end 400, a preferred embodiment of the tool end 102 for the tool 100 of FIG. 1, having a two axis swivel joint. The third tool end 400 includes at least a third blade 402 with a third point 404 and a third slope 406, a third baseplate 408, and a third collar 410. The third tool end 400 further comprises a two axis swivel joint 412, allowing the third collar 410, and thus the handle 104 when the handle 104 is attached, to swivel or change angle relative to the third blade 402. The two axis swivel joint 412 further comprises at least a vertical joint axle 412A, a horizontal joint axle 412B, a collar joint side 412C, a baseplate joint side 412D, and a joint connecting element 412E, such that the collar joint side 412C and the baseplate joint side 412D are coupled to each other indirectly via the other joint elements, and the collar joint side 412C and/or the baseplate joint side 412D can be pivoted with respect to each other around the axis of the vertical joint axle 412A (i.e. pivoting the handle 104 'up and down') and/or the horizontal joint axle (i.e. shifting the handle 104 'side to side'), or some combination of both, allowing greater flexibility of motion. The vertical joint axle 412A is the fulcrum of a one-dimensional joint formed by the joint connecting element 412E above and the baseplate joint side 412D below, similar to the joint 312 of FIG. 3A. The joint connecting element 412E is in turn the lower side, opposite the collar joint side 412C, of a second joint around the horizontal joint axle 412B, which is positioned substantively orthogonally to vertical joint axle 412A such that between them these two pivots provide different ranges of flexibility (i.e. 'up-and-down' and 'side-to-side'). It is obvious to one skilled in the art that other varieties of hinge or joint might be considered suitable here besides the implementation shown, and that this also includes varieties having a broader range of motion, such as a ball joint. It is noted that all measurements and ranges offered herein are for demonstrative or example purposes only, and should not be read as limitations on the scope of the invention.

Referring now generally to the Figures and particularly to FIG. 4B, FIG. 4B is a front view of the third tool end 400 of FIG. 4A. It is noted that all measurements and ranges offered herein are for demonstrative or example purposes only, and should not be read as limitations on the scope of the invention. Labeled in this image are the third tool end 400, the third blade 402, the third baseplate 408, the third collar 410, the vertical joint axle 412A, the horizontal joint axle 412B, the collar joint side 412C, the baseplate joint side 312D, and the joint connecting element 412E.

Referring now generally to the Figures and particularly to FIG. 4C, FIG. 4C is a top view of the third tool end of FIG. 4A. It is noted that all measurements and ranges offered herein are for demonstrative or example purposes only, and should not be read as limitations on the scope of the invention. Labeled in this image are the third tool end 400, the third blade 402, the third point 404, the third baseplate 408, the third collar 410, and the two axis swivel joint 412. As presented here, the third blade 402 preferably tapers in width from front to back, starting with a maximum width at the third point 204 and tapering to a minimum width at the rearmost part of the third blade 402.

Figure 4D:
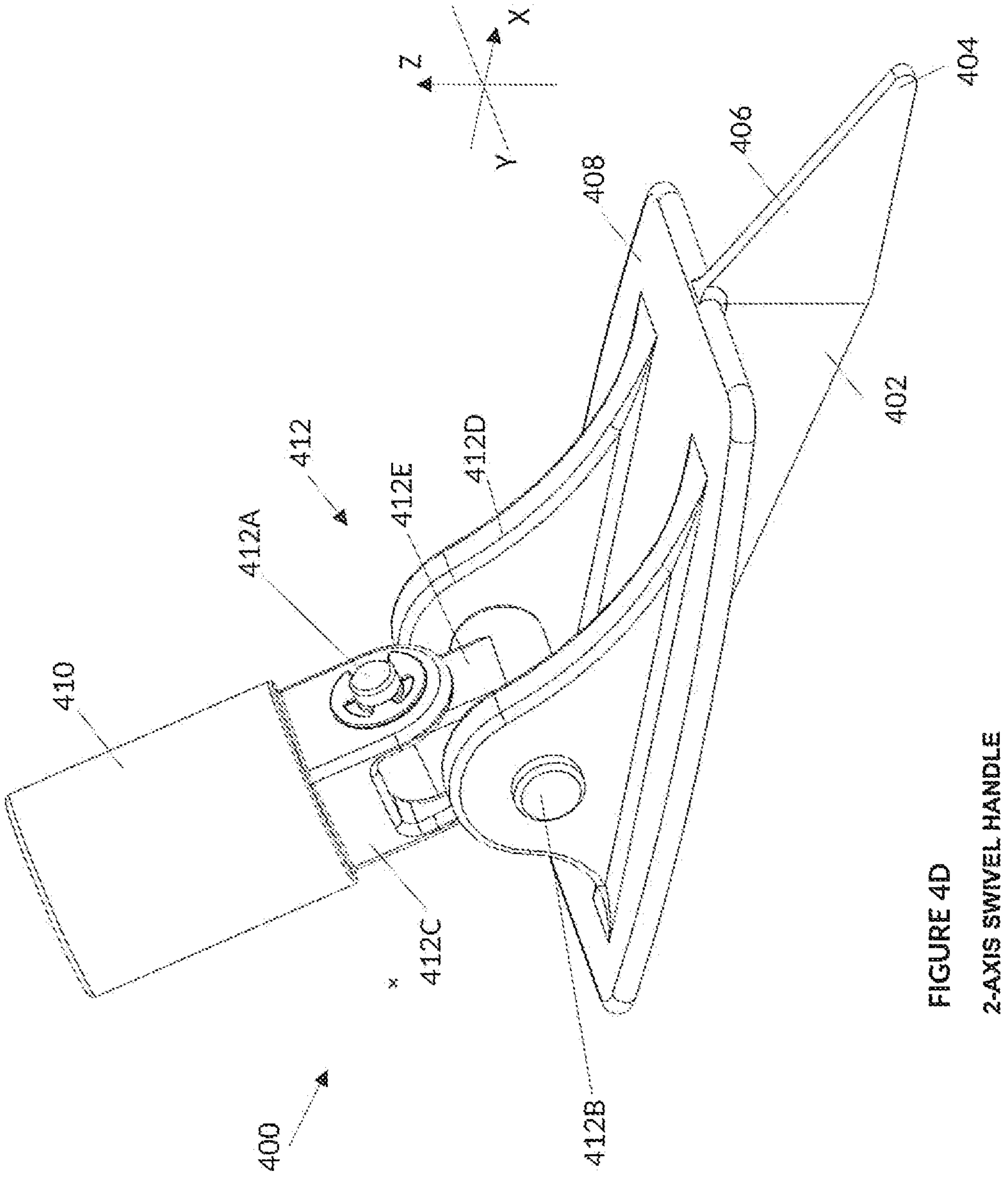
FIG. 4D is an image of a 3D model of the third tool end of FIG. 4A.

Referring now generally to the Figures and particularly to FIG. 4D, FIG. 4D is an image of a three-dimensional model of the third tool end 400 of FIG. 4A, as viewed from the front right. Labeled in this image are the third tool end 400, the third blade 402, the third point 404, the third baseplate 408, the third collar 410, and the two axis swivel joint 412, further comprising the vertical joint axle 412A, the horizontal joint axle 412B, the collar joint side 412C, the baseplate joint side 312D, and the joint connecting element 412E.

Figures 5A, 5B, 5C:
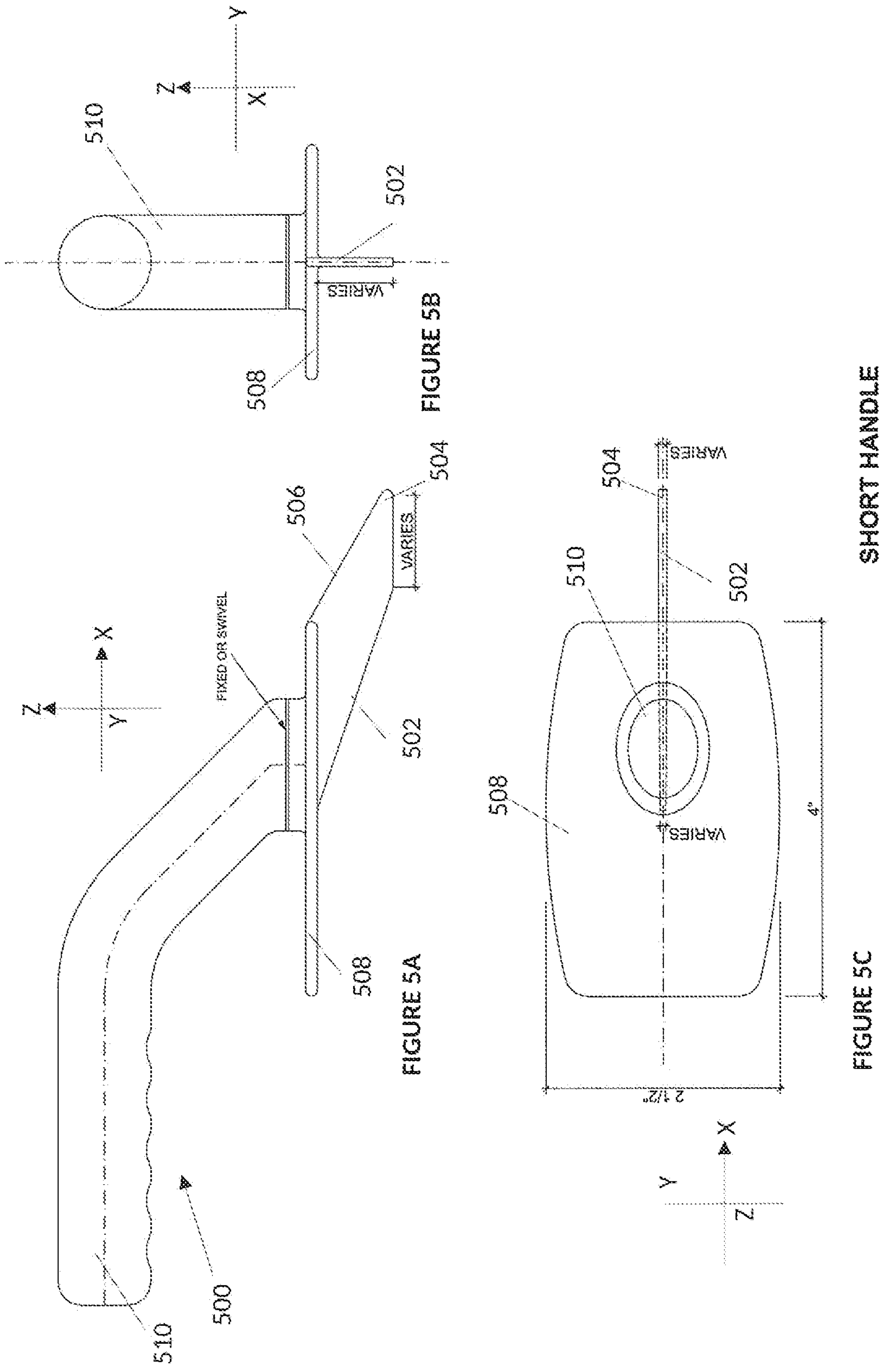
FIG. 5A is a side view of a short-handled handheld tool embodiment of the tool of FIG. 1.
FIG. 5B is a front view of the handheld tool of FIG. 5A.
FIG. 5C is a top view of the handheld tool of FIG. 5A.

Referring now generally to the Figures and particularly to FIG. 5A, FIG. 5A is a side view of a handheld tool 500, shaped to provide a similarly shaped tool end to the tool end 102 for the tool 100 of FIG. 1. This short-handled tool might be utilized by a user crouching down to clean the deck 106, rather than the tool 100 as shown being operated from a standing position in FIG. 1. The handheld tool 500 includes at least a handheld tool blade 502 with a handheld tool point 504 and a handheld tool slope 506, a handheld tool baseplate 508, and a hand grip 510. It is noted that all measurements and ranges offered herein are for demonstrative or example purposes only, and should not be read as limitations on the scope of the invention.

As the image notes, the connection point between the handheld tool baseplate 508 and the hand grip 510 may be a single fixed piece, or may have more range of motion built in, such as a swivel joint or flexible material. As this disclosure includes multiple such embodiments, it is understood that the scope of the invention includes incorporating features of one embodiment obviously into a different embodiment, such as extrapolating from presentation of a jointed long tool end such as that of FIG. 3A or 4A and a fixed-position short tool such as that of FIG. 5A, also a possible jointed short tool. No such embodiment should be considered excluded based on whether the Figures visually represent that particular embodiment; the Figures present only several examples and key concepts pertaining to practicing the invention claimed herein, and should not be assumed to be comprehensive or to be limiting by exclusion.

Referring now generally to the Figures and particularly to FIG. 5B, FIG. 5B is a front view of the handheld tool 500 of FIG. 5A. It is noted that all measurements and ranges offered herein are for demonstrative or example purposes only, and should not be read as limitations on the scope of the invention. Labeled here are the handheld tool blade 502, the handheld tool baseplate 508, and the hand grip 510.

Referring now generally to the Figures and particularly to FIG. 5C, FIG. 5C is a top view of the handheld tool 500 of FIG. 5A. It is noted that all measurements and ranges offered herein are for demonstrative or example purposes only, and should not be read as limitations on the scope of the invention. Specifically, this image offers the exemplary width measurement of 2½ inches and the exemplary length measurement of 4 inches as dimensions preferred by the inventor. Labeled here are the handheld tool blade 502, the handheld tool point 504, the handheld tool baseplate 508, and the hand grip 510.

Figure 5D:
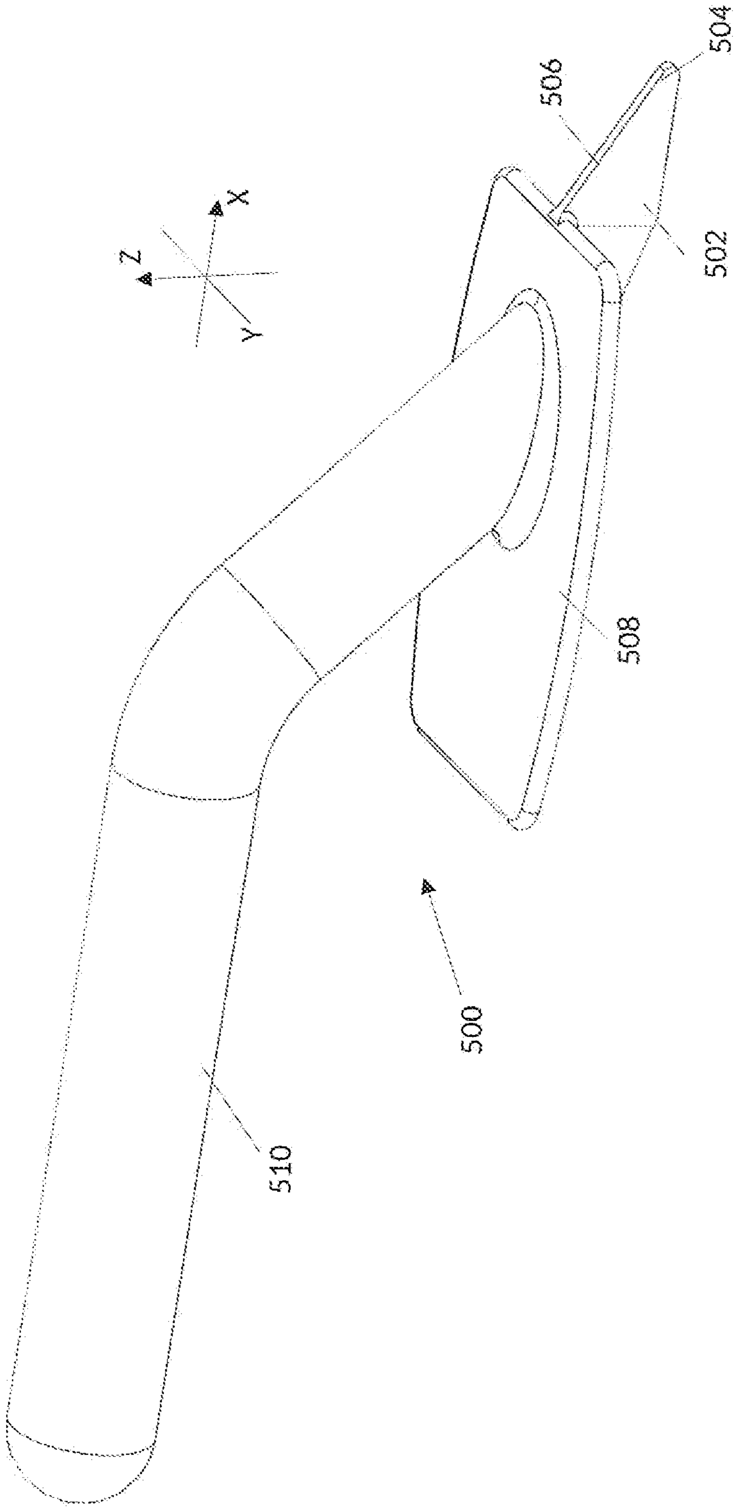
FIG. 5D is an image of a 3D model of the handheld tool of FIG. 5A.

Referring now generally to the Figures and particularly to FIG. 5D, FIG. 5D is an image of a three-dimensional model of the handheld tool 500 of FIG. 5A. Labeled here are the handheld tool blade 502, the handheld tool point 504, the handheld tool slope 506, the handheld tool baseplate 508, and the hand grip 510.

Figures 6A, 6B, 6C:
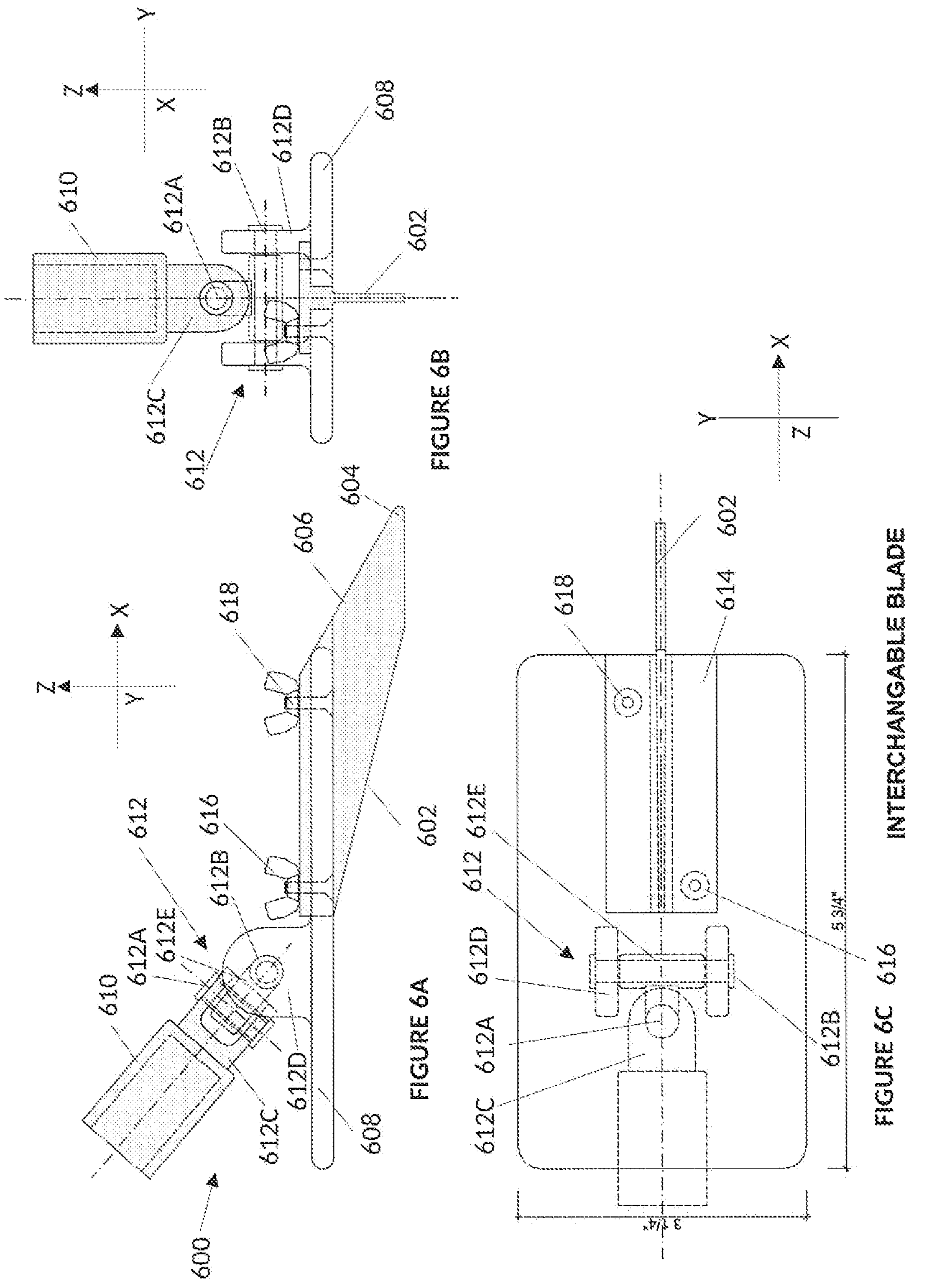
FIG. 6A is a side view of a fourth embodiment of the tool end for the tool of FIG. 1, further including the features of a flexible joint and a detachable blade component.
FIG. 6B is a front view of the fourth tool end of FIG. 6A.
FIG. 6C is a top view of the fourth tool end of FIG. 6A.

Referring now generally to the Figures and particularly to FIG. 6A, FIG. 6A is a side view of a fourth tool end 600, a preferred embodiment of the tool end 102 for the tool 100 of FIG. 1, further including the features of a flexible joint (one-axis swivel like FIG. 3A, two-axis swivel like FIG. 4A, or another type of joint) and a detachable blade component. The fourth tool end 600 includes at least a first detachable blade 602 with a first detachable blade point 604 and a first detachable blade slope 606, a fourth baseplate 608, and a fourth collar 610. It is noted that all measurements and ranges offered herein are for demonstrative or example purposes only, and should not be read as limitations on the scope of the invention. The fourth tool end 600 further comprises a fourth joint 612 (recognizing that the name reflects inclusion in the fourth tool end 600, not this element's being a fourth kind of joint), allowing the fourth collar 610, and thus the handle 104 when the handle 104 is attached, to swivel or change angle. The two axis swivel joint 612 further comprises at least a vertical joint axle 612A, a horizontal joint axle 612B, a collar joint side 612C, a baseplate joint side 612D, and a joint connecting element 612E, such that the collar joint side 612C and the baseplate joint side 612D are coupled to each other indirectly via the other joint elements, and the collar joint side 612C and/or the baseplate joint side 612D can be pivoted with respect to each other around the axis of the vertical joint axle 612A (i.e. pivoting the handle 104 'up and down') and/or the horizontal joint axle (i.e. shifting the handle 104 'side to side'), or some combination of both, allowing greater flexibility of motion. The vertical joint axle 612A is the fulcrum of a one-dimensional joint formed by the joint connecting element 612E above and the baseplate joint side 612D below, similar to the joint 312 of FIG. 3A. The joint connecting element 612E is in turn the lower side, opposite the collar joint side 612C, of a second joint around the horizontal joint axle 612B, which is positioned substantively orthogonally to vertical joint axle 612A such that between them these two pivots provide different ranges of flexibility (i.e. 'up-and-down' and 'side-to-side'). It is obvious to one skilled in the art that other varieties of hinge or joint might be considered suitable here besides the implementation shown, and that this also includes varieties having a broader range of motion, such as a ball joint. It is further noted that, depending on the type of joint mechanism, additional elements not stated above may be included. The fourth tool end 600 further includes the feature of the first detachable blade 602 being detachably coupled, such that a current blade might be detached or swapped out for a different blade. One benefit of this feature might be an ability to swap tool blades when switching between wooden and composite decks, and another might be allowing for more economical replacement of a blade that may wear out or break. The apparatus for detachably coupling the first detachable blade 602 as presented here includes inclusion of a blade coupling element 614 as a top portion of the first detachable blade 602, which couples detachably into or onto the fourth baseplate 608 by one or more wing nut assemblies 616 & 618 as shown, specifically a first wing nut assembly 616 and a second wing nut assembly 618. Each wing nut assembly of the wing nut assemblies 616 & 618 may comprise or include an aperture in or through the fourth baseplate 608, an aperture in or through the blade coupling element 614, and a wingnut, screw, or similar which traverses both and couples these elements detachably together. It is noted that the presented assembly for detachably coupling the first detachable blade 602 to the fourth tool end 600 is not the only possible assembly for accomplishing this, and might be considered an example of one; other coupling assemblies may be found suitable also, and the scope of the invention is not limited by providing of this example.

Referring now generally to the Figures and particularly to FIG. 6B, FIG. 6B is a front view of at least a portion of the fourth tool end 600 of FIG. 6A. It is noted that all measurements and ranges offered herein are for demonstrative or example purposes only, and should not be read as limitations on the scope of the invention. Labeled here are the first detachable blade 602, and the fourth baseplate 608. It is noted that some elements, including at least the fourth collar 610 and the fourth joint 612, have been omitted from this image for clarity.

Referring now generally to the Figures and particularly to FIG. 6C, FIG. 6C is a top view of at least a portion of the fourth tool end 600 of FIG. 6A. It is noted that all measurements and ranges offered herein are for demonstrative or example purposes only, and should not be read as limitations on the scope of the invention. It is noted that some elements, including at least the fourth collar 610 and the fourth joint 612, have been omitted from this image for clarity.

Figures 6D, 6E, 6F:
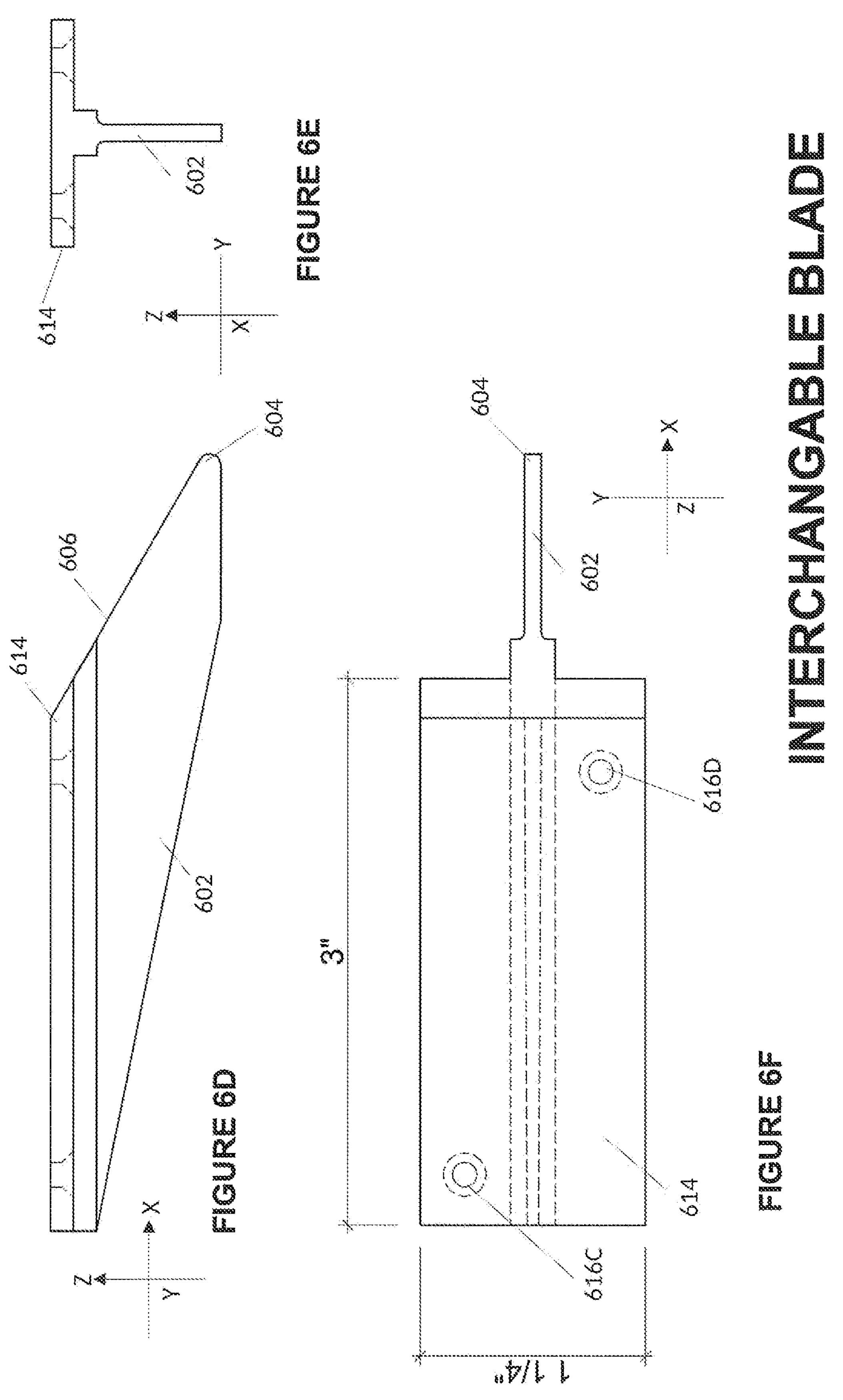
FIG. 6D is a side view of the detachable blade of the fourth tool end of FIG. 6A, shown in isolation.
FIG. 6E is a top view of the detachable blade of FIG. 6D.
FIG. 6F is a top view of the detachable blade of FIG. 6D.

Referring now generally to the Figures and particularly to FIG. 6D, FIG. 6D is a side view of the first detachable blade 602 of FIG. 6A, in a detached state and separated from the rest of the fourth tool end 600. Labeled are the first detachable blade 602, the first detachable blade point 604, and the first detachable blade slope 606 for reference, as well as the blade coupling element 614 by which the first detachable blade 602 is coupled to the fourth tool end 600.

Referring now generally to the Figures and particularly to FIG. 6E, FIG. 6E is a front view of the detached detachable blade of FIG. 6D. Labeled are the first detachable blade 602 and the blade coupling element 614.

Referring now generally to the Figures and particularly to FIG. 6F, FIG. 6F is a top view of the first detachable blade 602 of FIG. 6D. It is noted that all measurements and ranges offered herein are for demonstrative or example purposes only, and should not be read as limitations on the scope of the invention. Specifically, 3 inches is recommended as an example of a suitable length, and 1¼ inch is recommended as an example of a suitable width, but these are examples only. Labeled are the first detachable blade 602, the first detachable blade point 604, and the blade coupling element 614.

Figure 6G:
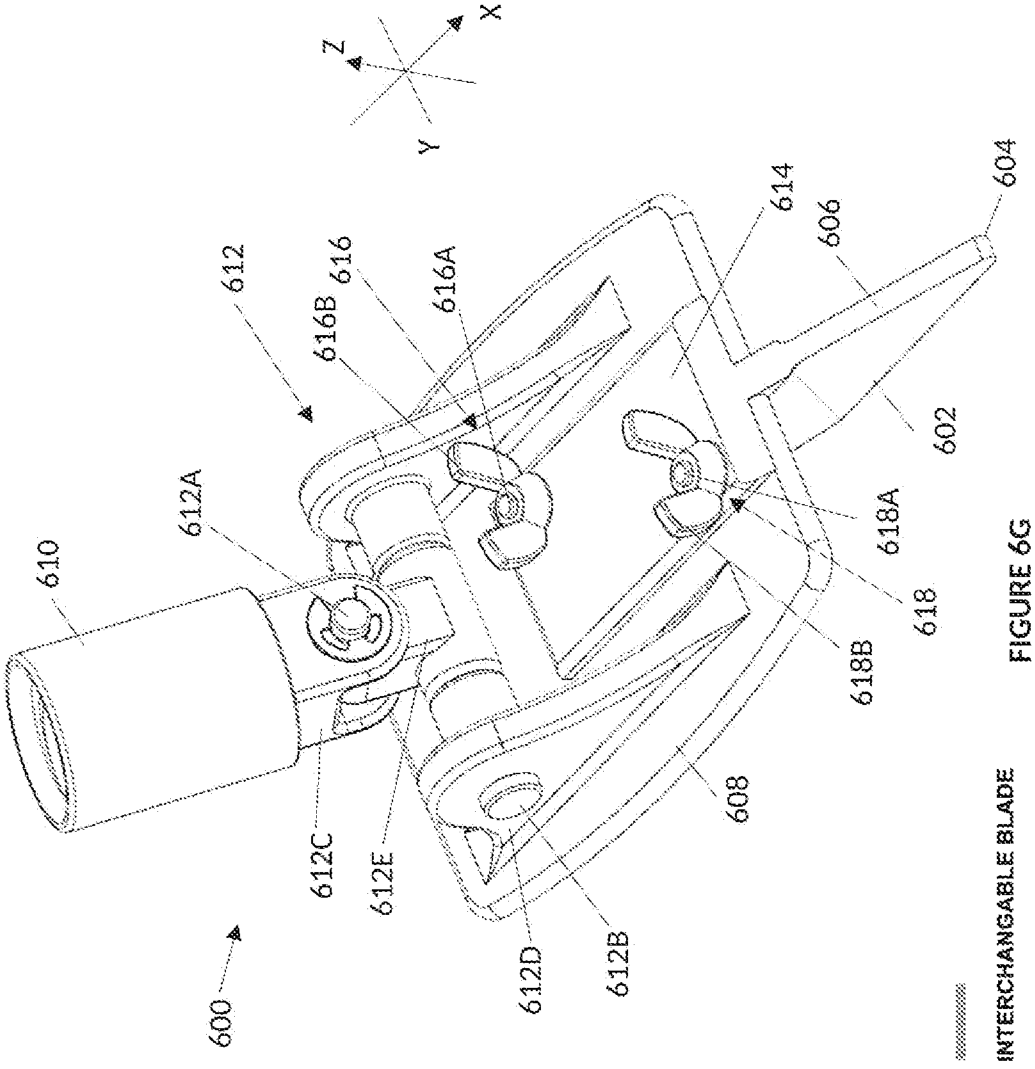
FIG. 6G is an image of a 3D model of the fourth tool end of FIG. 6A.

Referring now generally to the Figures and particularly to FIG. 6G, FIG. 6G is an image of a three-dimensional model of the fourth tool end of FIG. 6A. Labeled are the first detachable blade 602, the first detachable blade point 604, the first detachable blade slope 606, the fourth baseplate 608, the fourth collar 610, the fourth joint 612, the vertical joint axle 612A, the horizontal joint axle 612B, the collar joint side 612C, the baseplate joint side 612D, the joint connecting element 612E, the blade coupling element 614, and the wing nut assemblies 616 & 618. Further labeled here in the wing nut assemblies 616 & 618 are a first wing nut assembly screw 616A, a second wing nut assembly screw 618A, a first wing nut assembly nut 616B, and a second wing nut assembly nut 618B. As noted previously, each wing nut assembly of the wing nut assemblies 616 & 618 may comprise or include an aperture in or through the fourth baseplate 608, an aperture in or through the blade coupling element 614, and a screw or similar such as the first wing nut assembly screw 616A as pictured here which traverses both the fourth baseplate 608 and the blade coupling element 614 and couples these elements detachably together. It is noted that the presented assembly for detachably coupling the first detachable blade 602 to the fourth tool end 600 is not the only possible assembly for accomplishing this, and might be considered an example of one; other coupling assemblies may be found suitable also, and the scope of the invention is not limited by providing of this example.

Figure 6H:
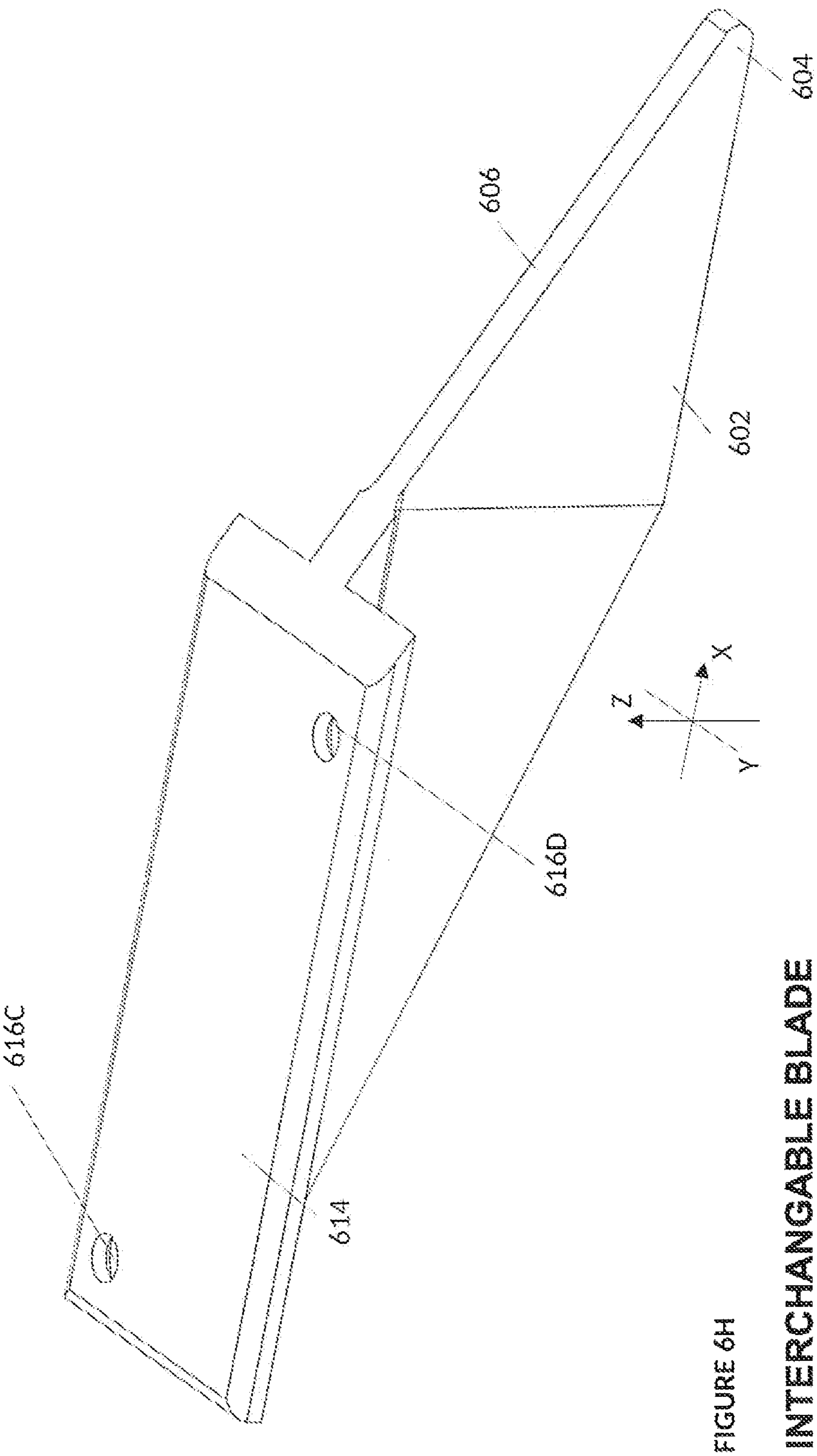
FIG. 6H is an image of a 3D model of the detachable blade of FIG. 6D.

Referring now generally to the Figures and particularly to FIG. 6H, FIG. 6H is an image of a three-dimensional model of the detachable blade 602 of FIG. 6D, shown detached from the fourth tool 600. Labeled are the first detachable blade 602, the first detachable blade point 604, the first detachable blade slope 606, the blade coupling element 614, and a first wing nut assembly aperture 616C and a second wing nut assembly aperture 616D. As noted previously, each wing nut assembly of the wing nut assemblies 616 & 618 may comprise or include an aperture in or through the fourth baseplate 608, an aperture in or through the blade coupling element 614, and a screw or similar which traverses both the fourth baseplate 608 and the blade coupling element 614 and couples these elements detachably together, such as through the first wing nut assembly aperture 616C and the second wing nut assembly aperture 616D as pictured here. It is noted that the presented assembly for detachably coupling the first detachable blade 602 to the fourth tool end 600 is not the only possible assembly for accomplishing this, and might be considered an example of one; other coupling assemblies may be found suitable also, and the scope of the invention is not limited by providing of this example.

Figure 7:
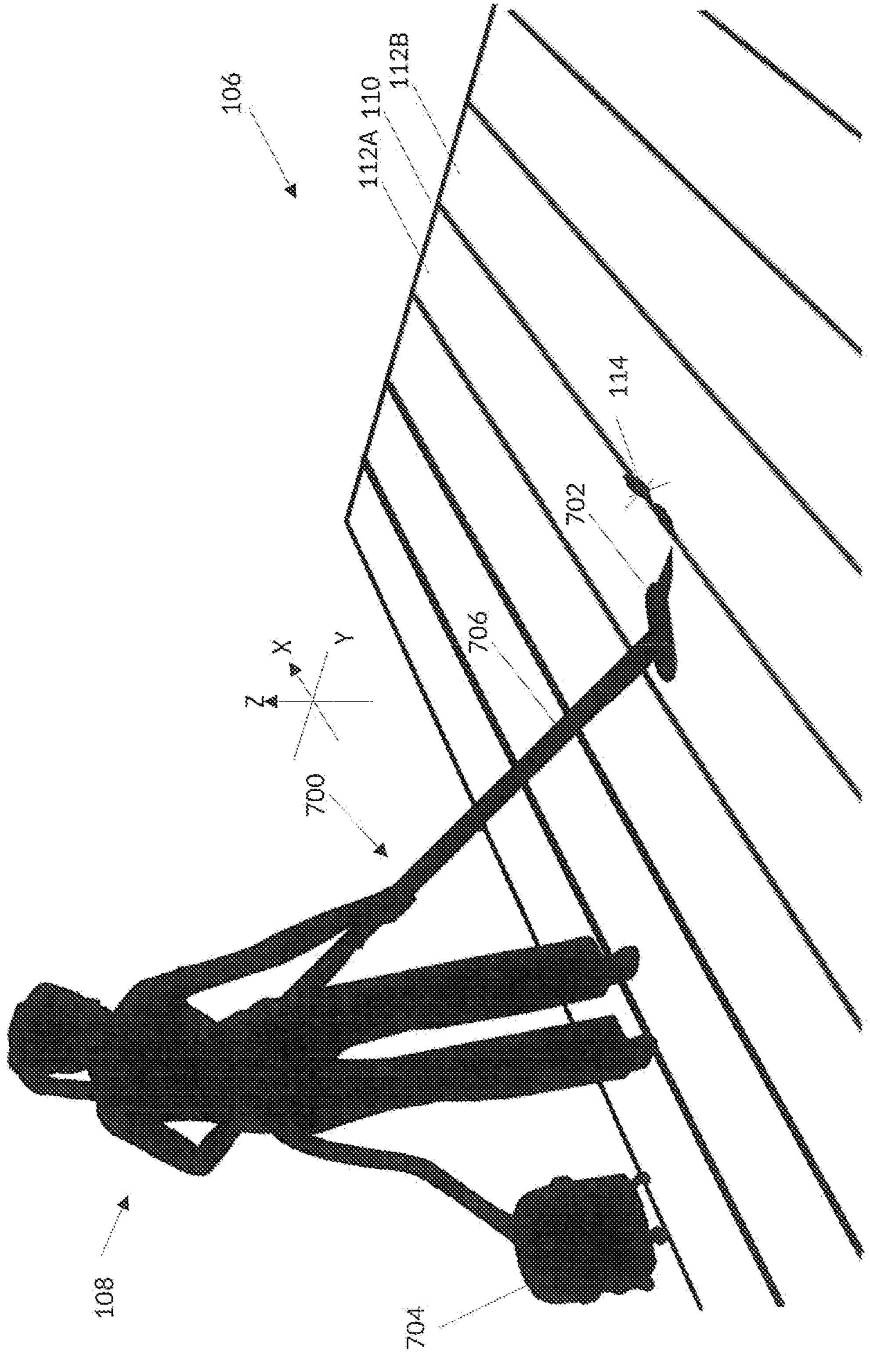
FIG. 7 is an overview diagram presenting a second invented tool incorporating a vacuum cleaner, being used in context for cleaning a deck.

Referring now generally to the Figures and particularly to FIG. 7, FIG. 7 is an overview diagram presenting a second, vacuum-based embodiment 700 of the invented tool (hereinafter, "the vacuum tool 700"), comprising a vacuum tool end 702 coupled with a vacuum cleaner 704, being used in a similar context to FIG. 1, namely for cleaning the deck 106. In preferred operation, the user 108 couples a tube 706 attachment of the vacuum cleaner 704 to the top of the vacuum tool end 702, then fits the vacuum tool end 702 into the gap 110 between the boards 112, and pushes the vacuum tool 700 forward by means of a grip on a portion of the vacuum cleaner 704, similar to operating the vacuum cleaner 704 to vacuum a floor, utilizing the vacuum tool end 702 to pry any material 114 such as dirt and dead leaves up and out from between the boards 112, where these might then be sucked up by the vacuum cleaner 704 and thus removed from the deck 106. It is noted that several different models of vacuum cleaner as generally known in the art and available commercially might be found suitable for use as the vacuum cleaner 704 presented here, such as a SHOP-VAC® vacuum cleaner marketed by SHOP-VAC, Inc., of Williamsport, PA, or other suitable vacuum cleaner known in the art. More particularly, the intent is that the vacuum tool end 702 be coupled or fitted onto the end of the tube 706, which might be a hose attachment or tube/wand attachment which several if not most standard vacuum cleaners have some version of for use in vacuuming narrow or hard-to-reach areas such as corners and ceilings. It is noted that, accordingly, some standard sizes or dimensions of connector may be preferred for fitting onto specific popular models of vacuum cleaner, or for fitting multiple models of vacuum cleaner which may share a certain standard hose size. This disclosure includes several different tool end 702 embodiments, such as to present tool shaping preferred for cleaning a wooden as opposed to a composite deck 106, or present additional features such as a joint or a brush. It is understood that any embodiment or feature of the invented tool end outlined and described herein might be fitted into the context presented in FIG. 7 as the vacuum tool end 702, included those tool ends presented in the context of use with a handle, leaf blower, or something else, as deemed appropriate. It is noted and understood that the above summary is intended only as a general introductory overview regarding the 'big picture' of this invention and its intended method of use to provide context, and nothing stated above should be construed as definitive or limiting. It is noted also that the described tool, or a variation thereof, might have other applications, and the invented tool is not limited to use on deck boards.

Figure 8:
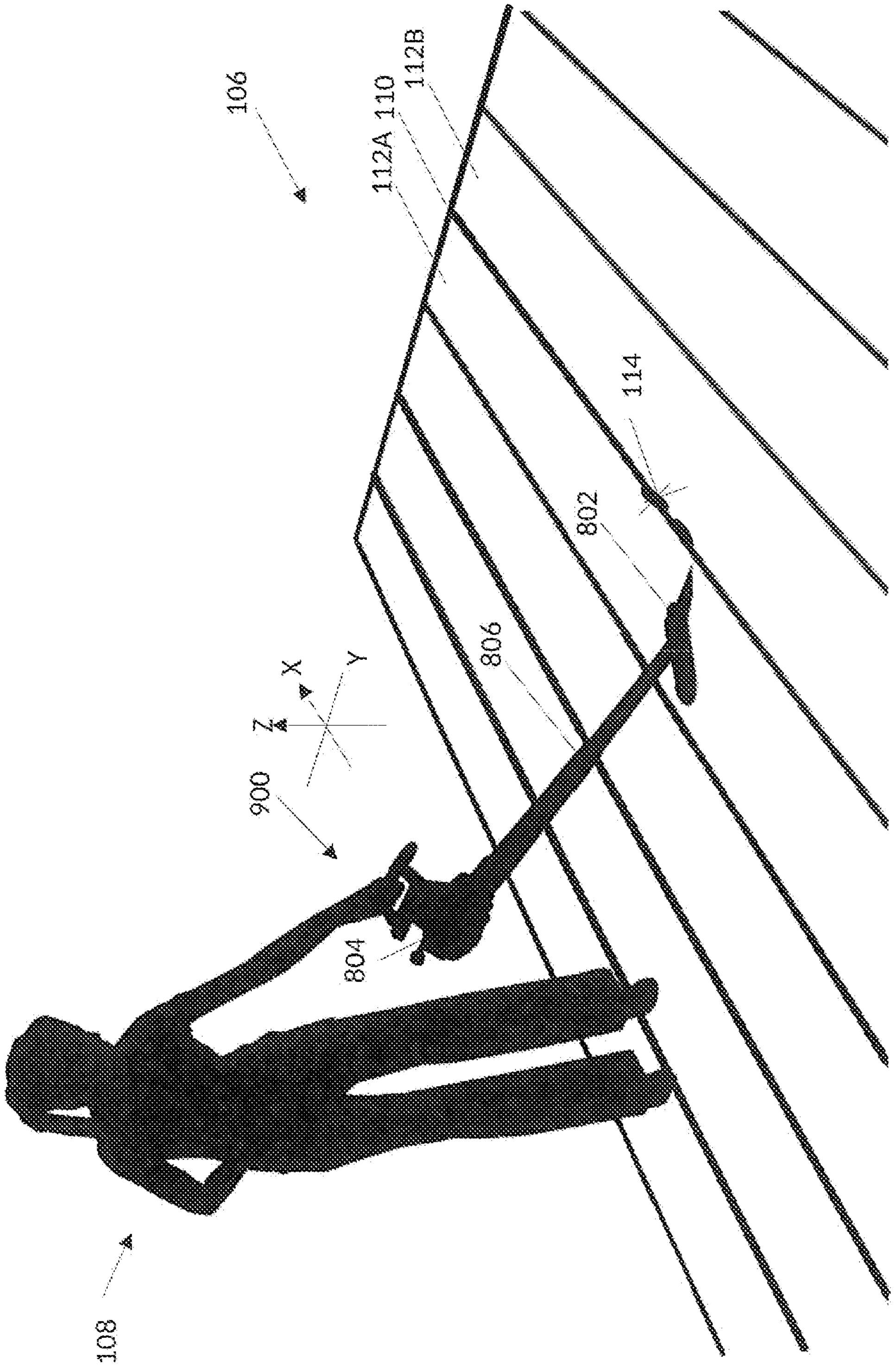
FIG. 8 is an overview diagram presenting a third invented tool incorporating a leaf blower, being used in context for cleaning a deck.

Referring now generally to the Figures and particularly to FIG. 8, FIG. 8 is an overview diagram presenting a third, leaf-blower-based embodiment 700 of the invented tool (hereinafter, "the blower tool 700"), comprising a blower tool end 802 coupled with a leaf blower 804, being used in a similar context to FIG. 1, namely for cleaning the deck 106. In preferred operation, the user 108 couples a tube 806 attachment of the leaf blower 804 to the top of the blower tool end 802, then fits the blower tool end 802 into the gap 110 between the boards 112 and uses the blower tool end 802 to pry any material 114 such as dirt and dead leaves up and out from between the boards 112, where these might then be dispersed or removed from the deck 106 by the leaf blower 804. It is noted that several different models of leaf blower as generally known in the art and available commercially might be found suitable for use as the leaf blower 804 presented here, such as a DeWalt 20V MAX DCE100B 135 mph 100 CFM 20 V Battery Handheld Blower marketed by DeWalt Corporation of Towson, Maryland, USA, or other suitable leaf blower known in the art. More particularly, the intent is that the blower tool end 802 be coupled or fitted onto the end of the tube 806, which might be a hose attachment or tube/wand attachment, or onto a generally tube-shaped element of the leaf blower 804. It is noted that, accordingly, some standard sizes or dimensions of connector may be preferred for fitting onto specific popular models of leaf blower, or for fitting multiple models of leaf blower which may share a certain standard hose/tube size. This disclosure includes several different blower tool end 802 embodiments, such as to present tool shaping preferred for cleaning a wooden as opposed to a composite deck 106, or present additional features such as a joint or a brush. It is understood that any embodiment or feature of the invented tool end outlined and described herein might be fitted into the context presented in FIG. 8 as the blower tool end 802, included those tool ends presented in the context of use with a handle, vacuum cleaner, or something else, as deemed appropriate. It is noted and understood that the above summary is intended only as a general introductory overview regarding the 'big picture' of this invention and its intended method of use to provide context, and nothing stated above should be construed as definitive or limiting. It is noted also that the described tool, or a variation thereof, might have other applications, and the invented tool is not limited to use on deck boards.

Figures 9A, 9B, 9C, 9D:
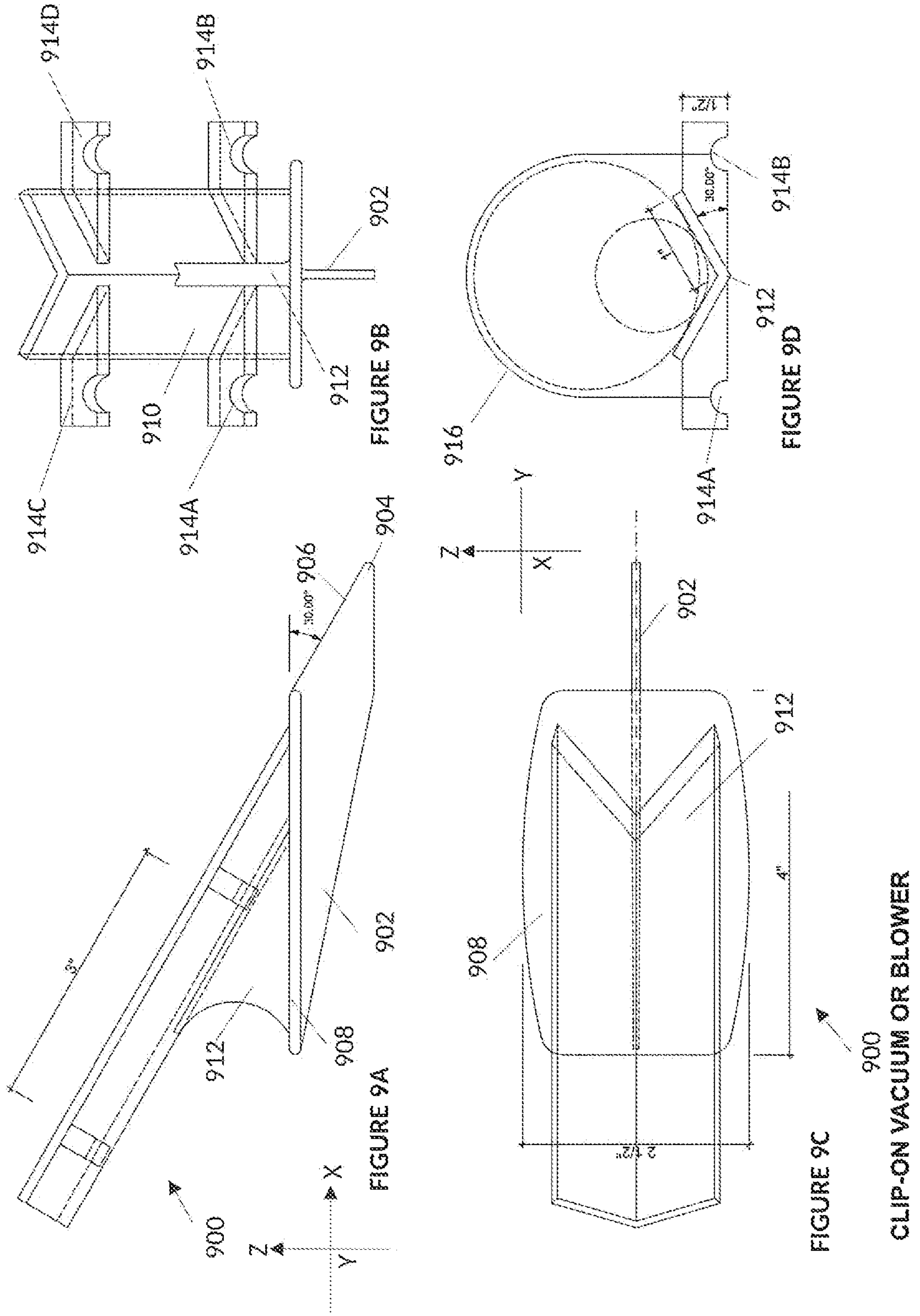
FIG. 9A is a side view of a preferred embodiment of the tool end attachment of FIG. 7 or FIG. 8, having a clip-on attachment mechanism.
FIG. 9B is a rear view of the tool end attachment of FIG. 9A.
FIG. 9C is a top view of the tool end attachment of FIG. 9A.
FIG. 9D is a detail of FIG. 9A.

Referring now generally to the Figures and particularly to FIG. 9A, FIG. 9A is a side view of a first preferred embodiment of the vacuum tool end 702 of FIG. 7 or the blower tool end 802 of FIG. 8, specifically a clip-on tool end 900. The clip-on tool end 900 includes at least a clip-on tool end blade 902 with a clip-on tool end point 904 and a clip-on tool end slope 906, and a clip-on tool end baseplate 908. A gusset 912 comprises a V-shaped channel 914 and strap notches 914 (specifically, a first strap notch 914A, a second strap notch 914B, a third strap notch 914C, and a fourth strap notch 914D). The clip-on tool end gusset 912 is shaped and sized to fit the first vacuum tool end 900 onto the vacuum tube 706 or the blower tube 806.

One or more clip-on tool end strapping elements 916 such as but not limited to rubber bands may be used, anchored by the strap notches 914, to secure the tube 706 detachably in place on or within the gusset 912. This implementation provides at least the benefit of compatibility with a broad variety of different possible models of the vacuum tube 706 or the blower tube 806, as the strapping elements 916 can be adjusted to fit most tube sizes or shapes, and this kind of coupling structure might be used or combined with other embodiments as considered appropriate, even though only presented in this one. It is noted that all measurements, ranges, and drawing annotations offered herein are for demonstrative or example purposes only, and should not be read as limitations on the scope of the invention.

Referring now generally to the Figures and particularly to FIG. 9B, FIG. 9B is a rear view of the clip-on tool end 900 of FIG. 9A. It is noted that all measurements and ranges offered herein are for demonstrative or example purposes only, and should not be read as limitations on the scope of the invention. Labeled here are the clip-on tool end collar 910, the clip-on tool end gusset 912, the clip-on tool end baseplate 908, the clip-on tool end blade 902, and the strap notches 914 (specifically, the first strap notch 914A, the second strap notch 914B, the third strap notch 914C, and the fourth strap notch 914D).

Referring now generally to the Figures and particularly to FIG. 9C, FIG. 9C is a top view of the clip-on tool end 900 of FIG. 9A. It is noted that all measurements and ranges offered herein are for demonstrative or example purposes only, and should not be read as limitations on the scope of the invention. Labeled here are the clip-on tool end gusset 912, the clip-on tool end baseplate 908, and the clip-on tool end blade 902.

Referring now generally to the Figures and particularly to FIG. 9D, FIG. 9D is a detail of FIG. 9A, specifically a front view diagram of the strap notches 914A & 914B, the gusset 912, and the strapping elements 916, as positioned around the vacuum tube 706 or the blower tube 806. It is noted that all measurements and ranges offered herein are for demonstrative or example purposes only, and should not be read as limitations on the scope of the invention.

Figure 9E:
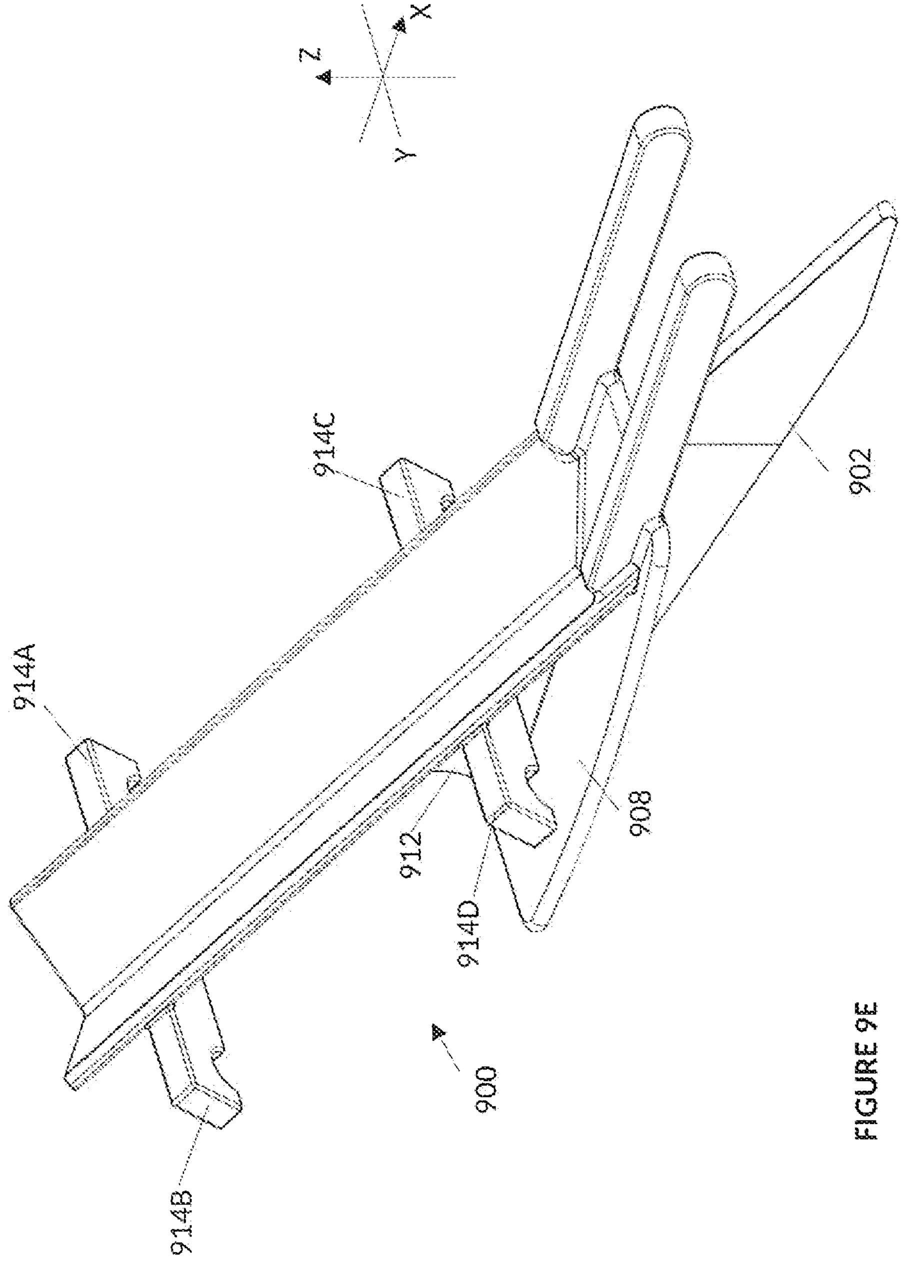
FIG. 9E is an image of a 3D model of the tool end attachment of FIG. 9A.

Referring now generally to the Figures and particularly to FIG. 9E, FIG. 9E is an image of a three-dimensional model of the tool end attachment of FIG. 9A. Labeled here are the clip-on tool end collar 910, the clip-on tool end gusset 912, the clip-on tool end baseplate 908, the clip-on tool end blade 902, and the strap notches 914 (specifically, the first strap notch 914A, the second strap notch 914B, the third strap notch 914C, and the fourth strap notch 914D).

Figures 10A, 10B, 10C, 10D:
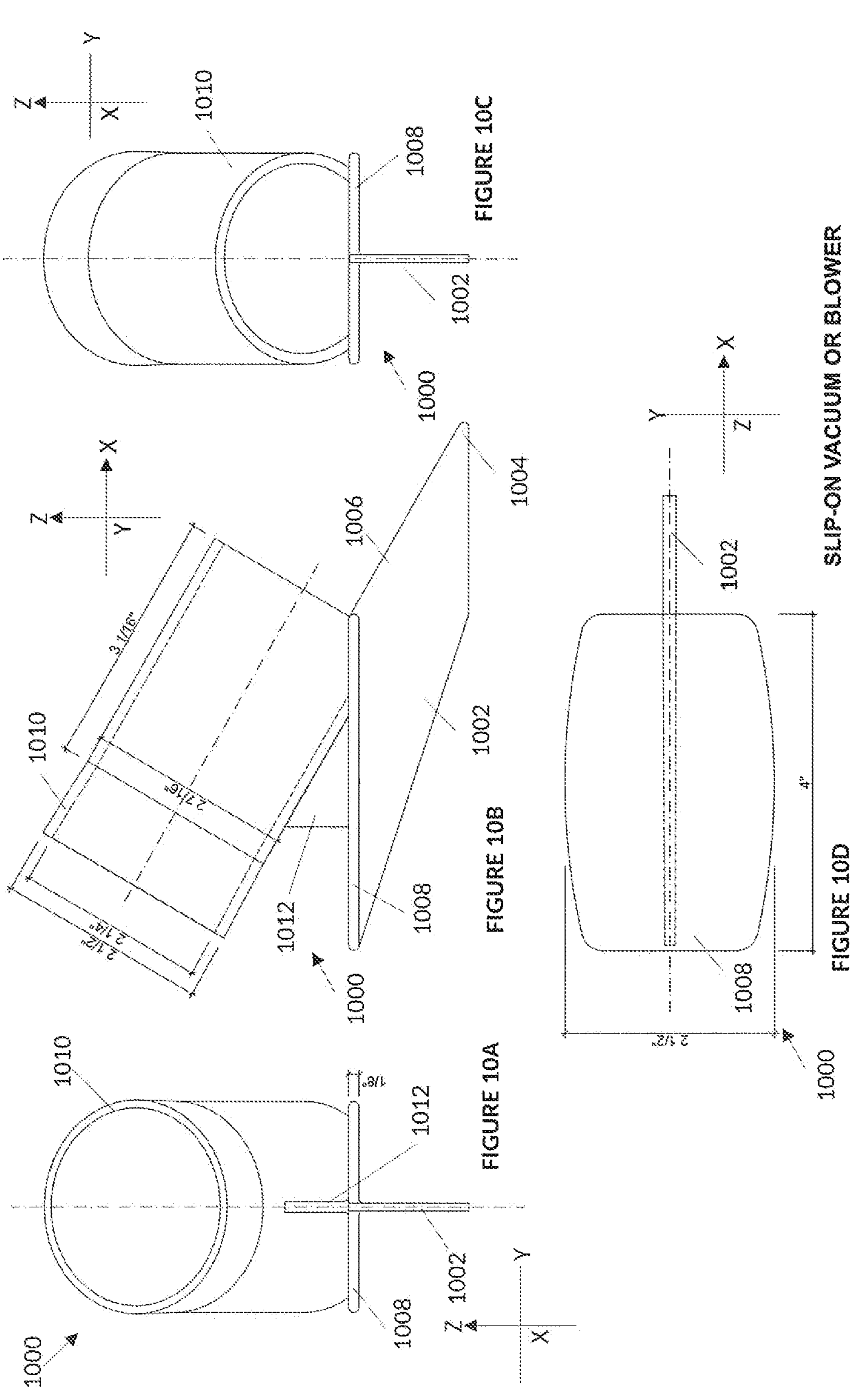
FIG. 10A is a rear view of a second preferred embodiment of the tool end attachment of FIG. 7 or 8, having a slip-on attachment mechanism.
FIG. 10B is a side view of the tool end attachment of FIG. 10A.
FIG. 10C is a front view of the tool end attachment of FIG. 10A.
FIG. 10D is a top view of the tool end attachment of FIG. 10A.

Referring now generally to the Figures and particularly to FIG. 10A, FIG. 10A is a rear view of a second preferred embodiment of the vacuum tool end 702 of FIG. 7 or the blower tool end 802 of FIG. 8, specifically a slip-on tool end 1000 having a sleeve shaped for 'slipping onto' a compatible hose, tube, or similar attachment. It is noted that this embodiment is named the "slip-on tool end" for being the first embodiment herein to introduce the feature of a friction-fit sleeve, but is not the only embodiment herein to include this feature. The slip-on tool end 1000 includes at least a slip-on tool end blade 1002 with a slip-on tool end point 1004 and a slip-on tool end slope 1006 (not shown in FIG. 10A; the slip-on tool end point 1004 and the slip-on tool end slope 1006 are first labeled in FIG. 10B), a slip-on tool end baseplate 1008, a slip-on tool end collar 1010, and a slip-on tool end gusset 1012. The slip-on tool end collar 1010 works as a friction fit, comprising a tube shape with a slight taper as shown, such that the vacuum tube 706 or the blower tube 806 can be snugly fitted into the slip-on tool end collar 1010. It is noted that all measurements and ranges offered herein are for demonstrative or example purposes only, and should not be read as limitations on the scope of the invention.

Referring now generally to the Figures and particularly to FIG. 10B, FIG. 10B is a side view of the slip-on tool end 1000 of FIG. 10A. It is noted that all measurements and ranges offered herein are for demonstrative or example purposes only, and should not be read as limitations on the scope of the invention. Labeled here are the slip-on tool end 1000, the slip-on tool end blade 1002, the slip-on tool end point 1004, the slip-on tool end slope 1006, the slip-on tool end baseplate 1008, the slip-on tool end collar 1010, and the slip-on tool end gusset 1012.

Referring now generally to the Figures and particularly to FIG. 10C, FIG. 10C is a front view of the slip-on tool end 1000 of FIG. 10A. It is noted that all measurements and ranges offered herein are for demonstrative or example purposes only, and should not be read as limitations on the scope of the invention. Labeled here are the slip-on tool end 1000, the slip-on tool end blade 1002, the slip-on tool end baseplate 1008, and the slip-on tool end collar 1010.

Figure 10E:
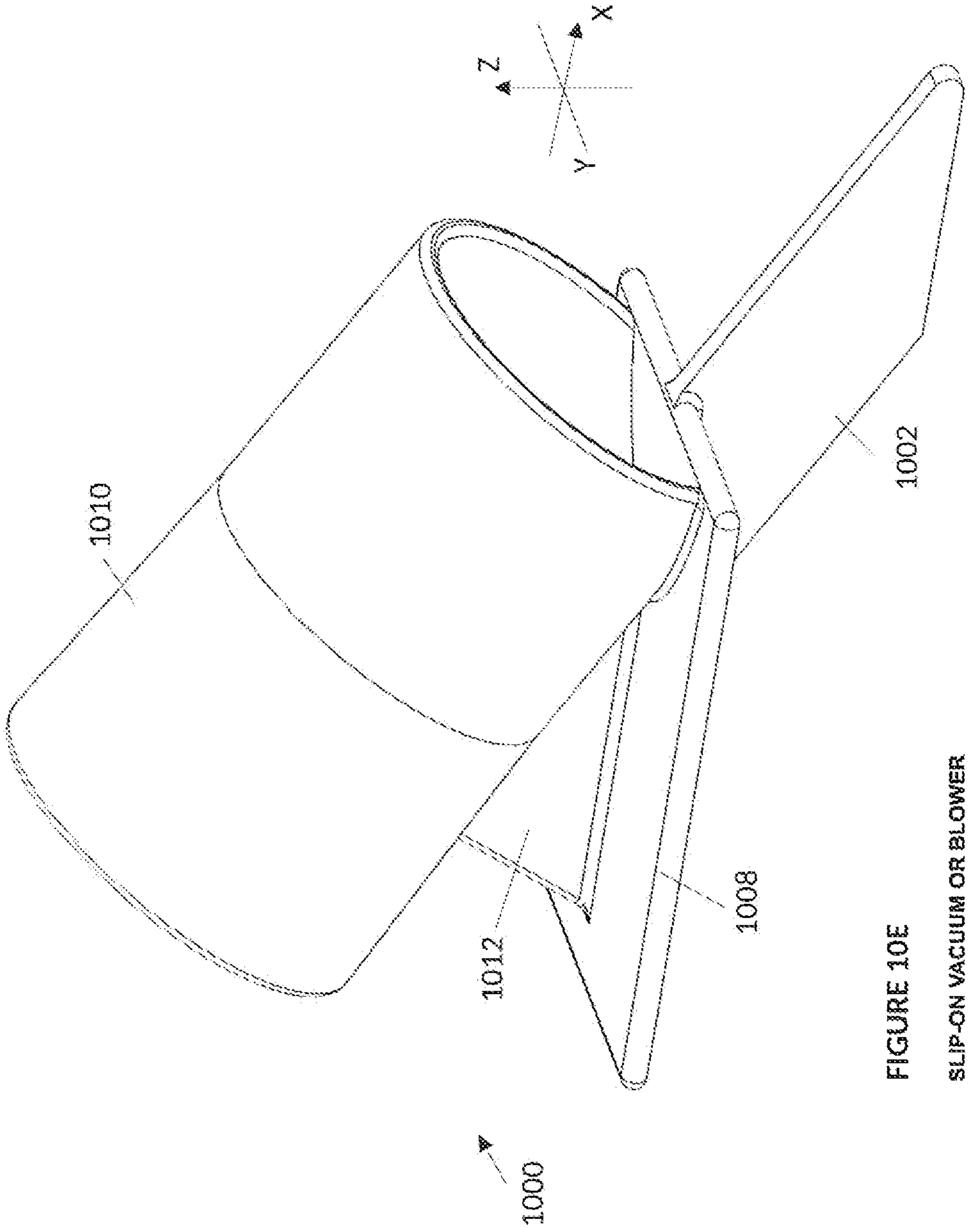
FIG. 10E is an image of a 3D model of the tool end attachment of FIG. 10A.

Referring now generally to the Figures and particularly to FIG. 10D, FIG. 10D is a top view of the second vacuum tool end 1000 of FIG. 10A. It is noted that all measurements and ranges offered herein are for demonstrative or example purposes only, and should not be read as limitations on the scope of the invention. Labeled here are the slip-on tool end 1000, the slip-on tool end blade 1002, and the slip-on tool end baseplate 1008. It is noted that some elements, including at least the slip-on tool end collar 1010, have been omitted from this image for clarity. Referring now generally to the Figures and particularly to FIG. 10E, FIG. 10E is an image of a three-dimensional model of the tool end attachment of FIG. 10A. Labeled here are the slip-on tool end 1000, the slip-on tool end blade 1002, the slip-on tool end baseplate 1008, the slip-on tool end collar 1010, and the slip-on tool end gusset 1012.

Figures 11A, 11B, 11C, 11D:
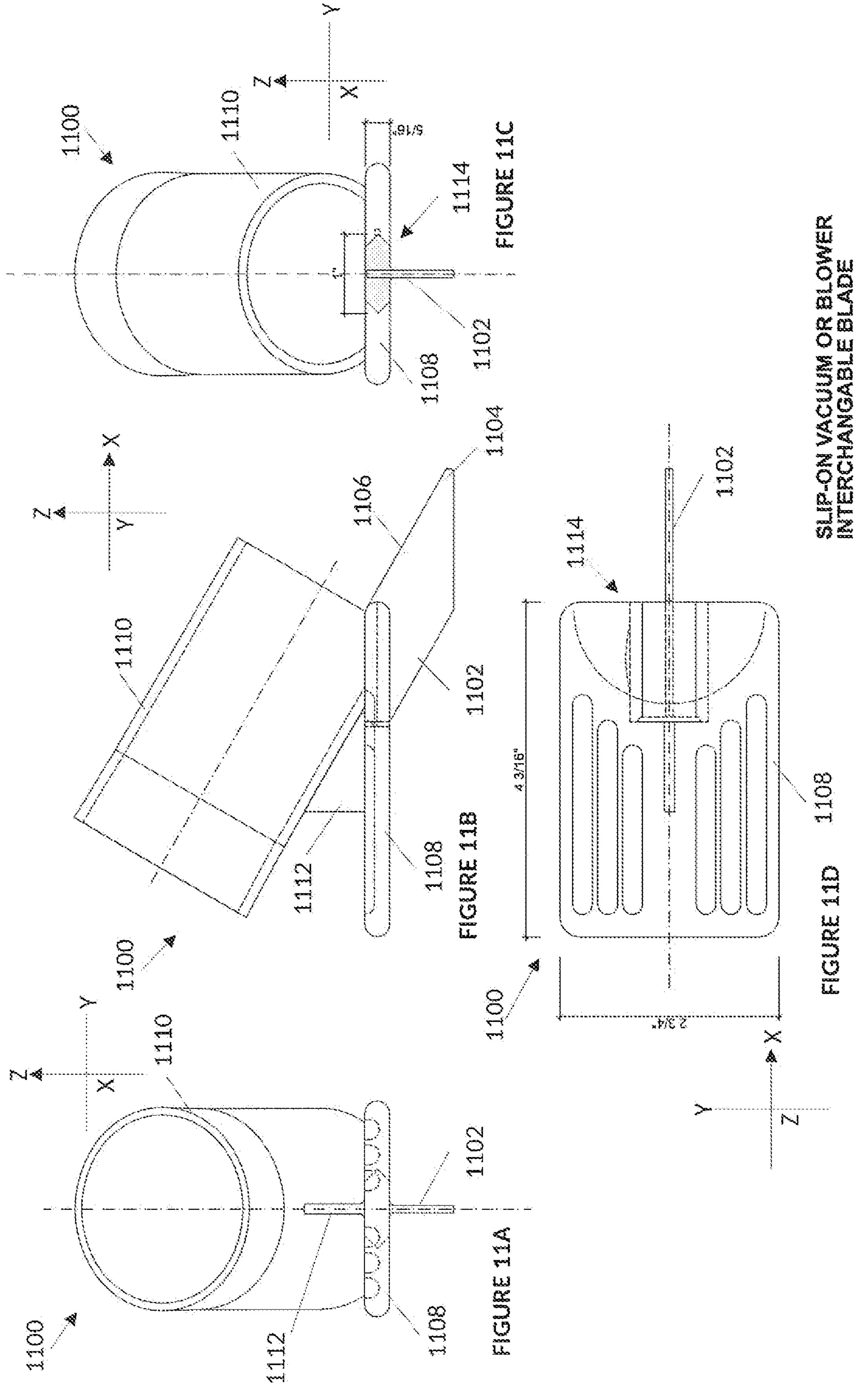
FIG. 11A is a rear view of a third preferred embodiment of the tool end attachment of FIG. 7 or 8, having a slip-on attachment mechanism and an interchangeable blade.
FIG. 11B is a side view of the tool end attachment of FIG. 11A.
FIG. 11C is a front view of the tool end attachment of FIG. 11A.
FIG. 11D is a top view of the tool end attachment of FIG. 11A.

Referring now generally to the Figures and particularly to FIG. 11A, FIG. 11A is a rear view of a third preferred embodiment of the vacuum tool end 702 of FIG. 7 or the blower tool end 802 of FIG. 8, specifically a slip-on tool end for a vacuum or leaf blower having a detachable/replaceable blade assembly. It is noted that all measurements and ranges offered herein are for demonstrative or example purposes only, and should not be read as limitations on the scope of the invention. It is noted that this embodiment is named the "slip-on interchangeable tool end" for being the first embodiment herein (of the vacuum/blower tool end embodiments) to introduce the feature of an interchangeable blade, but is not the only embodiment herein to include this feature. A slip-on interchangeable tool end 1100 includes at least a slip-on interchangeable tool end blade 1102 with a slip-on interchangeable tool end point 1104 and a slip-on interchangeable tool end slope 1106 (not shown in FIG. 11A; the slip-on interchangeable tool end point 1104 and the slip-on interchangeable tool end slope 1106 are first labeled in FIG. 11B), a slip-on interchangeable tool end baseplate 1108, a slip-on interchangeable tool end collar 1110, and a slip-on interchangeable tool end gusset 1112. The slip-on interchangeable tool end collar 1110 works as a slip-on friction fit, comprising a tube shape with a slight taper as shown, such that a tube such as the vacuum tube 706 or the blower tube 806 can be snugly fitted into the slip-on interchangeable tool end collar 1110.

Referring now generally to the Figures and particularly to FIG. 11B, FIG. 11B is a side view of the slip-on interchangeable tool end 1100 of FIG. 11A. It is noted that all measurements and ranges offered herein are for demonstrative or example purposes only, and should not be read as limitations on the scope of the invention. Labeled here are the slip-on interchangeable tool end 1100, the slip-on interchangeable tool end blade 1102, the slip-on interchangeable tool end point 1104, the slip-on interchangeable tool end slope 1106, the slip-on interchangeable tool end baseplate 1108, the slip-on interchangeable tool end collar 1110, and the slip-on interchangeable tool end gusset 1112. It is noted that this embodiment is named the "slip-on interchangeable tool end" for being the first embodiment herein to introduce an interchangeable blade, but is not the only embodiment herein to include this feature. It is noted that some elements, including at least the slip-on interchangeable tool end collar 1110, have been omitted from this image for clarity. The slip-on interchangeable tool end 1100 further includes the feature of blade detachability, similar to the embodiments of FIGS. 6A through 6F and FIGS. 11A through 11D, and the slip-on interchangeable tool end blade 1102 is attached and detached by means of a slip-on interchangeable blade attachment assembly 1114.

Referring now generally to the Figures and particularly to FIG. 11C, FIG. 11C is a rear view of the slip-on interchangeable tool end 1100 of FIG. 11A. It is noted that all measurements and ranges offered herein are for demonstrative or example purposes only, and should not be read as limitations on the scope of the invention. Labeled here are the slip-on interchangeable tool end 1100, the slip-on interchangeable tool end blade 1102, the slip-on interchangeable tool end baseplate 1108, the slip-on interchangeable tool end collar 1110, and the slip-on interchangeable tool end gusset 1112.

Referring now generally to the Figures and particularly to FIG. 11D, FIG. 11D is a front view of the slip-on interchangeable tool end 1100 of FIG. 11A. It is noted that all measurements and ranges offered herein are for demonstrative or example purposes only, and should not be read as limitations on the scope of the invention. Labeled here are the slip-on interchangeable tool end 1100, the slip-on interchangeable tool end blade 1102, the slip-on interchangeable tool end baseplate 1108, the slip-on interchangeable tool end collar 1110, and the slip-on interchangeable blade attachment assembly 1114.

Figure 11E:
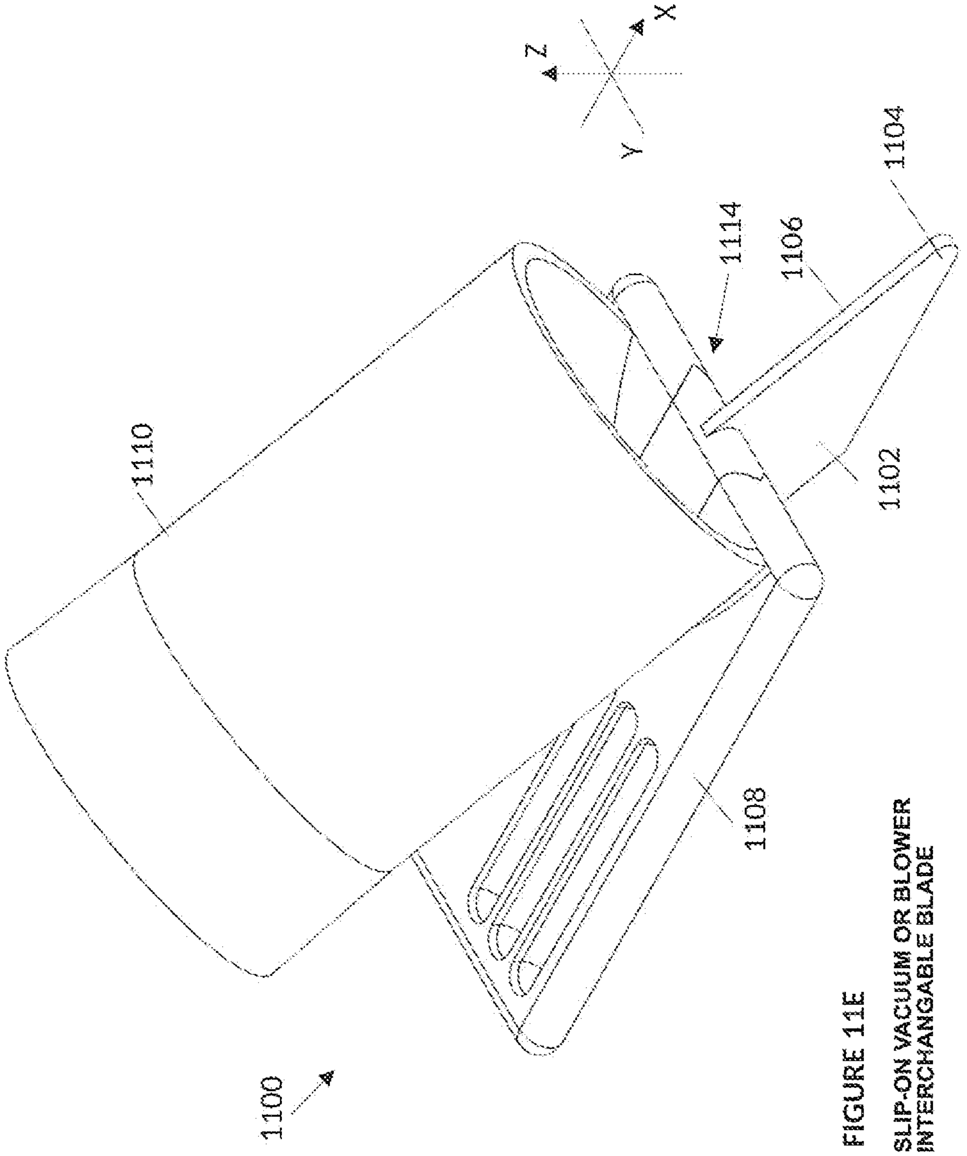
FIG. 11E is an image of a 3D model of the tool end attachment of FIG. 11A.

Referring now generally to the Figures and particularly to FIG. 11E, FIG. 11E is an image of a three-dimensional model of the tool end attachment of FIG. 11A. Labeled here are the slip-on interchangeable tool end 1100, the slip-on interchangeable tool end blade 1102, the slip-on interchangeable tool end baseplate 1108, the slip-on interchangeable tool end collar 1110, and the slip-on interchangeable blade attachment assembly 1114.

Figure 11F:
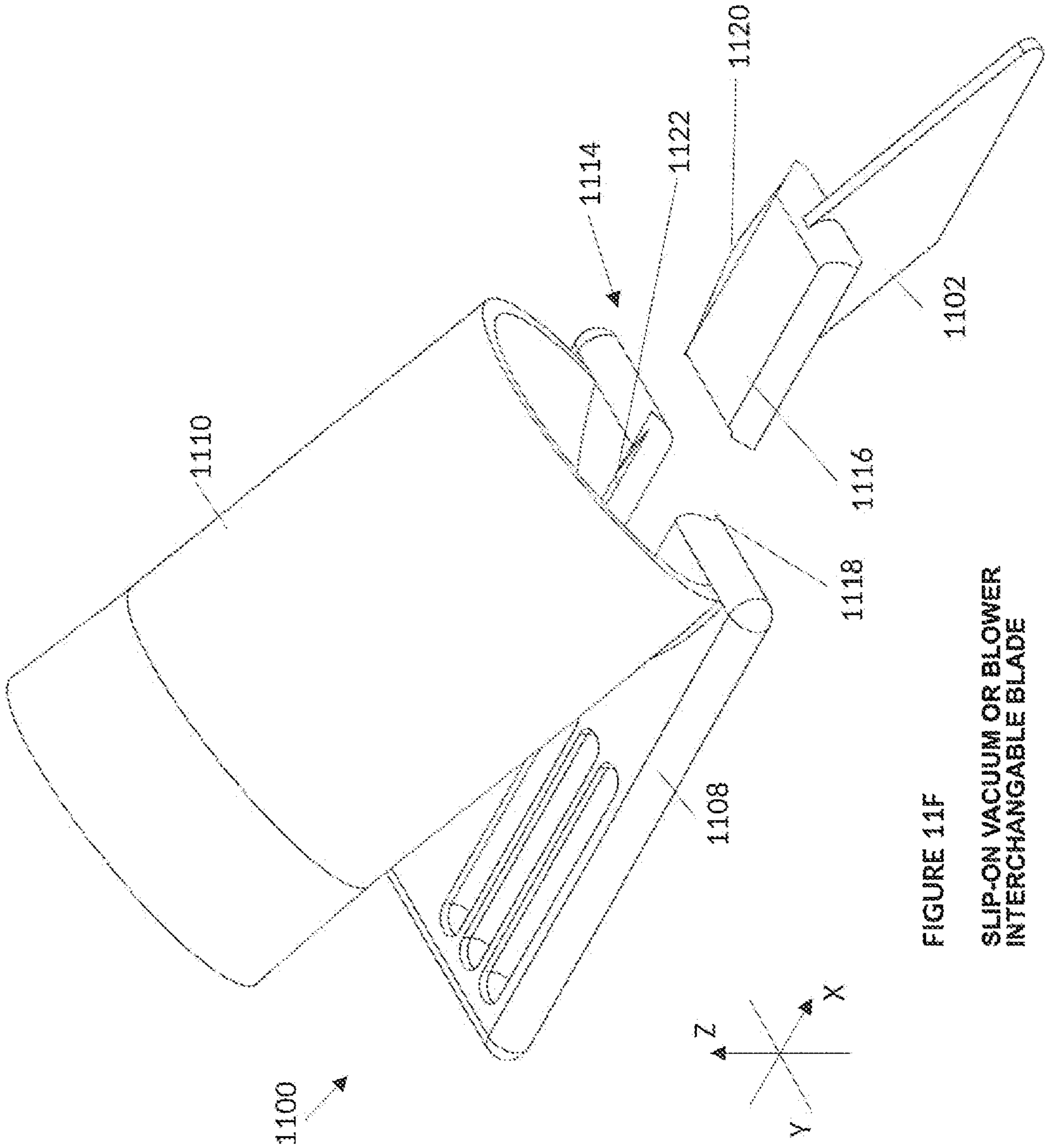
FIG. 11F is an image of the 3D model of FIG. 11E with the interchangeable blade in a detached position.

Referring now generally to the Figures and particularly to FIG. 11F, FIG. 11F is an image of the three-dimensional model of FIG. 11E with the slip-on interchangeable tool end blade 1102 in a detached position. Labeled here are the slip-on interchangeable tool end 1100, the slip-on interchangeable tool end blade 1102, the slip-on interchangeable tool end baseplate 1108, the slip-on interchangeable tool end collar 1110, and the slip-on interchangeable blade attachment assembly 1114. The slip-on interchangeable blade attachment assembly 1114 further comprises a blade head 1116 that slides into a groove 1118 of the slip-on interchangeable tool end baseplate 1108, wherein the groove 1118 is a feature of and is formed into the base plate 1108. The blade head 1116 includes a detent 1120 which is shaped and sized to detachably lock into a secure position by detachable placement into a detent receiver 1122 of the groove 1118. It is noted that the slip-on interchangeable blade attachment assembly 1114 might function as a friction fit, with the detent 1120 shaped to push snugly into the groove 1118 and the detent receiver 1122 and require pulling to detach, but there are also embodiments possible, not represented here but understood to be obvious to one known in the art, which utilize other sorts of securement assemblies, such as a spring catch or manual bolts.

Figures 12A, 12B, 12C, 12D:
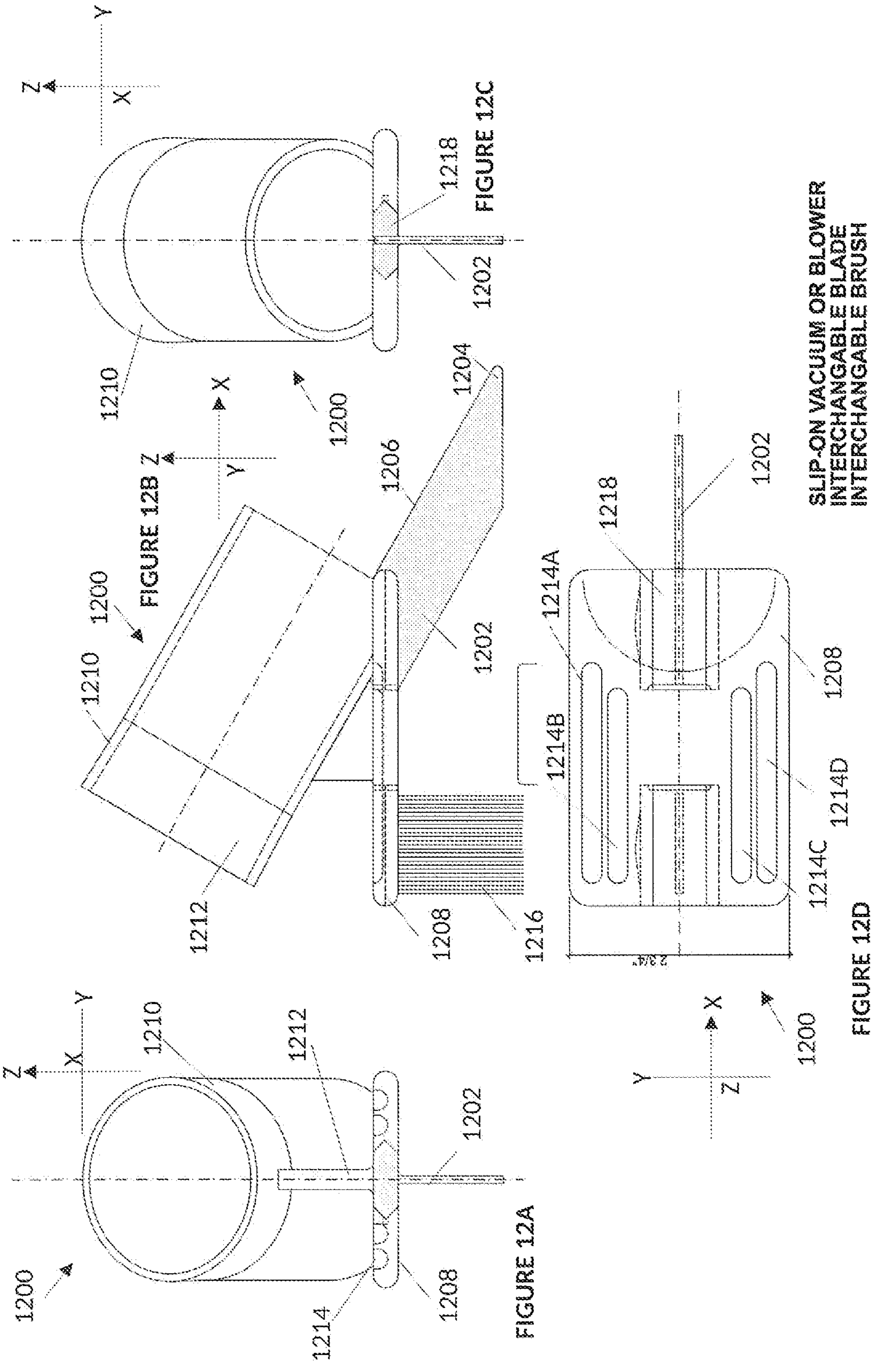
FIG. 12A is a rear view of a fourth preferred embodiment of the tool end attachment of FIG. 7 or FIG. 8, having a slip-on attachment mechanism, an interchangeable blade, and an interchangeable brush.
FIG. 12B is a side view of the tool end attachment of FIG. 12A.
FIG. 12C is a front view of the tool end attachment of FIG. 12A.
FIG. 12D is a top view of the tool end attachment of FIG. 12A.

Referring now generally to the Figures and particularly to FIG. 12A, FIG. 12A is a rear view of a fourth preferred embodiment of the tool end attachment of FIG. 7 or FIG. 8, having a slip-on attachment mechanism, an interchangeable blade, and an interchangeable brush. It is noted that all measurements and ranges offered herein are for demonstrative or example purposes only, and should not be read as limitations on the scope of the invention. A brush tool end 1200 includes at least a brush tool end blade 1202 with a brush tool end point 1204 and a brush tool end slope 1206 (the brush tool end point 1204 and the brush tool end slope 1206 are shown in FIG. 12B), a brush tool end baseplate 1208, a brush tool end collar 1210, and a brush tool end gusset 1212. It is noted that this embodiment is named the "brush tool end" for being the first embodiment herein to introduce a brush feature, but is not the only embodiment herein to include this feature. The brush tool end collar 1210 works as a friction fit, comprising a tube shape with a slight taper as shown, such that the vacuum tube 706 or the blower tube 806 can be snugly fitted into the brush tool end collar 1210. The brush tool end 1200 further may include one or more grooves 1214, discussed further in the text regarding FIG. 12D.

Referring now generally to the Figures and particularly to FIG. 12B, FIG. 12B is a side view of the brush tool end 1200 of FIG. 12A. It is noted that all measurements and ranges offered herein are for demonstrative or example purposes only, and should not be read as limitations on the scope of the invention. Labeled here are the brush tool end 1200, the brush tool end blade 1202, the brush tool end point 1204, the brush tool end slope 1206, the brush tool end baseplate 1208, the brush tool end collar 1210, the brush tool end gusset 1212, and a brush 1216.

Referring now generally to the Figures and particularly to FIG. 12C, FIG. 12C is a front view of the brush tool end 1200 of FIG. 12A. It is noted that all measurements and ranges offered herein are for demonstrative or example purposes only, and should not be read as limitations on the scope of the invention. Labeled here are the brush tool end 1200, the brush tool end blade 1202, the brush tool end collar 1210, and a brush tool end blade attachment assembly 1218.

Referring now generally to the Figures and particularly to FIG. 12D, FIG. 12D is a top view of the brush tool end 1200 of FIG. 12A. It is noted that all measurements and ranges offered herein are for demonstrative or example purposes only, and should not be read as limitations on the scope of the invention. Labeled here are the brush tool end 1200, the brush tool end blade 1202, and the brush tool end baseplate 1208. The brush tool end 1200 further includes the feature of blade detachability, similar to the embodiments of FIGS. 6A through 6C and 12A through 12D, and the brush tool end blade 1202 is attached and detached by means of a blade attachment assembly 1218. It is noted that some elements, including at least the brush tool end collar 1210, have been omitted from this image for clarity. The brush tool end 1200 embodiment may further include the feature of a plurality of grooves 1214, specifically a first groove 1214A, a second groove 1214B, a third groove 1214C, and a fourth groove 1214D, which are parallel channels in the brush tool end baseplate 1208 that run parallel to the X axis and allow the brush tool end baseplate 1208 to still perform its basic function while adding less weight to the brush tool end 1200. It is noted that the grooves 1214 may reduce the material required to form the brush tool end 1200, which is a benefit to cheaper manufacture and to providing a more lightweight tool. It is further noted that, while the feature of the grooves

1214 is first introduced in connection with the present embodiment, this feature could also be included in other embodiments described herein that do not happen to present this feature in this set of examples, and that similar flexibility may apply to other features of other embodiments described herein also, as deemed appropriate by one skilled in the art.

Figure 12E:
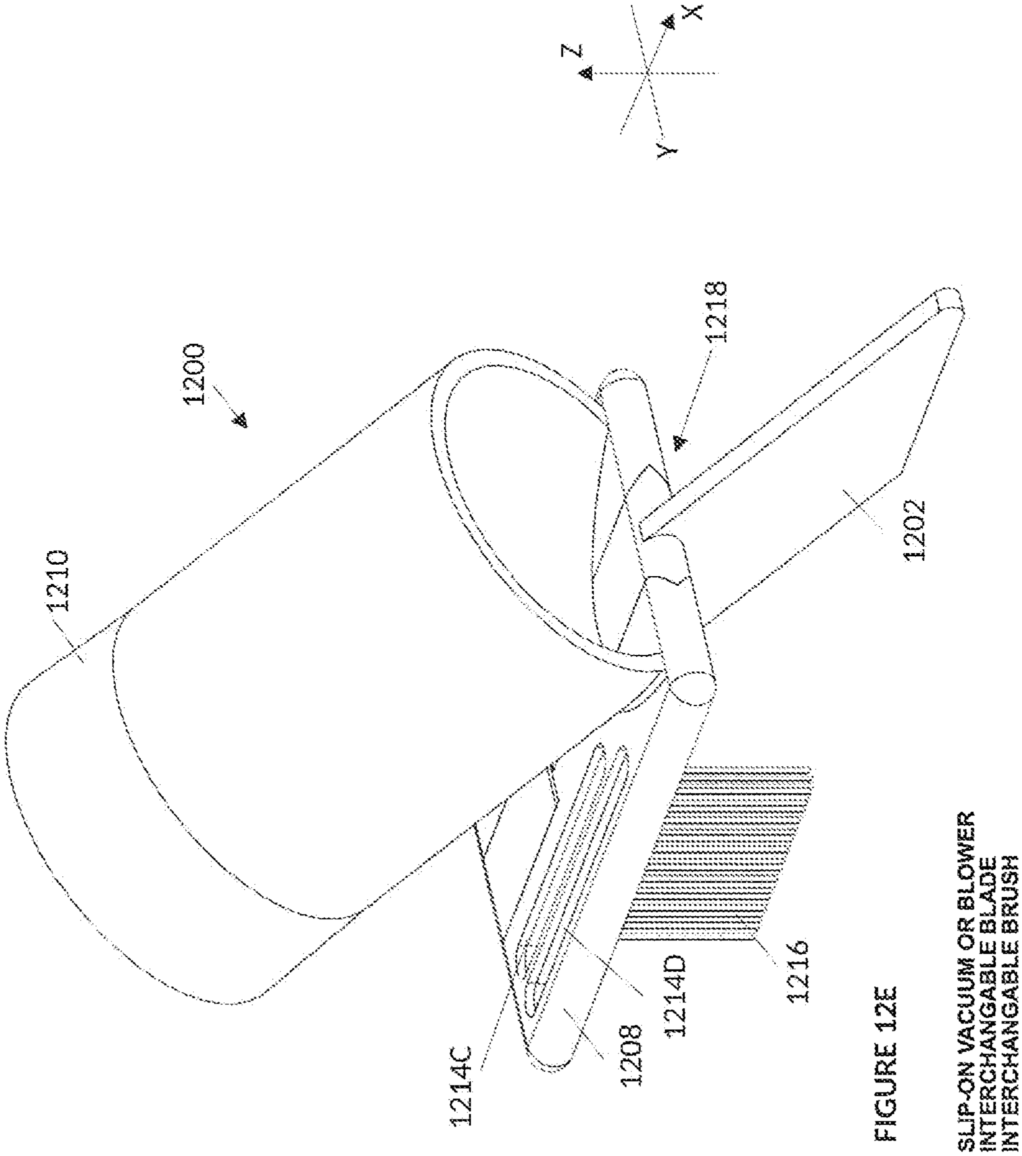
FIG. 12E is an image of a 3D model of the tool end attachment of FIG. 12A.

Referring now generally to the Figures and particularly to FIG. 12E, FIG. 12E is an image of a three-dimensional model of the tool end attachment of FIG. 12A. Labeled here are the brush tool end 1200, the brush tool end blade 1202, the brush tool end baseplate 1208, the brush tool end collar 1210, the third groove 1214C, and the fourth groove 1214D, the brush 1216, and the brush tool end blade attachment assembly 1218.

Figure 12F:
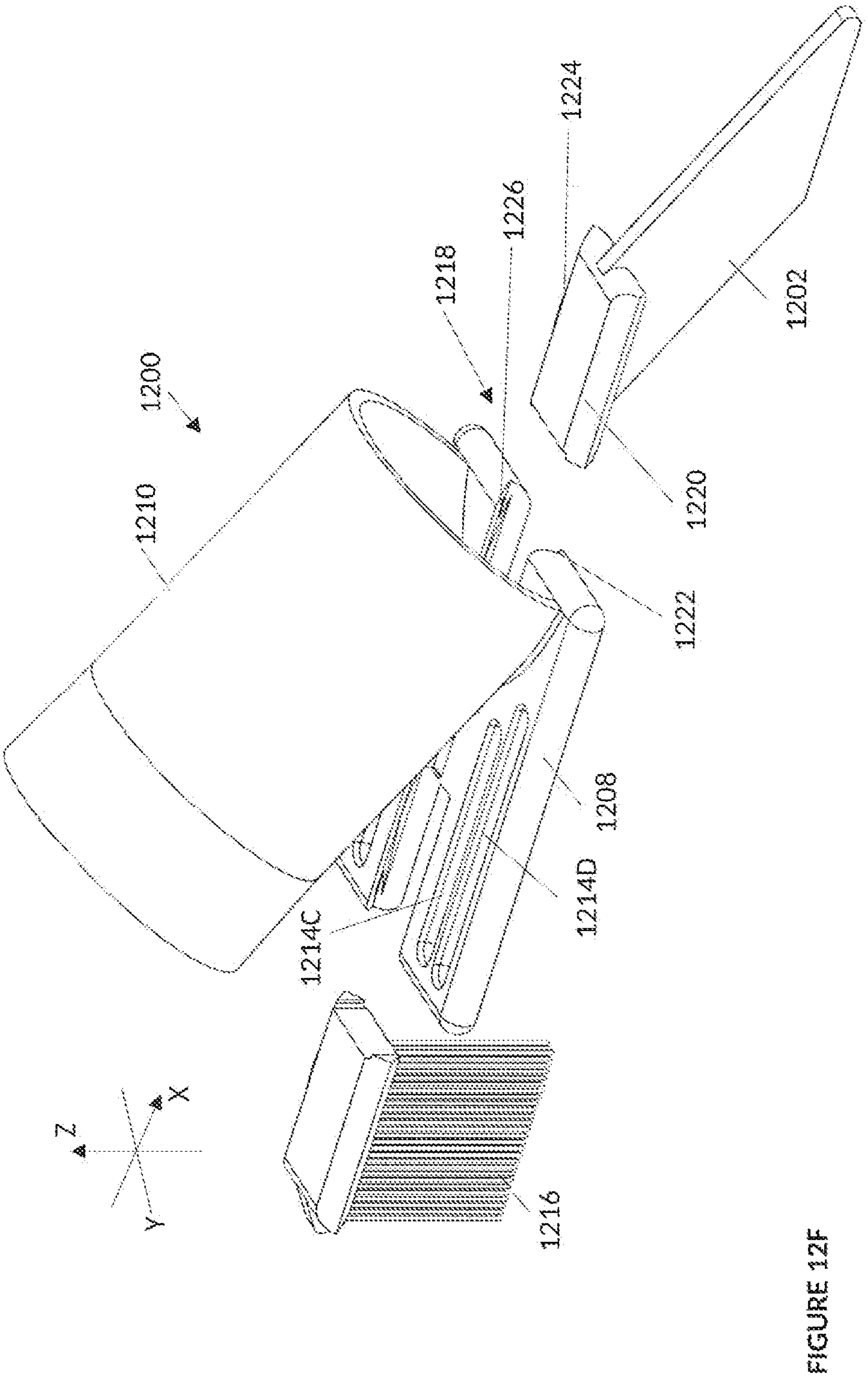
FIG. 12F is an image of the 3D model of FIG. 12E, with the detachable blade and detachable brush in detached positions.

Referring now generally to the Figures and particularly to FIG. 12F, FIG. 12F is an image of the three-dimensional model of FIG. 12E, with the detachable blade and detachable brush in detached positions. Labeled here are the brush tool end 1200, the brush tool end blade 1202, the brush tool end baseplate 1208, the brush tool end collar 1210, the third groove 1214C, and the fourth groove 1214D, the brush 1216, and the brush tool end blade attachment assembly 1218.

The brush tool end blade attachment assembly 1218 further comprises a blade head 1220 that slides into a groove 1222 of the brush tool end baseplate 1208, wherein the groove 1222 is a feature of and is formed into the brush tool end baseplate 1208. The blade head 1220 includes a detent 1224 which is shaped and sized to detachably lock into a secure position by detachable placement into a detent receiver 1226 of the groove 1122. It is noted that the brush tool end blade attachment assembly 1218 might function as a friction fit, with the detent 1224 shaped to push snugly into the groove 1222 and the detent receiver 1226 and require pulling to detach, but there are also embodiments possible, not represented here but understood to be obvious to one known in the art, which utilize other sorts of securement assemblies, such as a spring catch, or the manual bolts of the embodiment of FIG. 6.

Figures 13A, 13B, 13C, 13D:
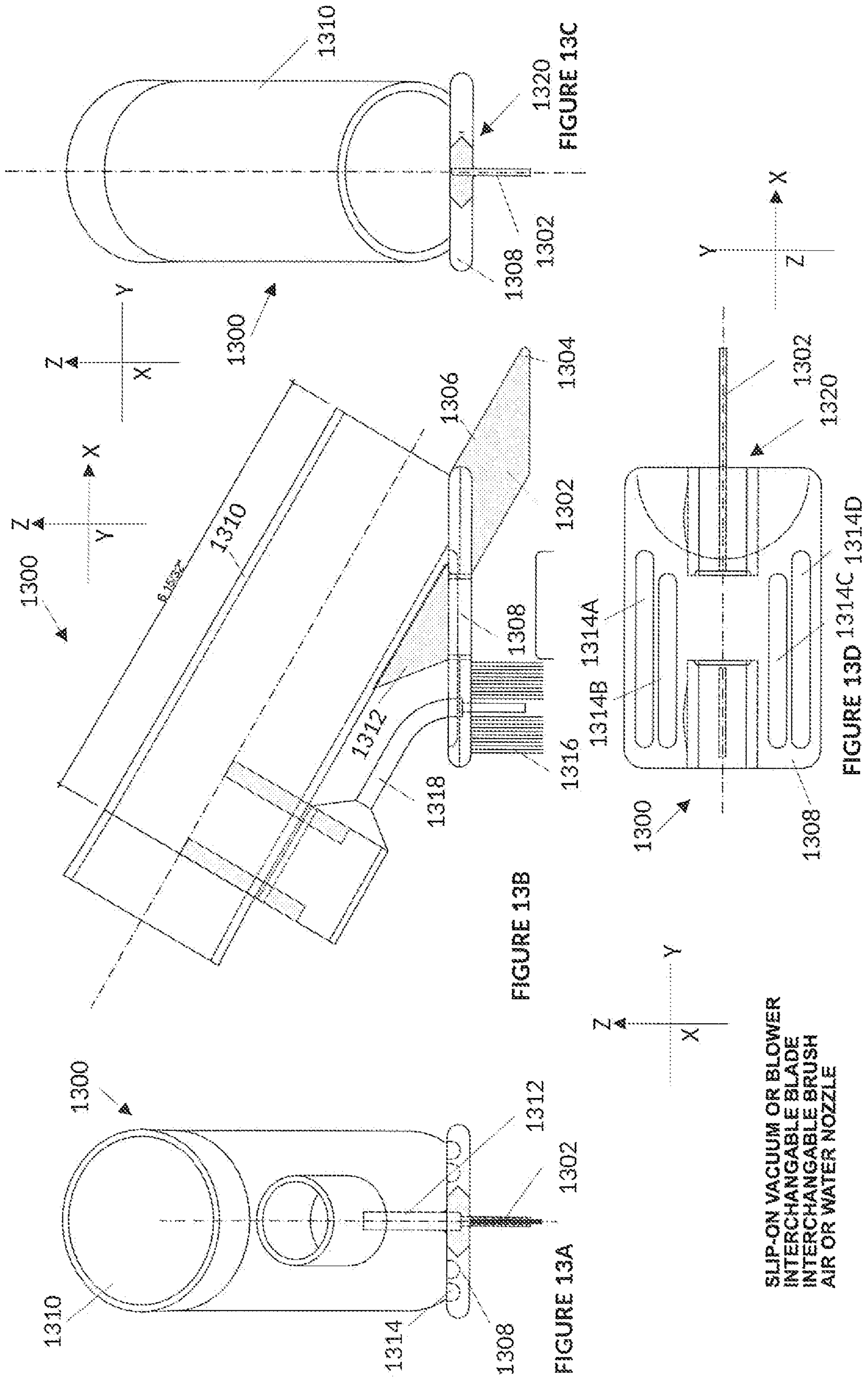
FIG. 13A is a rear view of a fifth preferred embodiment of the tool end attachment of FIG. 7 or FIG. 8, having a slip-on attachment mechanism, an interchangeable blade, an interchangeable brush, and an air or water nozzle.
FIG. 13B is a side view of the tool end attachment of FIG. 13A.
FIG. 13C is a front view of the tool end attachment of FIG. 13A.
FIG. 13D is a top view of the tool end attachment of FIG. 13A.

Referring now generally to the Figures and particularly to FIG. 13A, FIG. 13A is a rear view of a fifth preferred embodiment of the tool end attachment of FIG. 7 or FIG. 8, having a slip-on attachment mechanism, an interchangeable blade, an interchangeable brush, and an air or water nozzle. It is noted that all measurements and ranges offered herein are for demonstrative or example purposes only, and should not be read as limitations on the scope of the invention. A nozzle tool end 1300 includes at least a nozzle tool end blade 1302 with a nozzle tool end point 1304 and a nozzle tool end slope 1306 (the nozzle tool end point 1304 and the nozzle tool end slope 1306 are first shown in FIG. 13B), a nozzle tool end baseplate 1308, a nozzle tool end collar 1310, and a nozzle tool end gusset 1312. The nozzle tool end collar 1310 works as a friction fit, comprising a tube shape with a slight taper as shown, such that the vacuum tube 706 or the blower tube 806 can be snugly fitted into the nozzle tool end collar 1310. The present embodiment further includes one or more grooves 1314, further discussed in FIG. 13D, a brush, further discussed in FIG. 13B, a nozzle 1318, further discussed in FIG. 13B, and a detachable blade assembly 1320, further discussed in FIG. 13C.

Referring now generally to the Figures and particularly to FIG. 13B, FIG. 13B is a side view of the nozzle tool end 1300 of FIG. 13A. It is noted that all measurements and ranges offered herein are for demonstrative or example purposes only, and should not be read as limitations on the scope of the invention. Labeled here are the nozzle tool end 1300, the nozzle tool end blade 1302, the nozzle tool end point 1304, the nozzle tool end slope 1306, the nozzle tool end collar 1310, and the nozzle tool end gusset 1312. The nozzle tool end 1300 further includes the features of a nozzle tool end brush 1316, similar to those previously discussed in other 'brush' embodiments, and also a nozzle 1318 connected to a source of liquid (such as a tank of water, a hose tap, or even a container for dispensing a cleaning solution) or a source of pressurized air. In preferred operation of the tool, using the nozzle 1318 to apply liquid such as water or cleaning solution (pressurized or not) or to shoot compressed air is an additional way to soften up or dislodge material 114 that may get lodged between deck boards 112A & 112B, and/or disperse or clean up material 114 once dislodged.

Referring now generally to the Figures and particularly to FIG. 13C, FIG. 13C is a top view of the nozzle tool end 1300 of FIG. 13A. It is noted that all measurements and ranges offered herein are for demonstrative or example purposes only, and should not be read as limitations on the scope of the invention. Labeled here are the nozzle tool end 1300, the nozzle tool end blade 1302, the nozzle tool end baseplate 1308, the nozzle tool end collar, and a nozzle tool end blade attachment assembly 1314. The nozzle tool end 1300 includes the feature of blade detachability, similar to the embodiments of FIGS. 6A through 6F and FIGS. 11A through 12D, and the brush tool end blade 1302 is attached and detached by means of the nozzle tool end blade attachment assembly 1320, similar to the slip-on interchangeable blade attachment assembly 1114 and the brush tool end blade attachment assembly 1218.

Referring now generally to the Figures and particularly to FIG. 13D, FIG. 13D is a top view of the nozzle tool end 1300 of FIG. 13A. It is noted that all measurements and ranges offered herein are for demonstrative or example purposes only, and should not be read as limitations on the scope of the invention. Labeled here are the nozzle tool end 1300, the nozzle tool end blade 1302, the nozzle tool end baseplate 1308, and the nozzle tool end blade attachment assembly 1320. It is noted that some elements, including at least the nozzle tool end collar 1310, have been omitted from this image for clarity. The nozzle tool end 1300 embodiment includes the feature of a plurality of grooves 1314, specifically a first groove 1314A, a second groove 1314B, a third groove 1314C, and a fourth groove 1314D, which are parallel channels in the nozzle tool end baseplate 1308 that run parallel to the X axis and allow the nozzle tool end baseplate 1308 to still perform its basic function while adding less weight to the nozzle tool end 1300. It is noted that the grooves 1314 may reduce the material required to form the nozzle tool end 1300.

Figure 13E:
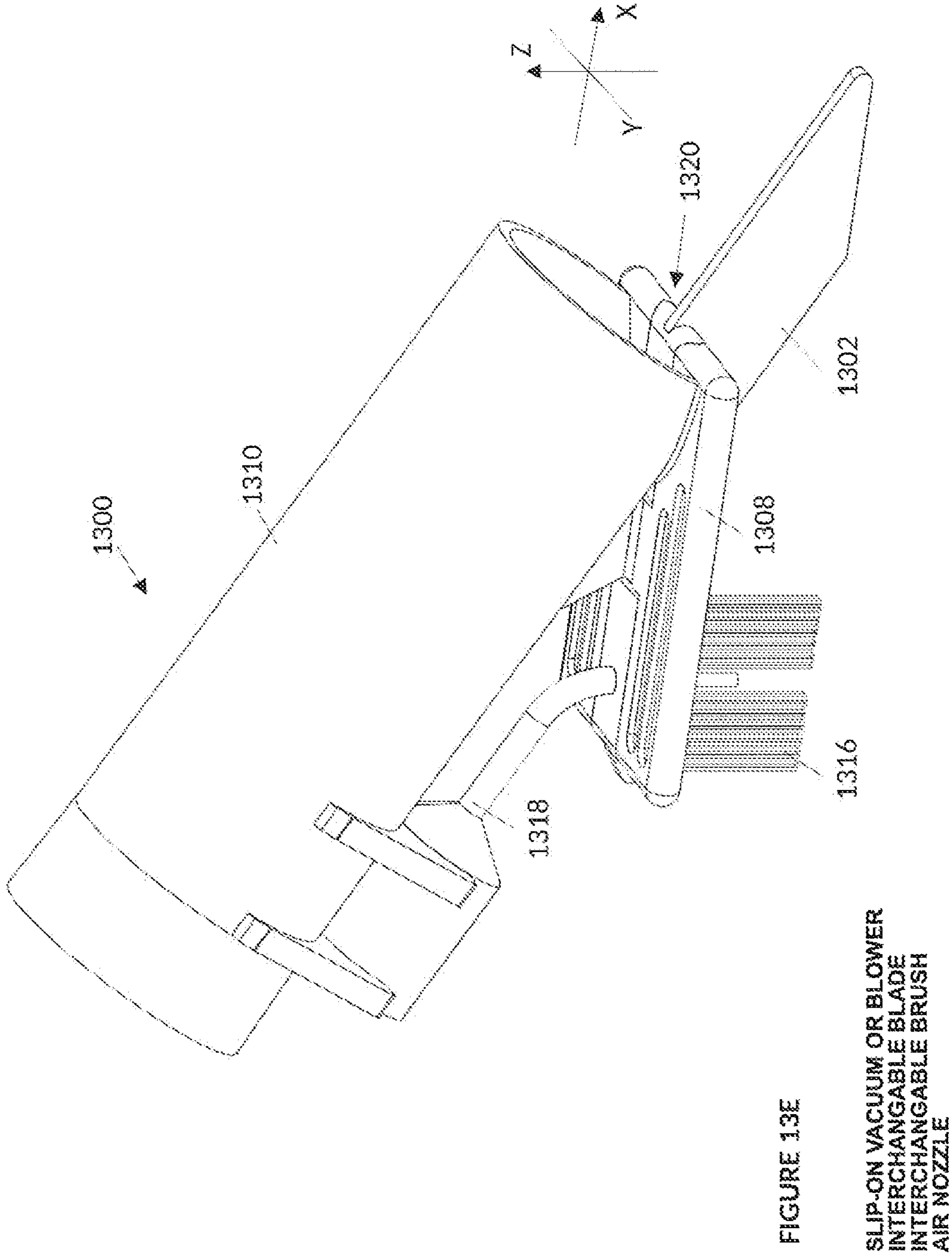
FIG. 13E is an image of a 3D model of the tool end attachment of FIG. 13A.

Referring now generally to the Figures and particularly to FIG. 13E, FIG. 13E is an image of a three-dimensional model of the tool end attachment of FIG. 13A. Labeled here are the nozzle tool end 1300, the nozzle tool end blade 1302, the nozzle tool end baseplate 1308, the nozzle tool end collar 1310, the nozzle tool end brush 1316, the nozzle 1318, and the nozzle tool end blade attachment assembly 1320.

Figure 13F:
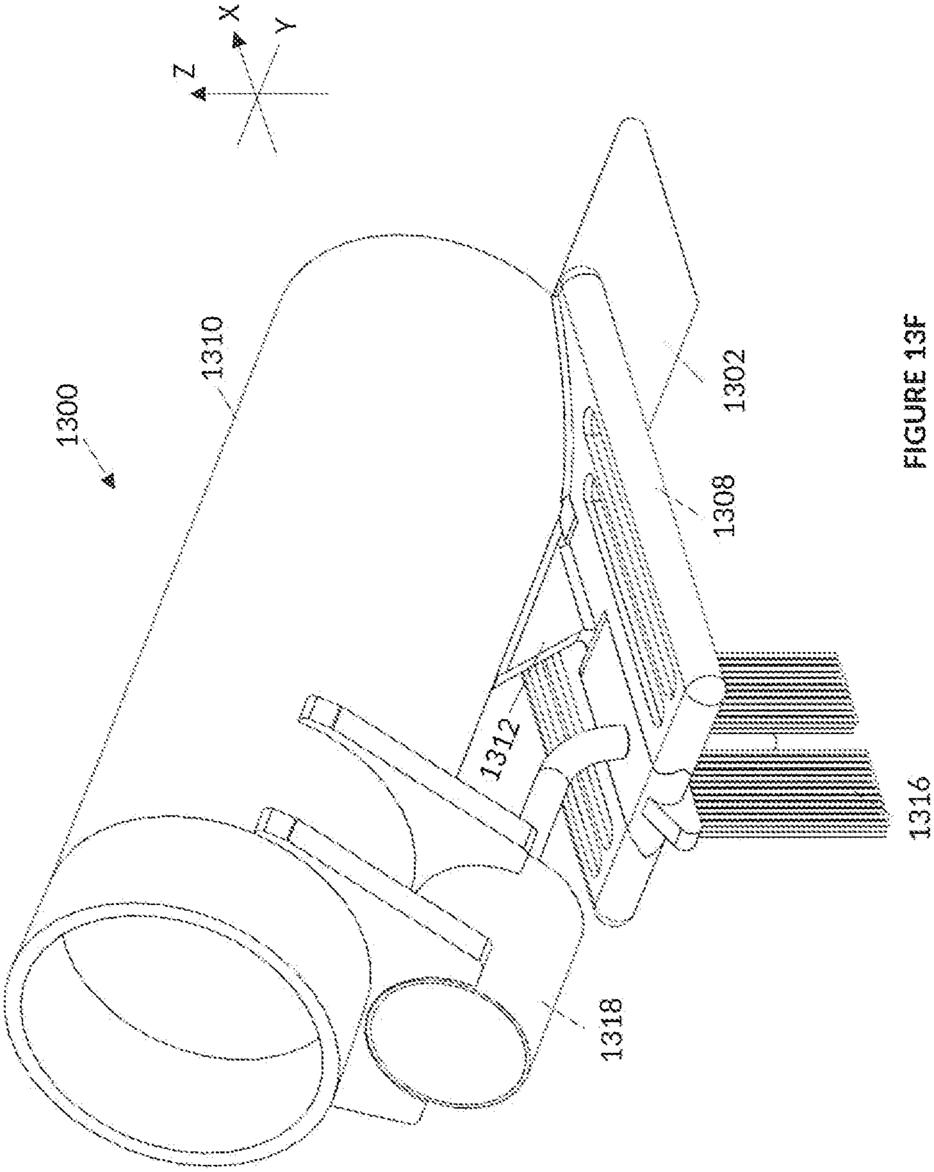
FIG. 13F is a second view of the 3D model of FIG. 13E.

Referring now generally to the Figures and particularly to FIG. 13F, FIG. 13F is a second view of the 3D model of FIG. 13E, as seen from the rear and to the side. Labeled here are the nozzle tool end 1300, the nozzle tool end blade 1302, the nozzle tool end baseplate 1308, the nozzle tool end collar 1310, the nozzle tool end gusset 1312, the nozzle tool end brush 1316, and the nozzle 1318. It is noted that only the portion of the nozzle 1318 is shown here; the nozzle 1318 as pictured here might be considered an attachment that a hose can fit into, the cutaway end of a hose, or something similar. It is noted that the nozzle 1318 dispenses liquid or pressurized air, as described above, and might not be functional in that fashion unless coupled to other components not shown here, such as a hose, a container of compressed air or of water or cleaning liquid, or something else to provide the medium to be dispensed by the nozzle 1318.

Figure 14:
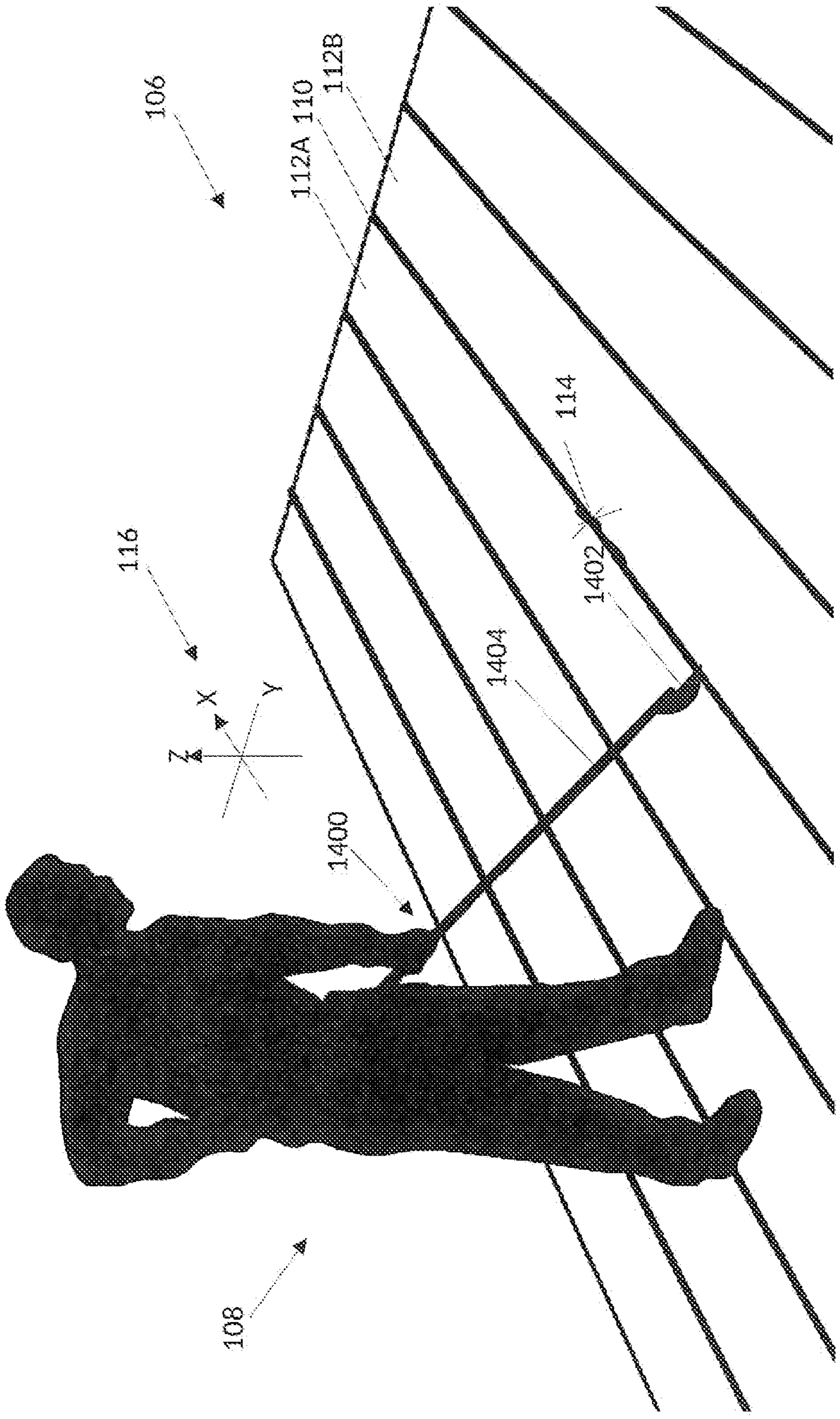
FIG. 14 is an overview diagram presenting a fourth preferred embodiment of an invented tool incorporating a handle being used for cleaning a deck.

Referring now generally to the Figures and particularly to FIG. 14, FIG. 14 is an overview diagram presenting a fourth embodiment of the invented tool 1400 (hereinafter, "the fourth tool 1400") comprising a plateless tool end 1402 coupled with a fourth tool handle 1404 being used for cleaning the deck 106. It is noted that the 'plateless' embodiments of tool end are so named because these embodiments have the distinction of omitting the baseplate element common to several other embodiments. In preferred operation, the user 108 couples the fourth tool handle 1404 (such as a standard broom handle) to the top of the plateless tool end 1402, then fits the plateless tool end 1402 into the gap 110 in a wooden deck such as between the deck boards 112, and pushes the first tool 100 forward by means of the fourth tool handle 1404, similar to operating a push broom, utilizing the plateless tool end 1402 to pry any material 114 such as dirt and dead leaves up and out from between the boards 112. It is understood that any embodiment or feature of an invented tool end outlined and described herein might be fitted into the context presented in FIG. 14 as the plateless tool end 1402, including features presented in the context of tool ends for use with a leaf blower, vacuum cleaner, or something else, as deemed appropriate. For instance, a swiveling feature or a version of the plateless tool end 1402 shaped for compatibility with a different kind of handle or for variable compatibility with multiple sizes of handle might also be obvious possible embodiments. It is noted and understood that the above summary is intended only as a general introductory overview regarding the 'big picture' of this invention and its intended method of use to provide context, and nothing stated above should be construed as definitive or limiting. It is noted also that the described tool, or a variation thereof, might have other applications, and the invented tool is not limited to use on deck boards.

Figure 15C:
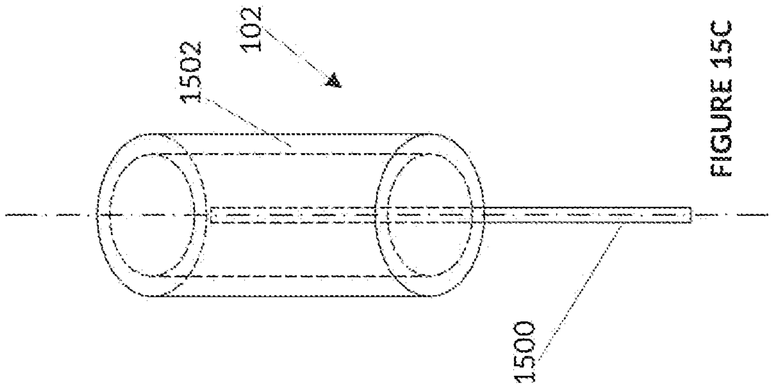
FIG. 15C is a rear view of the tool end of FIG. 15A.
Figure 15B:
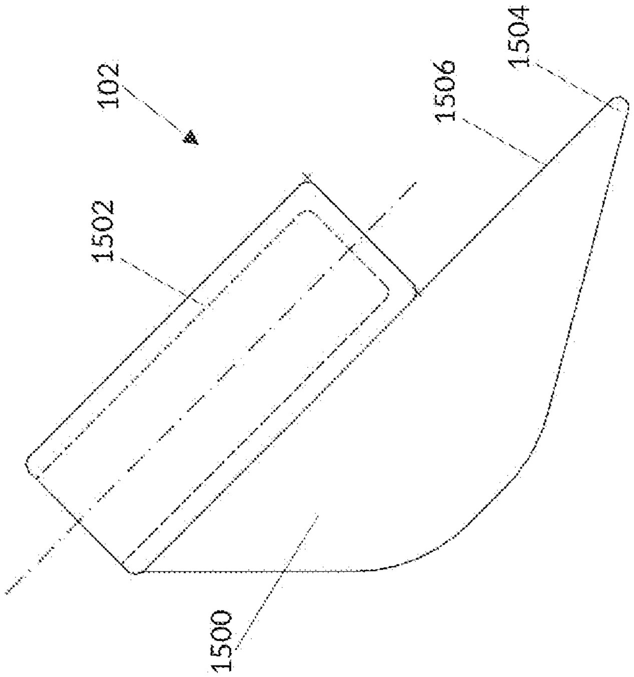
FIG. 15B is a side view of the tool end of FIG. 15A.
Figure 15D:
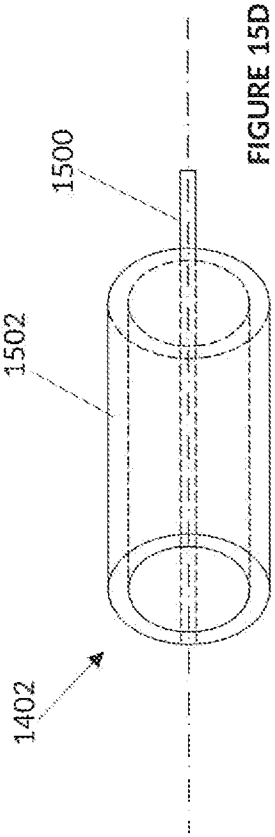
FIG. 15D is a top view of the tool end of FIG. 15A.
Figure 15A:
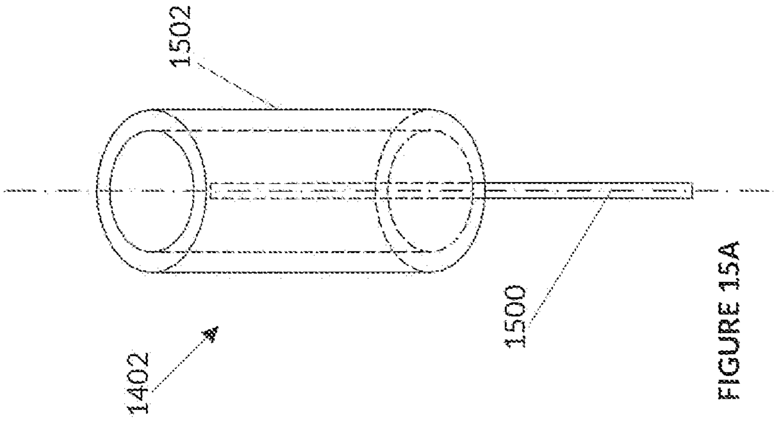
FIG. 15A is a front view of the tool end of the tool of FIG. 14.

Referring now generally to the Figures and particularly to FIG. 15A, FIG. 15A is a front view of the plateless tool end 1402 of the fourth tool 1400 of FIG. 14. The plateless tool end 1402 includes at least a plateless tool end blade 1500 and a plateless tool end collar 1502.

Referring now generally to the Figures and particularly to FIG. 15B, FIG. 15B is a side view of the plateless tool end 1402 of the fourth tool 1400 of FIG. 14. The plateless tool end blade 1500 shape further includes a plateless tool end point 1504 and a plateless tool end slope 1506. The plateless tool end blade 1500 preferably extends ahead of the fourth tool 1400 and the plateless tool end collar 1502 (and thus the fourth tool handle 1404, which is coupled to the plateless tool end 1402 by the plateless tool end collar 1502) behind the fourth tool 1400, such that the fourth tool 1400 can be pushed from behind, similar to a push broom, shovel, or rake. The plateless tool end blade 1500 is preferably shaped approximately as presented in the image, with the intention that material 114 stuck between the deck boards 112 is caught above the plateless tool end point 1504 and forced upward by the plateless tool end slope 1506, out of the gap 110 as the fourth tool 1400 is propelled forward. This may either scatter the material 114 loose on top of the deck 106 above (making the material 114 easy to then sweep off the side of the deck 106 with a broom or gather with a dustpan) or dislodge the material 114 to fall down into a space underneath the deck 106. One skilled in the art may recognize that plenty of additional features might be experimented with to augment or optimize this basic concept. It is noted and understood that the exact dimensions of the plateless tool end blade 1500 may vary, such as to provide a shape and size optimized for the deck 106 being made of wood as opposed to the deck 106 made of something else, such as a composite or plastic material. Further, additional experimentation with exact shaping and dimensions may yield optimization, such as improving performance, providing greater ease of use, providing improved durability or longevity, or providing comparable tool performance with reduced effort or material used in manufacture.

Referring now generally to the Figures and particularly to FIG. 15C, FIG. 15C is a rear view of the plateless tool end 1402 of the fourth tool 1400 of FIG. 14. Labeled here are the plateless tool end blade 1500 and the plateless tool end collar 1502.

Referring now generally to the Figures and particularly to FIG. 15D, FIG. 15D is a top view of the plateless tool end 1402 of the fourth tool 1400 of FIG. 14. Labeled here are the plateless tool end blade 1500 and the plateless tool end collar 1502.

Figure 15E:
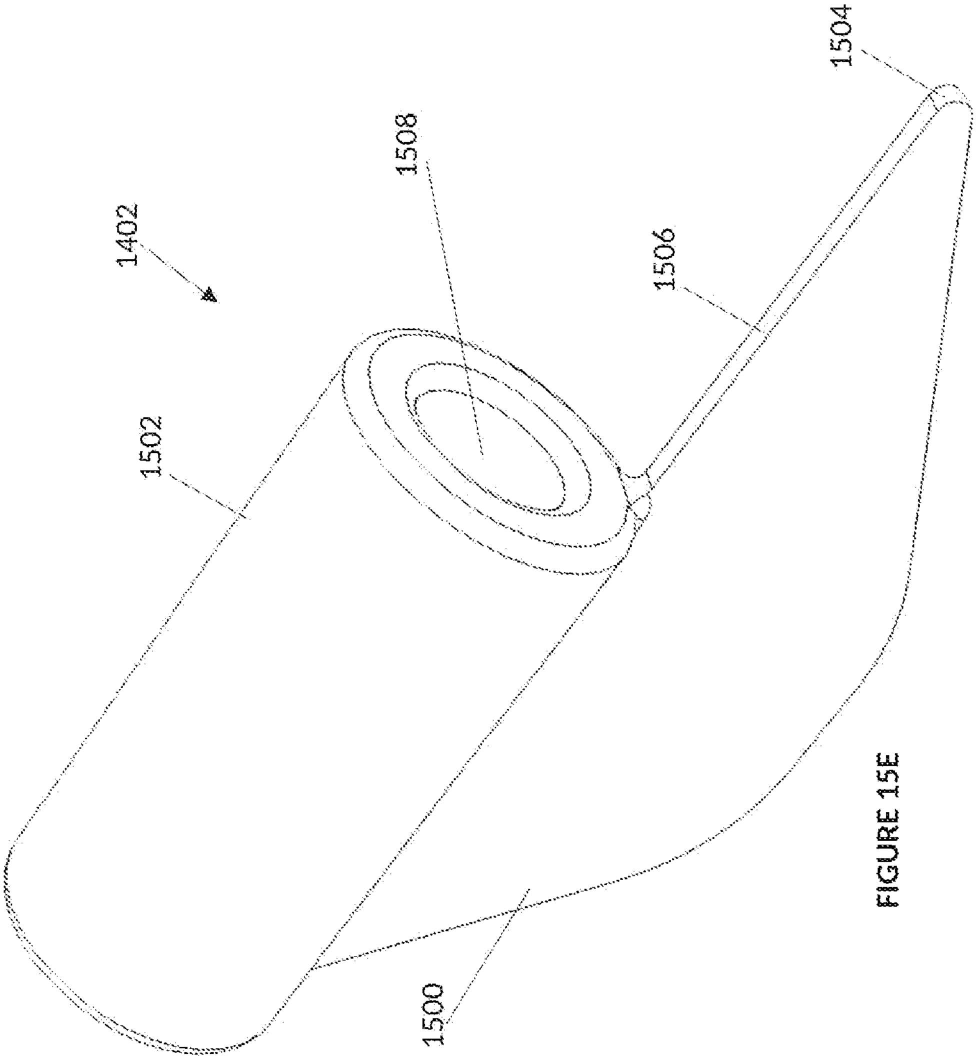
FIG. 15E is a perspective view from ahead and to the right of the tool end of FIG. 15A.

Referring now generally to the Figures and particularly to FIG. 15E, FIG. 15E is a perspective view from ahead and to the right of the plateless tool end 1402 of the fourth tool 1400 of FIG. 14. Labeled here are the plateless tool end blade 1500, the plateless tool end collar 1502, the plateless tool end point 1504, and the plateless tool end slope 1506. The plateless tool end collar 202 may further include a plateless tool end collar cap 1508, as presented here, obstructing or partially obstructing the front end of the plateless tool end collar 1502.

Figure 15F:
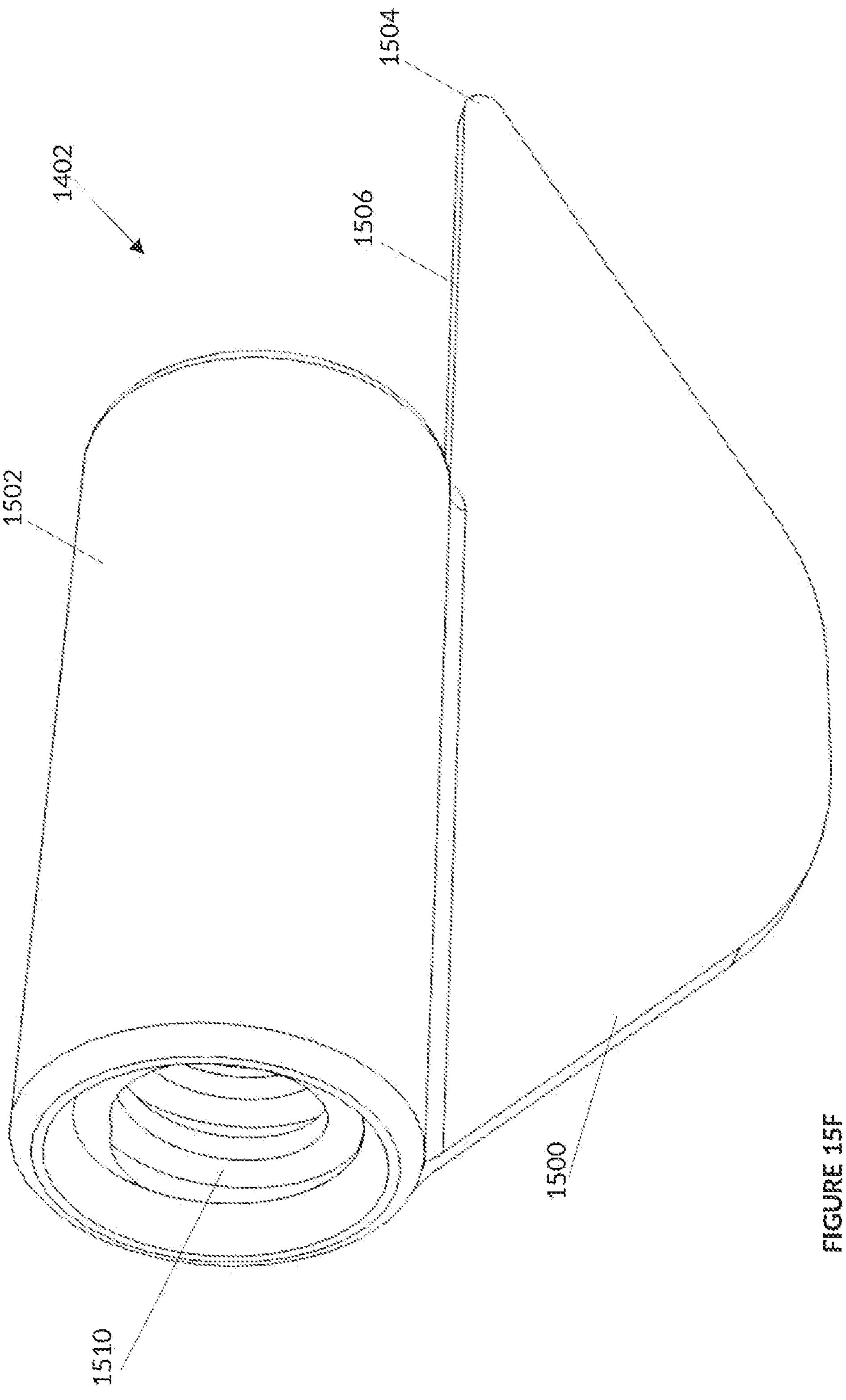
FIG. 15F is a perspective view from behind and to the right of the tool end of FIG. 15A.

Referring now generally to the Figures and particularly to FIG. 15F, FIG. 15F is a perspective view from behind and to the right of the plateless tool end 1402 of the fourth tool 1400 of FIG. 14. Labeled here are the plateless tool end blade 1500, the plateless tool end collar 1502, the plateless tool end point 1504, and the plateless tool end slope 1506. The plateless tool end collar 1502 may further include a plateless tool end collar threading 1510, as presented here, to couple together compatibly with certain varieties of the fourth tool handle 1404.

Figure 16:
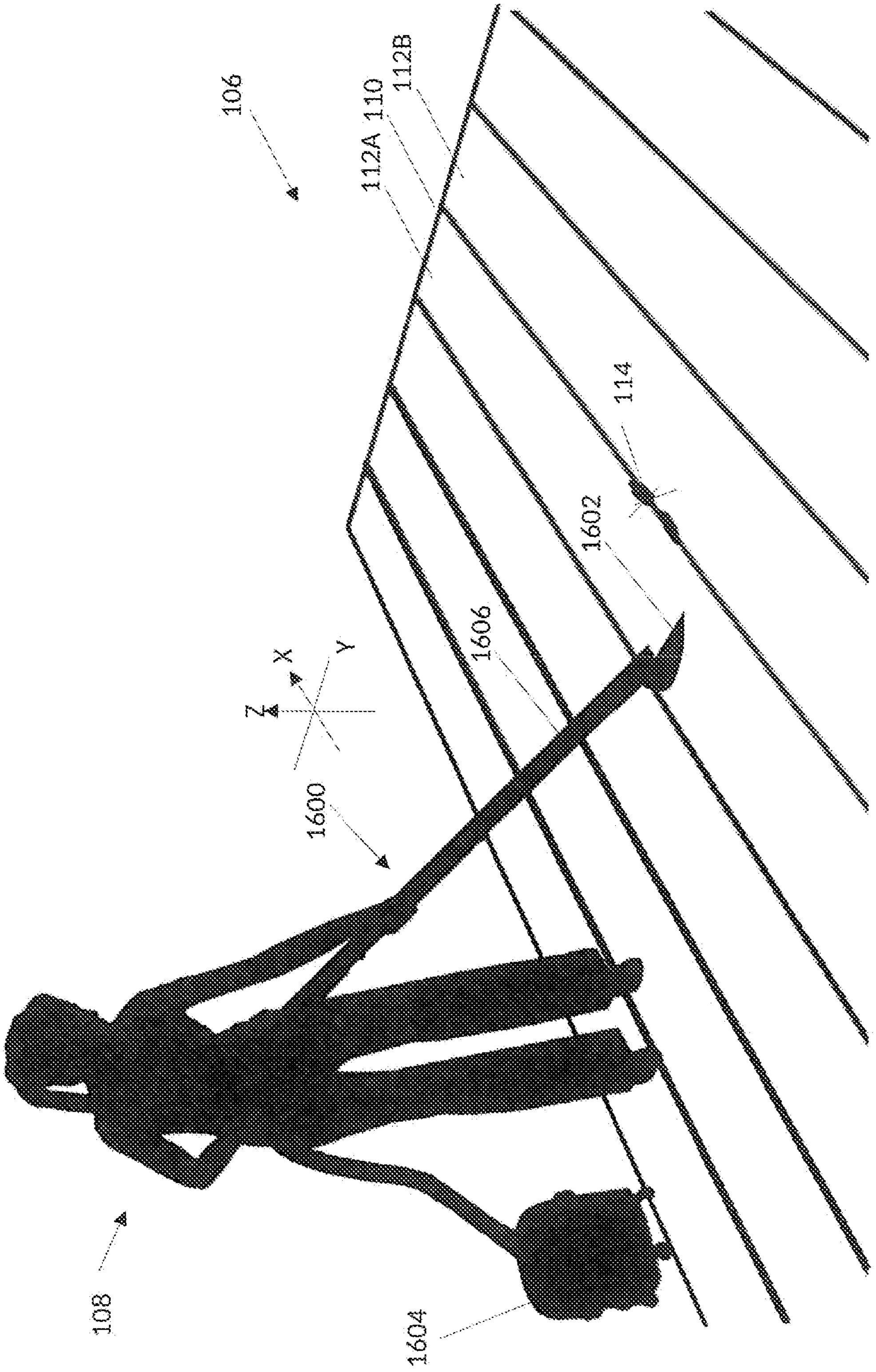
FIG. 16 is an overview diagram presenting a fifth preferred embodiment of an invented tool incorporating a vacuum cleaner, being used in context for cleaning a deck.

Referring now generally to the Figures and particularly to FIG. 16, FIG. 16 is an overview diagram presenting a second, vacuum-based embodiment 1600 of the invented tool (hereinafter, "the second vacuum tool 1600"), comprising a plateless vacuum tool end 1602 coupled with a second vacuum cleaner 1604, being used for cleaning the deck 106. In preferred operation, the user 108 couples a second vacuum tube 1606 portion of the second vacuum cleaner 1604 to the top of the plateless vacuum tool end 1602, then fits the plateless vacuum tool end 1602 into the gap 110 between the boards 112, and pushes the second vacuum tool 1600 forward by means of a grip on a portion of the second vacuum cleaner 1604, similar to operating the second vacuum cleaner 1604 to vacuum a floor, utilizing the plateless vacuum tool end 1602 to pry any material 114 such as dirt and dead leaves up and out from between the boards 112, where these might then be sucked up by the second vacuum cleaner 1604 and thus removed from the deck 106. It is noted that several different models of vacuum cleaner as generally known in the art and available commercially might be found suitable for use as the second vacuum cleaner 1604 presented here, such as a SHOP-VAC® vacuum cleaner marketed by SHOP-VAC, Inc., of Williamsport, PA, or other suitable vacuum cleaner known in the art. More particularly, the plateless vacuum tool end 1602 may be coupled or fitted onto the end of the second vacuum tube 1606, which might be a hose attachment or tube/wand attachment which several if not most standard vacuum cleaners have some version of for use in vacuuming narrow or hard-to-reach areas such as corners and ceilings. It is noted that, accordingly, some standard sizes or dimensions of connector may be preferred for fitting onto specific popular models of vacuum cleaner, or for fitting multiple models of vacuum cleaner which may share a certain standard hose size. It is understood that any embodiment or feature of an invented tool end outlined and described herein might be fitted into the context presented in FIG. 16 as the plateless vacuum tool end 1602, included those tool ends presented in the context of use with a handle, leaf blower, or something else, as deemed appropriate. It is noted and understood that the above summary is intended only as a general introductory overview regarding the 'big picture' of this invention and its intended method of use to provide context, and nothing stated above should be construed as definitive or limiting. It is noted also that the described tool, or a variation thereof, might have other applications, and the invented tool is not limited to use on deck boards.

Figure 17:
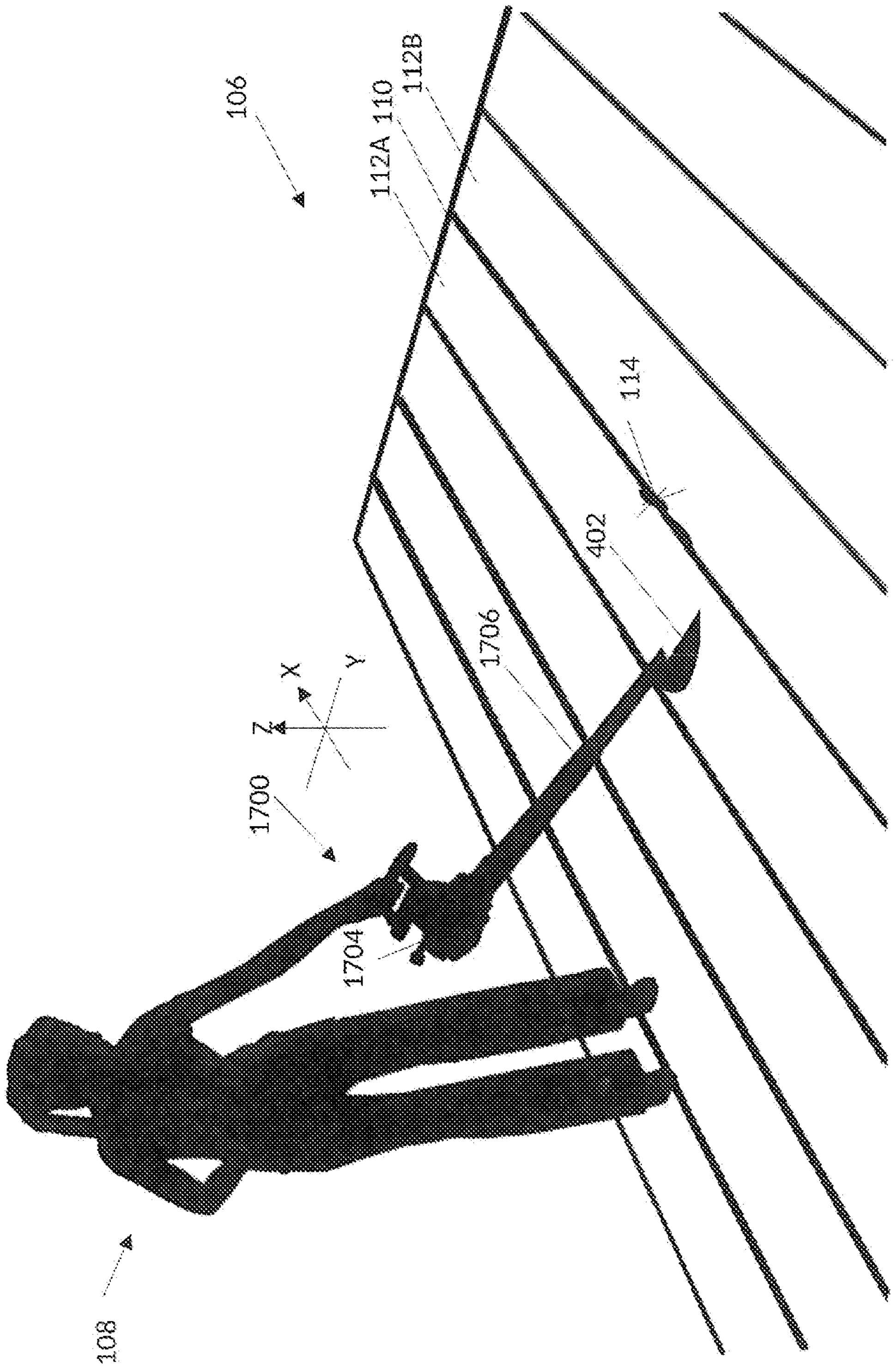
FIG. 17 is an overview diagram presenting a sixth preferred embodiment of an invented tool incorporating a leaf blower, being used in context for cleaning a deck.

Referring now generally to the Figures and particularly to FIG. 17, FIG. 17 is an overview diagram presenting a second leaf-blower-based embodiment 1700 of the invented tool (hereinafter, "the second blower tool 1700"), comprising a plateless blower tool end 1702 coupled with a second leaf blower 1704, being used for cleaning the deck 106. In preferred operation, the user 108 couples a second blower tube 1706 portion of the second leaf blower 1704 to the top of the plateless blower tool end 1702, then fits the plateless blower tool end 1702 into the gap 110 between the boards 112 and uses the plateless blower tool end 1702 to pry any material 114 such as dirt and dead leaves up and out from between the boards 112, where these might then be dispersed or removed from the deck 106 by the second leaf blower 1704. It is noted that several different models of leaf blower as generally known in the art and available commercially might be found suitable for use as the second leaf blower 1704 presented here, such as a DeWalt 20V MAX DCE100B 135 mph 100 CFM 20 V Battery Handheld Blower marketed by DeWalt Corporation of Towson, Maryland, USA, or other suitable leaf blower known in the art. More particularly, the plateless blower tool end 1702 may be coupled or fitted onto the end of the second blower tube 1706, which might be a hose attachment or tube/wand attachment, or onto a generally tube-shaped element of the second leaf blower 1704. It is noted that, accordingly, some standard sizes or dimensions of connector may be preferred for fitting onto specific popular models of leaf blower, or for fitting multiple models of leaf blower which may share a certain standard hose/tube size, and also that the shape of the plateless blower tool end 1702 may vary such as to optimize for the deck 106 model or material. It is understood that any embodiment or feature of an invented tool end outlined and described herein might be fitted into the context presented in FIG. 17 as the plateless blower tool end 1702, included those tool ends presented in the context of use with a handle, vacuum cleaner, or something else, as deemed appropriate. It is noted and understood that the above summary is intended only as a general introductory overview regarding the 'big picture' of this invention and its intended method of use to provide context, and nothing stated above should be construed as definitive or limiting. It is noted also that the described tool, or a variation thereof, might have other applications, and the invented tool is not limited to use on deck boards.

Figures 18A, 18B, 18C, 18D:
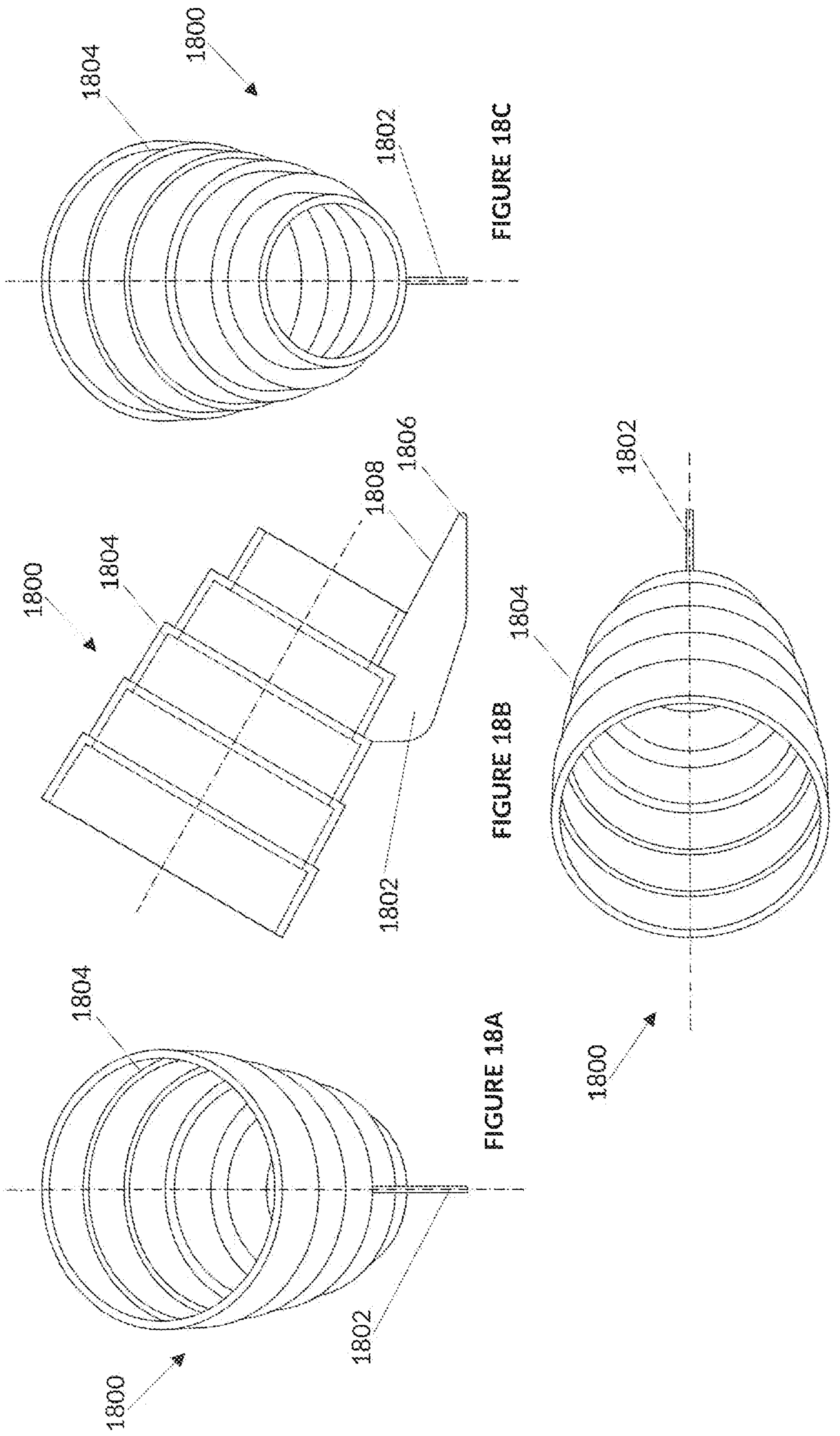
FIG. 18A is a rear view of a first preferred embodiment of tool end for use as the vacuum tool end of FIG. 16 or the blower tool end of FIG. 17.
FIG. 18B is a side view of the tool end of FIG. 18A.
FIG. 18C is a front view of the tool end of FIG. 18A.
FIG. 18D is a top view of the tool end of FIG. 18A.

Referring now generally to the Figures and particularly to FIG. 18A, FIG. 18A is a rear view of a second preferred embodiment of tool end for use as the plateless vacuum tool end 1602 of FIG. 16 or the plateless blower tool end 1702 of FIG. 17 (hereinafter, "the first plateless tube tool end 1800"). The first plateless tube tool end 1800 includes at least a first plateless tube tool end blade 1802 and a first plateless tube tool end collar 1804. A notable benefit of the first plateless tube tool end collar 1804 shape is a variety of diameters provided within the stepped shape, allowing for several different models of the vacuum tube 1606 or the blower tube 1706 to fit into the first plateless tube tool end collar 1804.

Referring now generally to the Figures and particularly to FIG. 18B, FIG. 18B is a side view of the second tool end of FIG. 18A. The first plateless tube tool end blade 1802 shape further includes a first plateless tube tool end point 1806 and a first plateless tube tool end slope 1808. Also labeled here is the first plateless tube tool end collar 1804. The first plateless tube tool end blade 1802 is preferably shaped approximately as presented in the image, with the intention that material 114 stuck between the deck boards 112 is caught above the first plateless tube tool end point 1806 and forced upward by the first plateless tube tool end slope 1808, out of the gap 110 as the first plateless tube tool end 1800 is propelled forward. This may either scatter the material 114 loose on top of the deck 106 above (making the material 114 easy to then remove with the second vacuum cleaner 1604 or the second leaf blower 1704) or dislodge the material 114 to fall down into a space underneath the deck 106. One skilled in the art may recognize that plenty of additional features might be experimented with to augment or optimize this basic concept. It is noted and understood that the exact dimensions of the first plateless tube tool end blade 1802 may vary, such as to provide a shape and size optimized for the deck 106 being made of wood as opposed to the deck 106 made of something else, such as a composite or plastic material. Further, additional experimentation with exact shaping and dimensions may yield optimization, such as improving performance, providing greater ease of use, providing improved durability or longevity, or providing comparable tool performance with reduced effort or material used in manufacture.

Referring now generally to the Figures and particularly to FIG. 18C, FIG. 18C is a front view of the first plateless tube tool end 1800 of FIG. 18A. Labeled here are the first plateless tube tool end blade 502 and the first plateless tube tool end collar 504.

Referring now generally to the Figures and particularly to FIG. 18D, FIG. 18D is a top view of the first plateless tube tool end 1800 of FIG. 18A. Labeled here are the second blade 1802 and the second collar 1804.

Figure 18E:
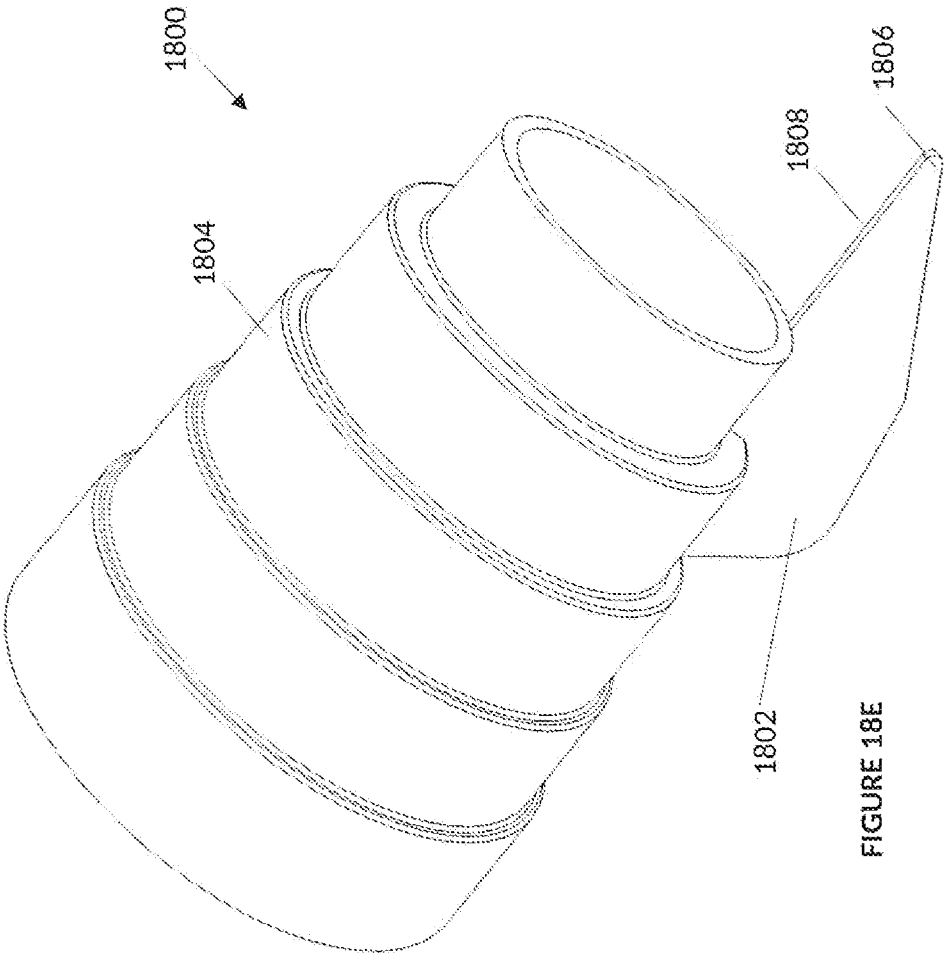
FIG. 18E is a perspective view from ahead and to the right of the tool end of FIG. 18A.

Referring now generally to the Figures and particularly to FIG. 18E, FIG. 18E is a perspective view from ahead and to the right of the second tool end of FIG. 18A. Labeled here are the first plateless tube tool end blade 1802, the first plateless tube tool end collar 1804, the first plateless tube tool end point 1806, and the first plateless tube tool end slope 1808.

Figures 19A, 19B, 19C, 19D:
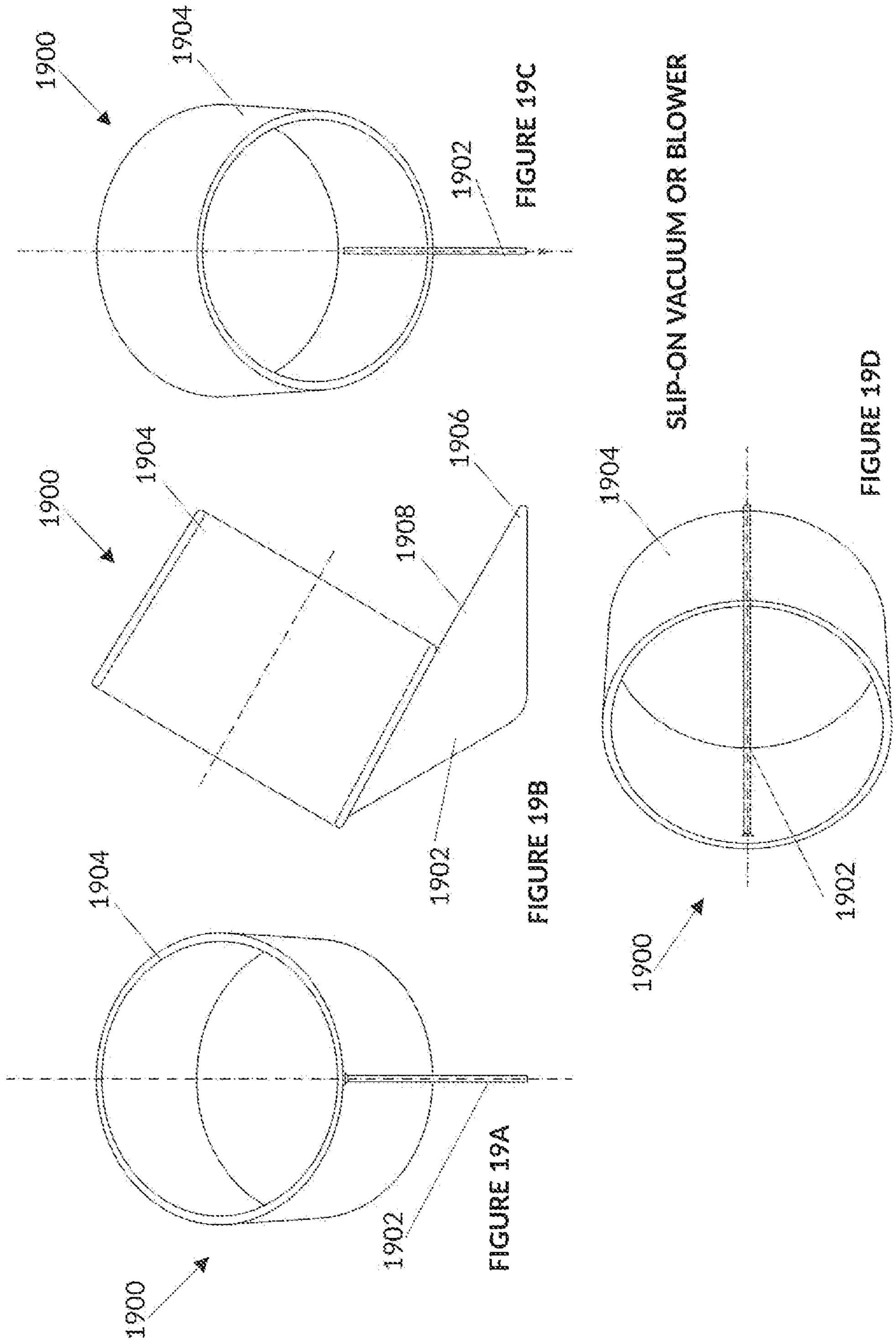
FIG. 19A is a rear view of a second preferred embodiment of tool end for use as the vacuum tool end of FIG. 16 or the blower tool end of FIG. 17.
FIG. 19B is a side view of the tool end of FIG. 19A.
FIG. 19C is a front view of the tool end of FIG. 19A.
FIG. 19D is a top view of the tool end of FIG. 19A.

Referring now generally to the Figures and particularly to FIG. 19A, FIG. 19A is a rear view of a second preferred embodiment of tool end for use as the plateless vacuum tool end 1602 of FIG. 16 or the plateless blower tool end 1702 of FIG. 17 (hereinafter, "the second plateless tube tool end 1900"). The second plateless tube tool end 1900 includes at least a second plateless tube tool end blade 1902 and a second plateless tube tool end collar 1904.

Referring now generally to the Figures and particularly to FIG. 19B, FIG. 19B is a side view of the second plateless tube tool end 1900 of FIG. 19A. The second plateless tube tool end blade 1902 shape further includes a second plateless tube tool end point 1906 and a second plateless tube tool end slope 1908. Also labeled here is the second plateless tube tool end collar 1904. The second plateless tube tool end blade 1902 is preferably shaped approximately as presented in the image, with the intention that the material 114 stuck between the deck boards 112 is caught above the second plateless tube tool end point 1906 and forced upward by the second plateless tube tool end slope 1908, out of the gap 110 as the second plateless tube tool end 1900 is propelled forward. This may either scatter the material 114 loose on top of the deck 106 above (making the material 114 easy to then remove with the second vacuum cleaner 1604 or the second leaf blower 1704) or dislodge the material 114 to fall down into a space underneath the deck 106. One skilled in the art may recognize that plenty of additional features might be experimented with to augment or optimize this basic concept. It is noted and understood that the exact dimensions of the second plateless tube tool end blade 1902 may vary, such as to provide a shape and size optimized for the deck 106 being made of wood as opposed to the deck 106 made of something else, such as a composite or plastic material. Further, additional experimentation with exact shaping and dimensions may yield optimization, such as improving performance, providing greater ease of use, providing improved durability or longevity, or providing comparable tool performance with reduced effort or material used in manufacture.

Referring now generally to the Figures and particularly to FIG. 19C, FIG. 19C is a front view of the second plateless tube tool end 1900 of FIG. 19A. Labeled here are the second plateless tube tool end blade 1902 and the second plateless tube tool end collar 1904.

Referring now generally to the Figures and particularly to FIG. 19D, FIG. 19D is a top view of the second plateless tube tool end 1900 of FIG. 19A. Labeled here are the second plateless tube tool end blade 1902 and the second plateless tube tool end collar 1904.

Figure 19E:
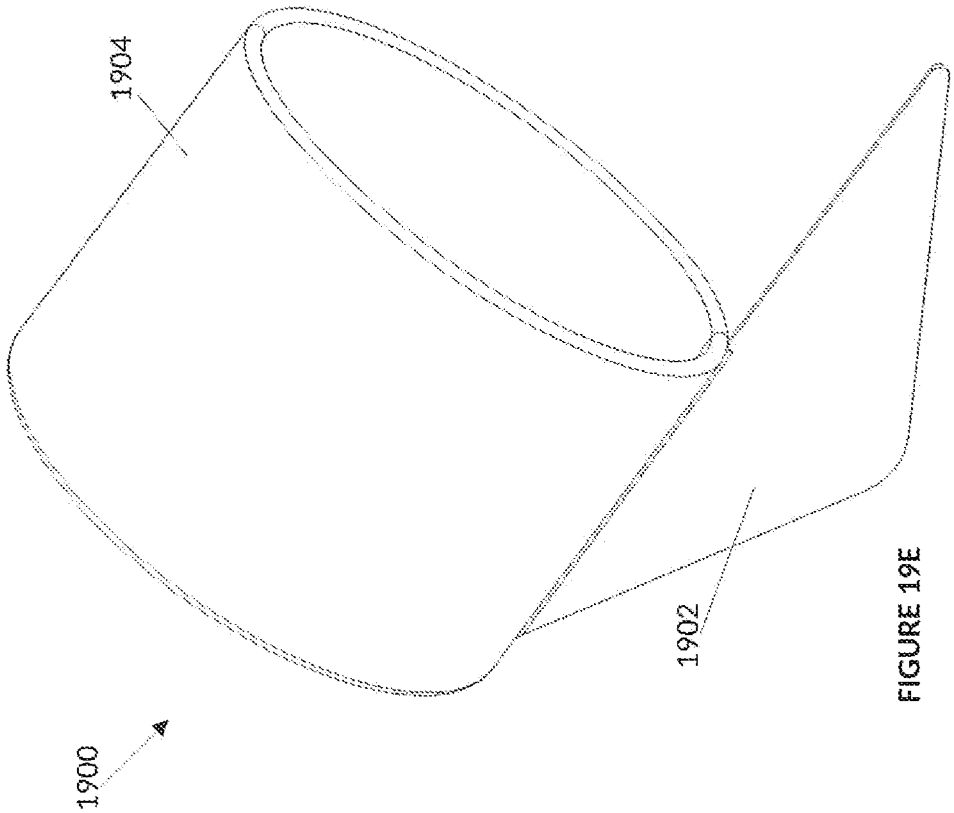
FIG. 19E is a perspective view from ahead and to the right of the tool end of FIG. 19A.

Referring now generally to the Figures and particularly to FIG. 19E, FIG. 19E is a perspective view from ahead and to the right of the third tool end of FIG. 19A. Labeled here are the second plateless tube tool end blade 1902, the second plateless tube tool end collar 1904, the second plateless tube tool end point 1906, and the second plateless tube tool end slope 1908.

Figure 19F:
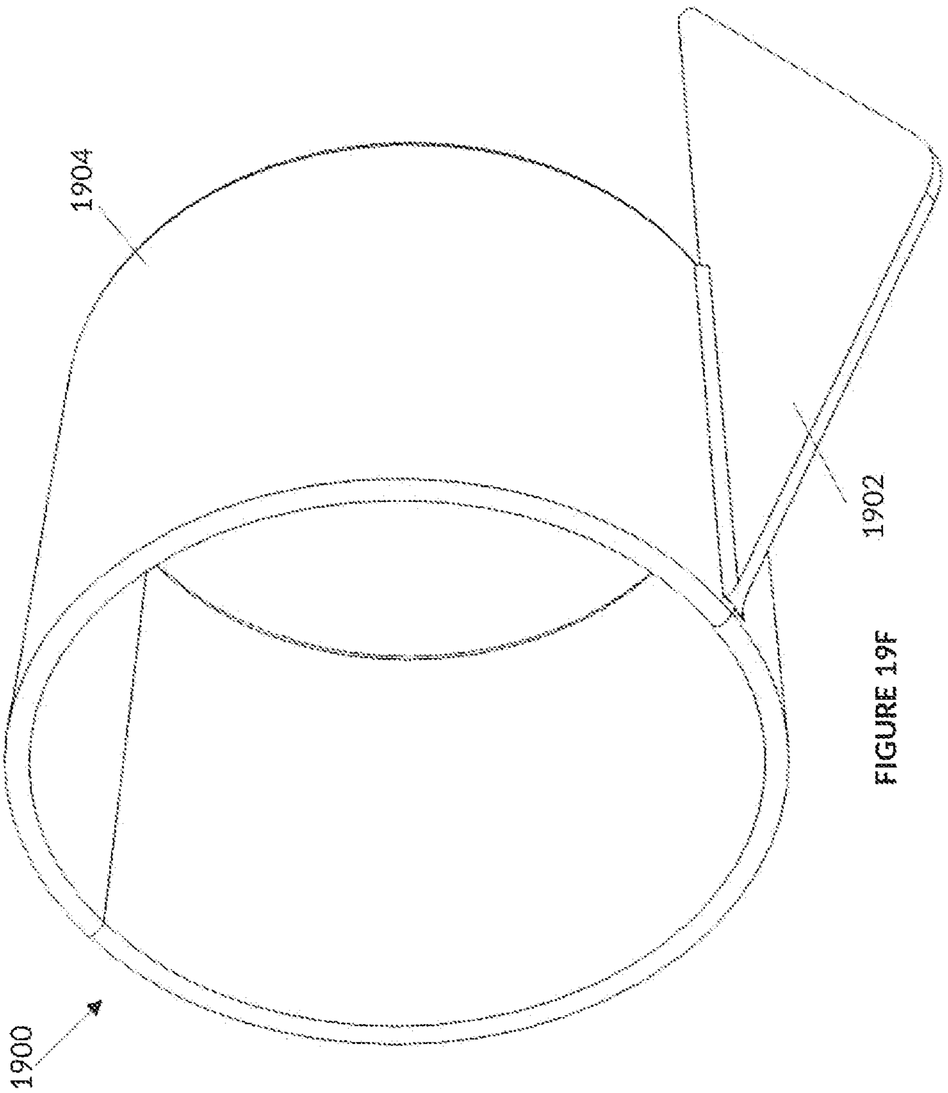
FIG. 19F is a perspective view from behind and to the right of the tool end of FIG. 19A.

Referring now generally to the Figures and particularly to FIG. 19F, FIG. 19F is a perspective view from behind and to the right of the third tool end of FIG. 19A. Labeled here are the second plateless tube tool end blade 1902, the second plateless tube tool end collar 1904, the second plateless tube tool end point 1906, and the second plateless tube tool end slope 1908.

Figures 20A, 20B, 20C, 20D:
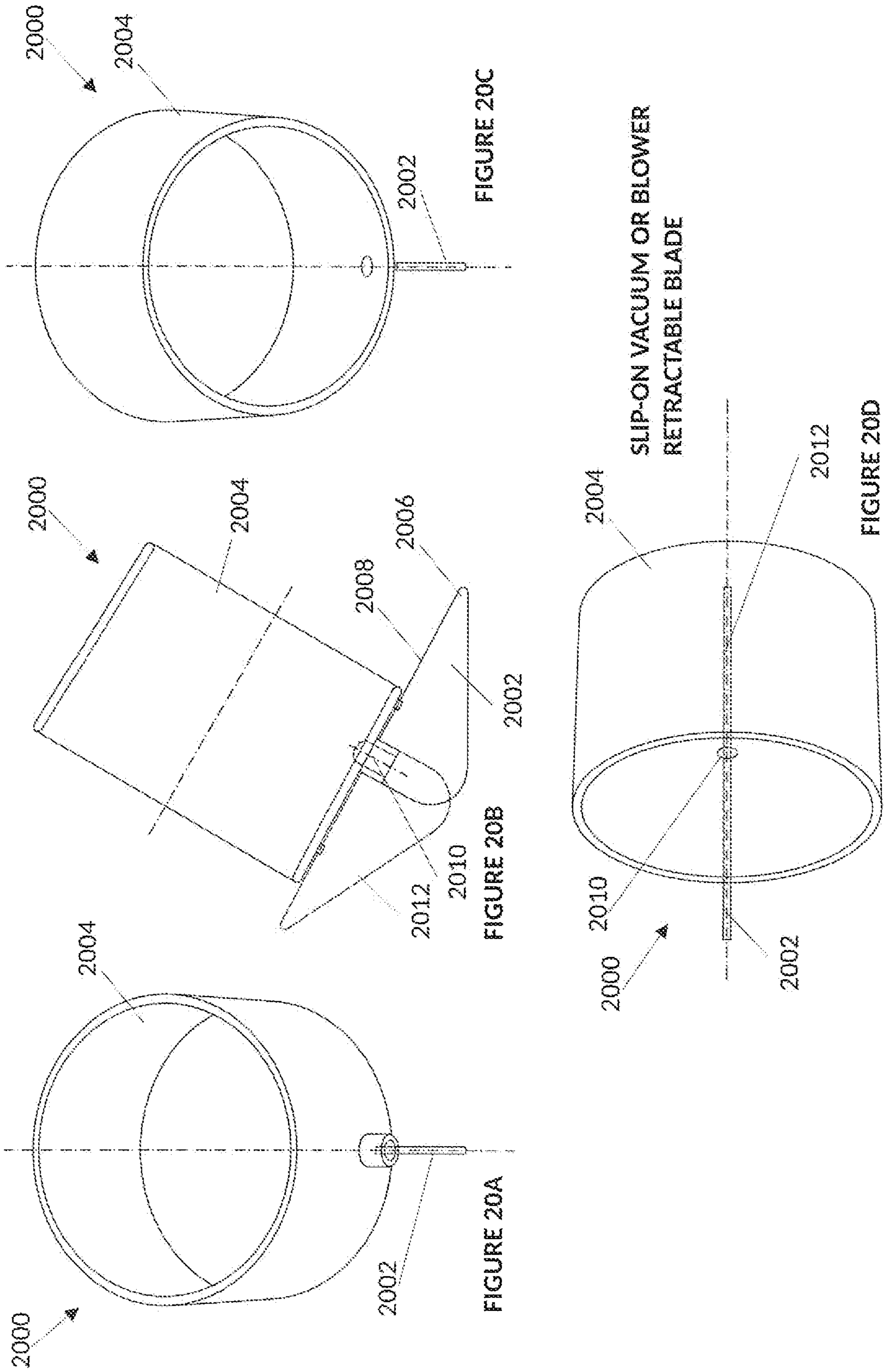
FIG. 20A is a rear view of a third preferred embodiment of tool end for use as the vacuum tool end of FIG. 16 or the blower tool end of FIG. 17.
FIG. 20B is a side view of the tool end of FIG. 20A presenting two possible positions of the blade, ‘forward’ and ‘backward’.
FIG. 20C is a front view of the tool end of FIG. 20A, with the blade rotated to a ‘forward’ position.
FIG. 20D is a top view of the tool end of FIG. 20A, presenting two possible positions of the blade, ‘forward’ and ‘backward’.

Referring now generally to the Figures and particularly to FIG. 20A, FIG. 20A is a rear view of a third preferred embodiment of tool end for use as the plateless vacuum tool end 1602 of FIG. 16 or the plateless blower tool end 1702 of FIG. 17 (hereinafter, "the third plateless tube tool end 2000"). The third plateless tube tool end 2000 includes at least a third plateless tube tool end blade 2002 and a third plateless tube tool end collar 2004. The third plateless tube tool end tool end 2000 includes a notable feature of rotatability of the third plateless tube tool end blade 2004; FIG. 20A shows the third plateless tube tool end blade 2004 in a 'forward' position parallel to the X axis.

Referring now generally to the Figures and particularly to FIG. 20B, FIG. 20B is a side view of the third plateless tube tool end 2000 of FIG. 20A presenting two possible positions of the third plateless tube tool end blade 2002, 'forward' and 'backward'. It is noted that the 'backward' position may be useful in folding up the tool for storage, and that flexibility of the orientation of the third plateless tube tool end blade 2002 in general allows for flexibility of motion for the user 108 while utilizing the tool. The third plateless tube tool end blade 2002 shape further includes a third plateless tube tool end point 2006, a third plateless tube tool end slope 2008, and a blade pivot mechanism 2010. It is noted that this drawing presents two pivot positions of the third plateless tube tool end blade 2002 simultaneously, with a 'backward' position 2012 depicted with a dotted line border. Also labeled here is the third plateless tube tool end collar 2004. The third plateless tube tool end blade 2002 is preferably shaped approximately as presented in the image, with the intention that the material 114 stuck between the deck boards 112 is caught above the third plateless tube tool end point 2006 and forced upward by the third plateless tube tool end slope 2008, out of the gap 110 as the third plateless tube tool end 2000 is propelled forward. This may either scatter the material 114 loose on top of the deck 106 above (making the material 114 easy to then remove with the second vacuum cleaner 1604 or the second leaf blower 1704) or dislodge the material 114 to fall down into a space underneath the deck 106. One skilled in the art may recognize that plenty of additional features might be experimented with to augment or optimize this basic concept. It is noted and understood that the exact dimensions of the third plateless tube tool end blade 2002 may vary, such as to provide a shape and size optimized for the deck 106 being made of wood as opposed to the deck 106 made of something else, such as a composite or plastic material. Further, additional experimentation with exact shaping and dimensions may yield optimization, such as improving performance, providing greater ease of use, providing improved durability or longevity, or providing comparable tool performance with reduced effort or material used in manufacture.

Referring now generally to the Figures and particularly to FIG. 20C, FIG. 20C is a front view of the third plateless tube tool end 2000 of FIG. 20A, with the third plateless tube tool end blade 2002 rotated to a 'forward' position. Labeled here are the third plateless tube tool end blade 2002, the third plateless tube tool end collar 2004, and the blade pivot mechanism 2010.

Referring now generally to the Figures and particularly to FIG. 20D, FIG. 20D is a top view of the third plateless tube tool end 2000 of FIG. 20A, presenting two possible positions of the third plateless tube tool end blade 2002, 'forward' and 'backward'. Labeled here are the third plateless tube tool end blade 2002 and the third plateless tube tool end collar 2004.

Figure 20E:
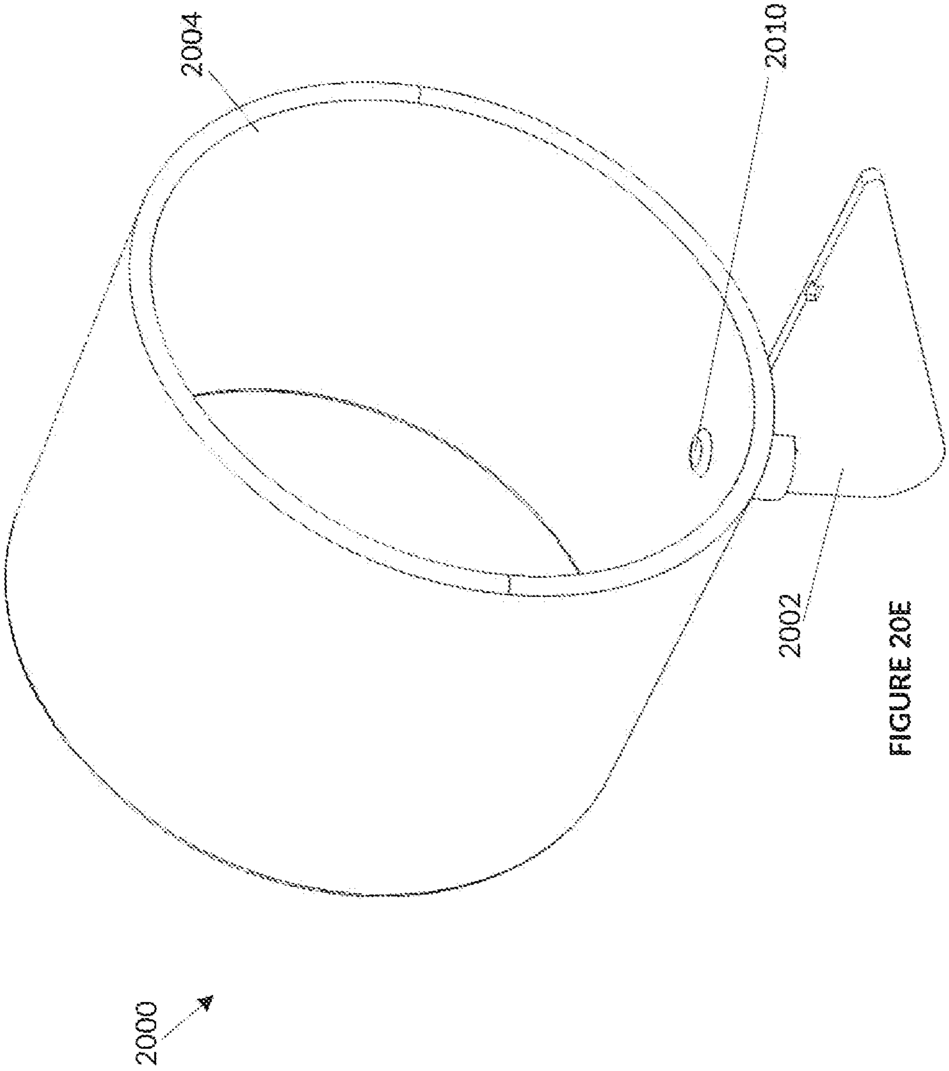
FIG. 20E is a perspective view from ahead and to the right of the tool end of FIG. 20A, with the point rotated left to a position parallel to the Y axis.

Referring now generally to the Figures and particularly to FIG. 20E, FIG. 20E is a perspective view from ahead and to the right of the fourth tool end of FIG. 20A, with the third plateless tube tool end point 2002 rotated left to a position parallel to the Y axis. Labeled here are the third plateless tube tool end blade 2002, the third plateless tube tool end collar 2004, the third plateless tube tool end point 2006, the third plateless tube tool end slope 2008, and the blade pivot mechanism 2010. It is noted that this blade position might be useful to the user 108 preferring to sweep 'side-to-side' instead of 'back and forth', as pivoting action of the third plateless tube tool end blade 2002 in this way permits keeping the third plateless tube tool end blade 2002 in line with the grain of the deck 106 while allowing other elements to pivot in position relative to the third plateless tube tool end blade 2002.

Figure 20F:
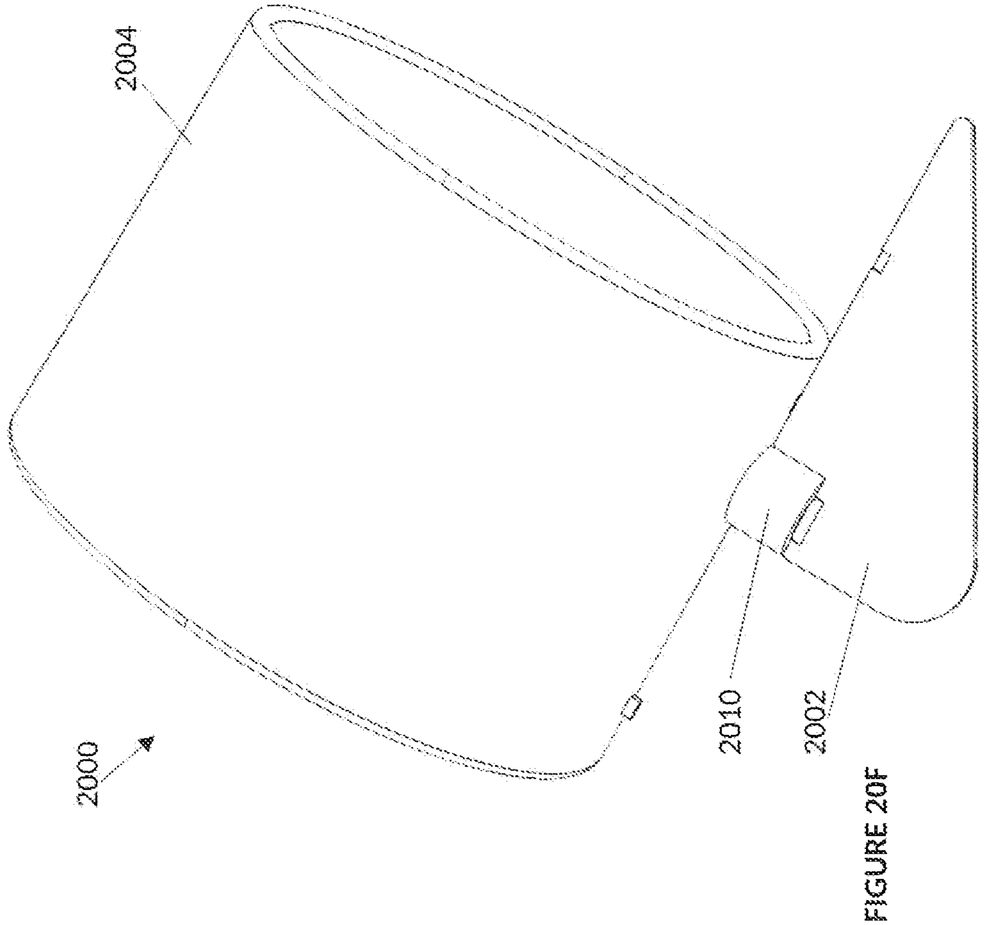
FIG. 20F is a second perspective view from ahead and to the right of the tool end of FIG. 20A, with the blade positioned parallel to the X axis.

Referring now generally to the Figures and particularly to FIG. 20F, FIG. 20F is a second perspective view from ahead and to the right of the third plateless tube tool end 2000 of FIG. 20A, with the third plateless tube tool end blade 2002 positioned parallel to the X axis. Labeled here are the third plateless tube tool end blade 2002, the third plateless tube tool end collar 2004, the third plateless tube tool end point 2006, and the third plateless tube tool end slope 2008.

Figure 20G:
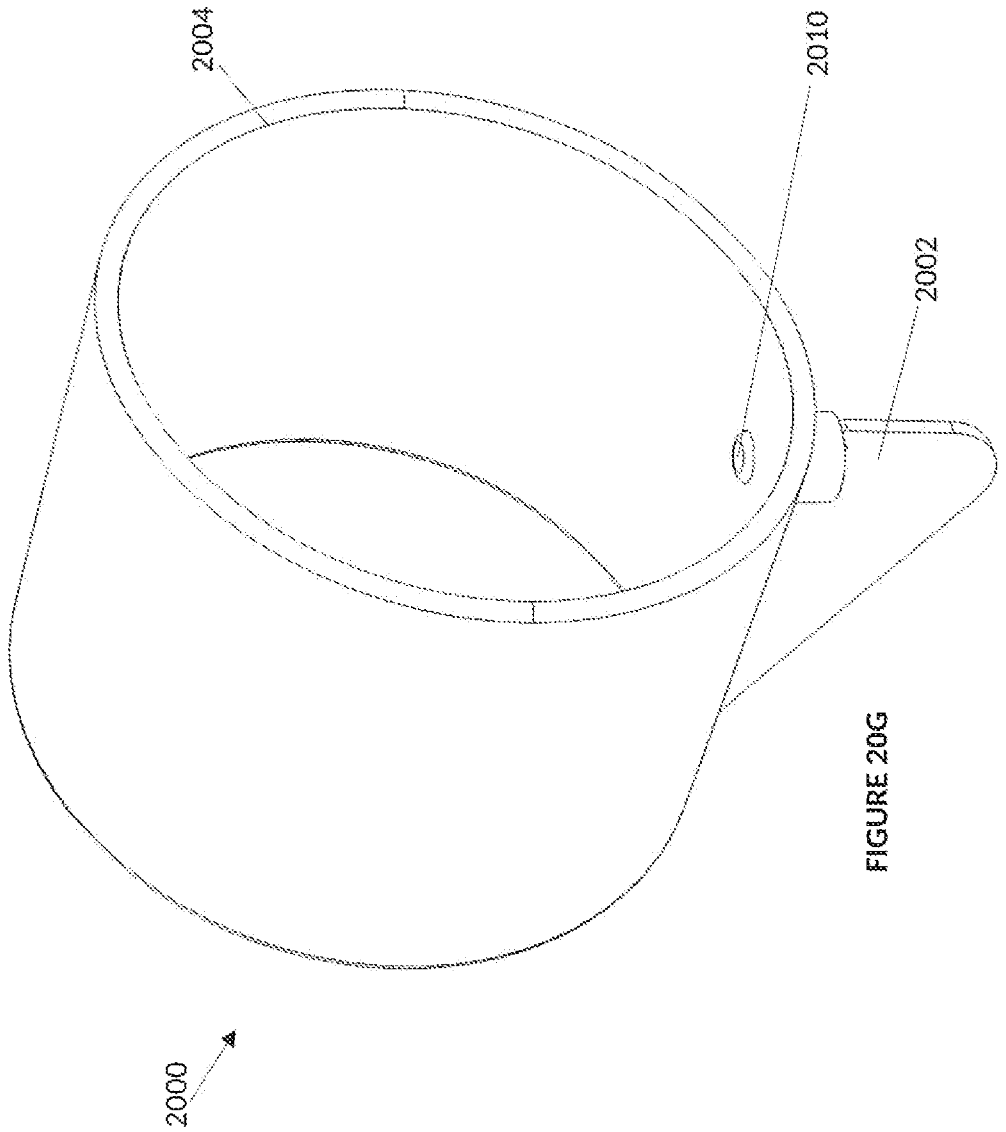
FIG. 20G is a third perspective view from ahead and to the right of the tool end of FIG. 20A, with the blade pivoted to a ‘backward’ position parallel to the X axis but with the point pointing backward.

Referring now generally to the Figures and particularly to FIG. 20G, FIG. 20G is a third perspective view from ahead and to the right of the fourth tool end of FIG. 20A, with the third plateless tube tool end blade 2002 pivoted to a 'backward' position parallel to the X axis but with the third plateless tube tool end point 2006 pointing backward. Labeled here are the third plateless tube tool end blade 2002, the third plateless tube tool end collar 2004, and the blade pivot mechanism 2010.

Figure 20H:
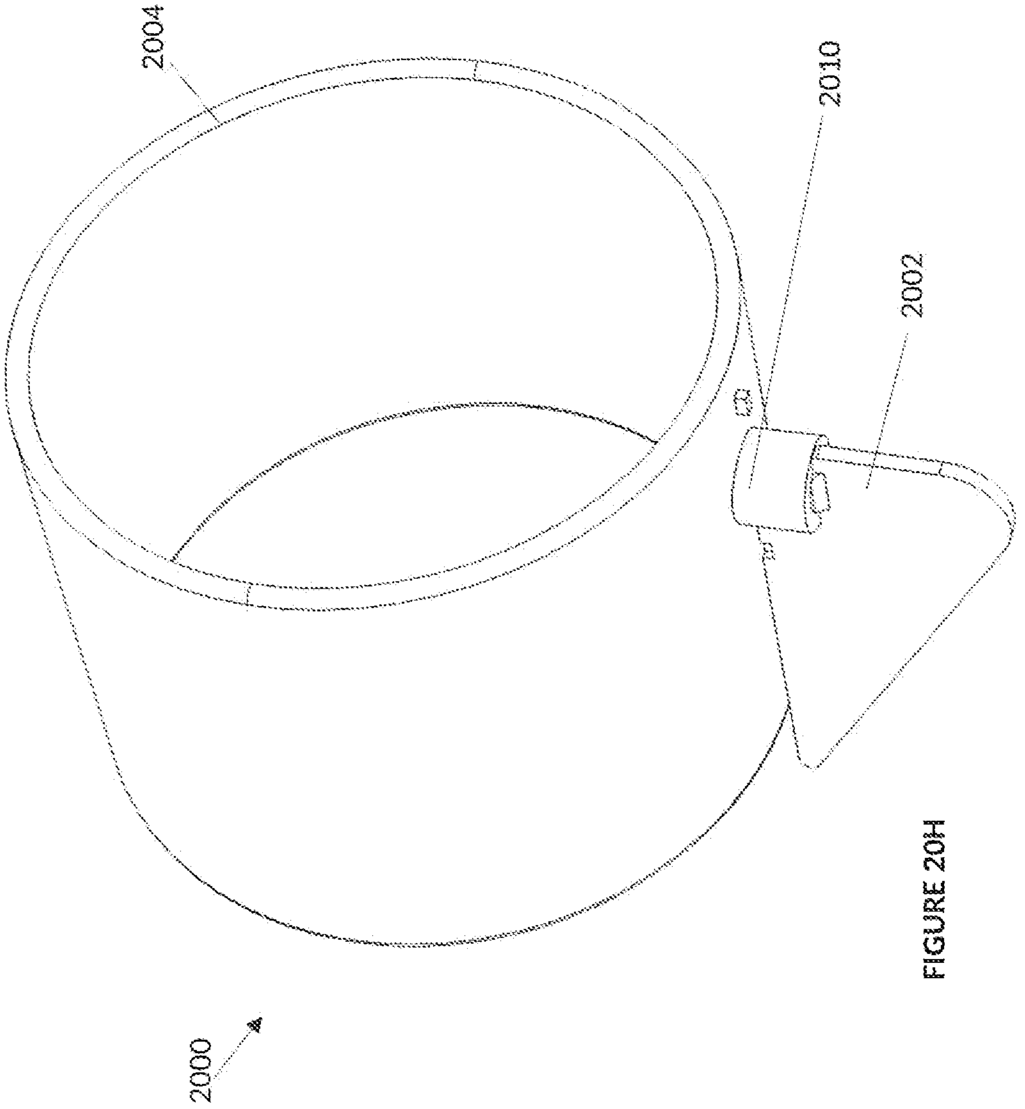
FIG. 20H is a perspective view from ahead, to the right, and further below of the tool end of FIG. 20A.

Referring now generally to the Figures and particularly to FIG. 20H, FIG. 20H is a perspective view from ahead, to the right, and further below of the fourth tool end of FIG. 20A. Labeled here are the third plateless tube tool end blade 2002, the third plateless tube tool end collar 2004, the third plateless tube tool end point 2006, the third plateless tube tool end slope 2008, and the blade pivot mechanism 2010.

Figures 21A, 21B, 21C, 21D:
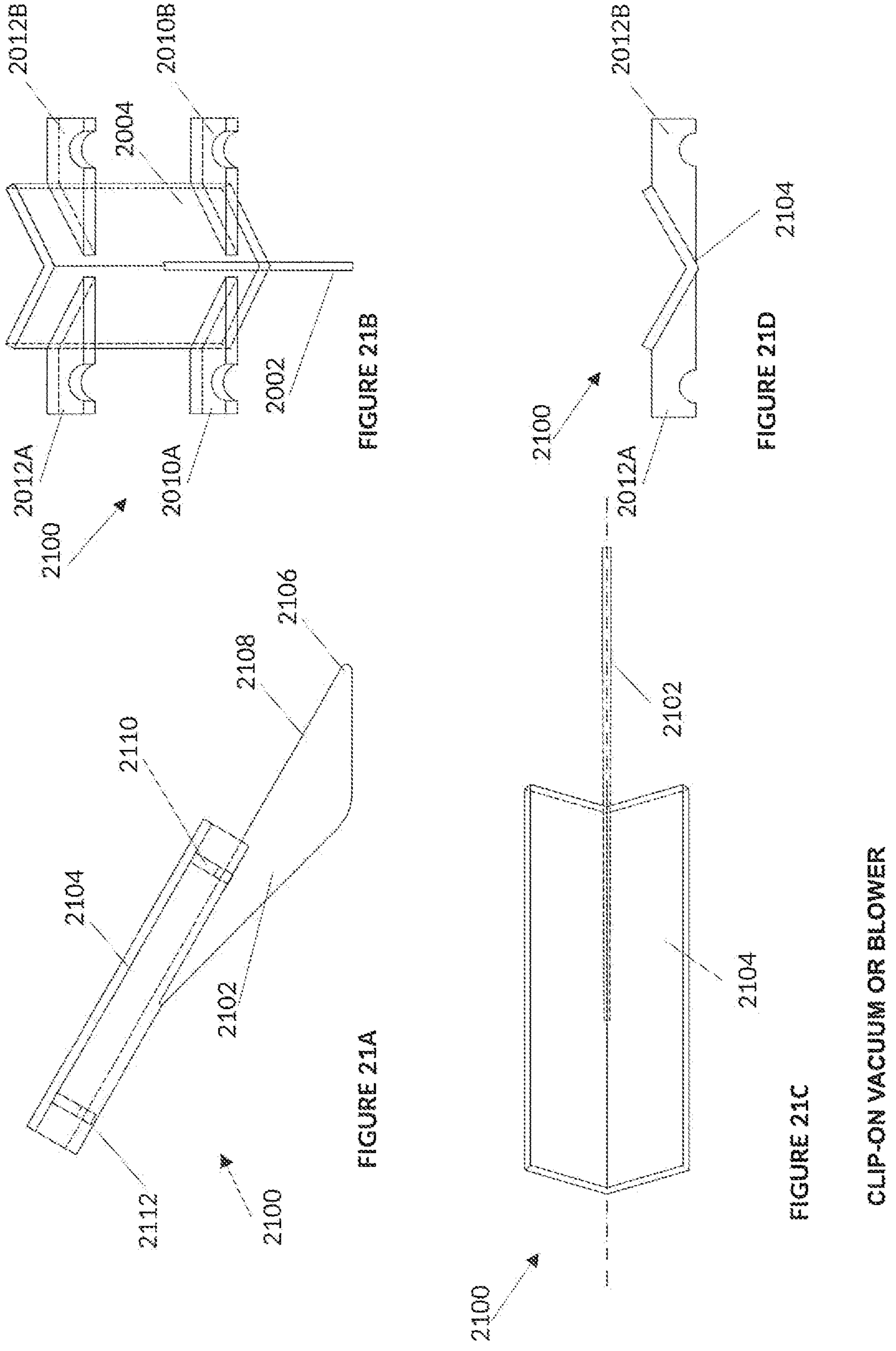
FIG. 21A is a side view of a fourth preferred embodiment of tool end for use as the vacuum tool end of FIG. 16 or the blower tool end of FIG. 17.
FIG. 21B is a rear view of the tool end of FIG. 21A.
FIG. 21C is a top view of the tool end of FIG. 21A.
FIG. 21D is a front view of the tool end of FIG. 21A.

Referring now generally to the Figures and particularly to FIG. 21A, FIG. 21A is a side view of a fourth preferred embodiment of tool end for use as the plateless vacuum tool end 1602 of FIG. 16 or the plateless blower tool end 1702 of FIG. 17 (hereinafter, "the fourth plateless tube tool end 2100"). The fourth plateless tube tool end 2100 includes at least a fourth plateless tube tool end blade 2102 and a fourth plateless tube tool end collar 2104. The fourth plateless tube tool end blade 2102 shape further includes a fourth plateless tube tool end point 2106 and a fourth plateless tube tool end slope 2108. The fourth plateless tube tool end blade 2102 is preferably shaped approximately as presented in the image, with the intention that the material 114 stuck between the deck boards 112 is caught above the fourth plateless tube tool end point 2106 and forced upward by the fourth plateless tube tool end slope 2108, out of the gap 110 as the fourth plateless tube tool end 2100 is propelled forward. This may either scatter the material 114 loose on top of the deck 106 above (making the material 114 easy to then remove with the second vacuum cleaner 1604 or the second leaf blower 1704) or dislodge the material 114 to fall down into a space underneath the deck 106. One skilled in the art may recognize that plenty of additional features might be experimented with to augment or optimize this basic concept. It is noted and understood that the exact dimensions of the fourth plateless tube tool end blade 2102 may vary, such as to provide a shape and size optimized for the deck 106 being made of wood as opposed to the deck 106 made of something else, such as a composite or plastic material. Further, additional experimentation with exact shaping and dimensions may yield optimization, such as improving performance, providing greater ease of use, providing improved durability or longevity, or providing comparable tool performance with reduced effort or material used in manufacture.

Referring now generally to the Figures and particularly to FIG. 21B, FIG. 21B is a rear view of the fourth plateless tube tool end 2100 of FIG. 21A. Labeled here are the fourth plateless tube tool end blade 2102 and the fourth plateless tube tool end collar 2104.

Referring now generally to the Figures and particularly to FIG. 21C, FIG. 21C is a top view of the fourth plateless tube tool end 2100 of FIG. 21A. Labeled here are the fourth plateless tube tool end blade 2102 and the fourth plateless tube tool end collar 2104.

Referring now generally to the Figures and particularly to FIG. 21D, FIG. 21D is a front view of the fourth plateless tube tool end 2100 of FIG. 21A. Labeled here are the fourth plateless tube tool end blade 2102 and the fourth plateless tube tool end collar 2104.

Figure 21E:
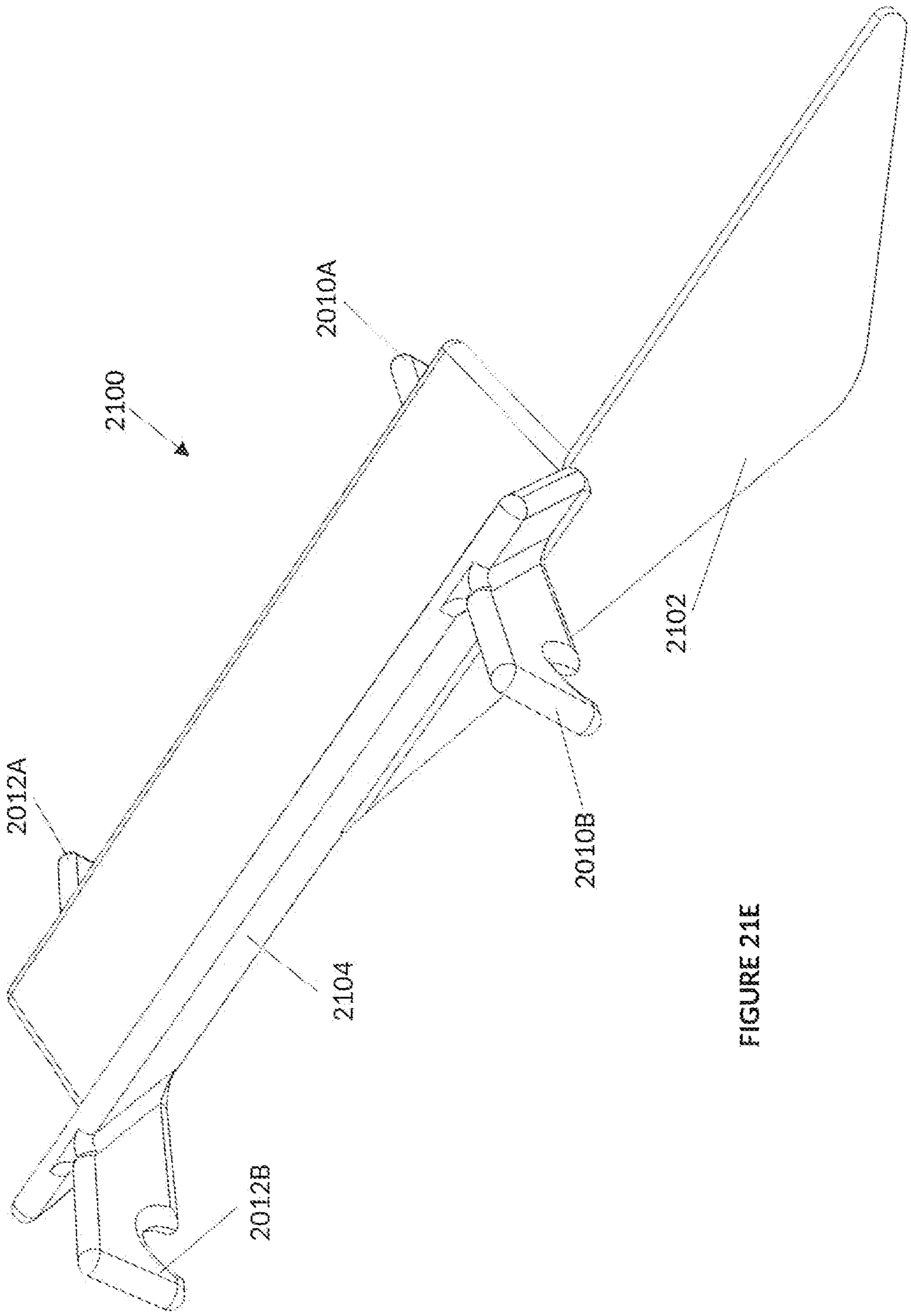
FIG. 21E is a perspective view from ahead and to the right of the tool end of FIG. 21A.

Referring now generally to the Figures and particularly to FIG. 21E, FIG. 21E is a perspective view from ahead and to the right of the third tool end of FIG. 21A. Labeled here are the fourth plateless tube tool end blade 2102, the fourth plateless tube tool end collar 2104, the fourth plateless tube tool end point 2106, and the fourth plateless tube tool end slope 2108.

Figure 21F:
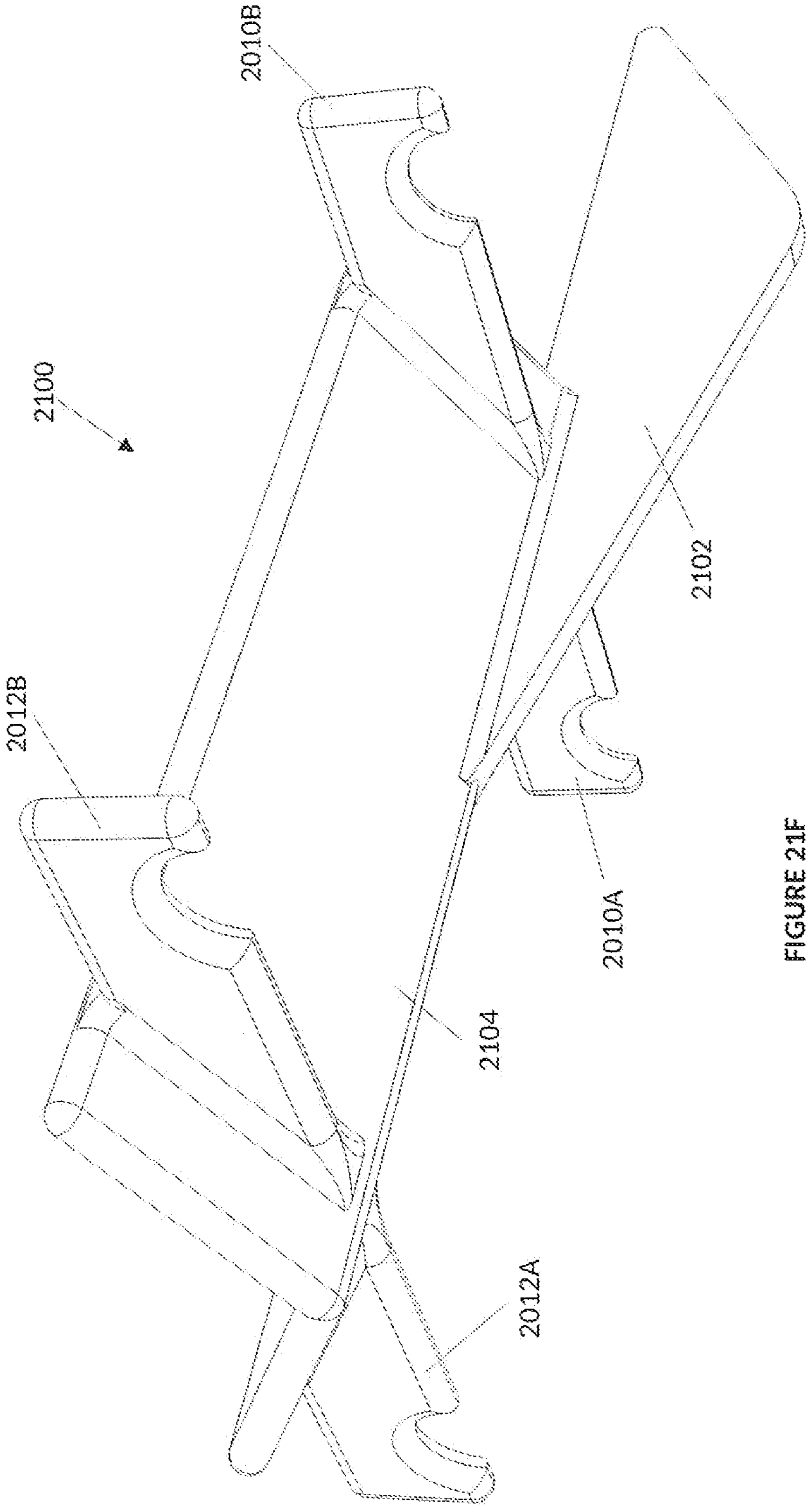
FIG. 21F is a second perspective view from behind and to the right of the tool end of FIG. 21A.

Referring now generally to the Figures and particularly to FIG. 21F, FIG. 21F is a perspective view from behind and to the right of the third tool end of FIG. 21A. Labeled here are the fourth plateless tube tool end blade 2102, the fourth plateless tube tool end collar 2104, the fourth plateless tube tool end point 2106, and the fourth plateless tube tool end slope 2108.

While selected embodiments have been chosen to illustrate the invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment, it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

I claim:

1. A monolithic device adapted for coupling with a cylindrical element, the device configured for dislodging detritus from a linear volume formed between adjacent decking boards, the device comprising:

an attachment feature adapted for fitting around the cylindrical element, the attachment feature is a collar having a front edge and a cylindrical exterior surface;

a blade, the blade comprising a coupled upper edge and a slope, a length of the coupled upper edge non-rotatably attached to only one side of the exterior surface of the attachment feature and extending along a substantial length of the exterior surface of the attachment feature parallel to the cylindrical element, and the slope extending directly from an end of the coupled upper edge in a same linear direction continuing forward from the attachment feature front edge to an end point, wherein the coupled upper edge and the slope are positioned entirely below the attachment feature; and the blade further comprising an opposite side which is more distal to the attachment feature than the slope is, the opposite side converging toward the slope of the blade to form the end point of the blade, wherein the end point of the blade is positioned ahead of and below the front edge of the attachment feature.

2. The device of claim 1, wherein the cylindrical element is an elongate handle.

3. The device of claim 1, wherein an interior section of the attachment feature is tapped to engage with a threaded end of the cylindrical element.

4. The device of claim 1, wherein an interior section of the attachment feature forms a friction fit with the cylindrical element.

5. The device of claim 1, wherein the cylindrical element comprises a handle.

6. The device of claim 1, wherein the cylindrical element is an air moving tube.

7. The device of claim 6, wherein the air moving tube is attached to a vacuum suction source.

8. The device of claim 6, wherein the air moving tube is attached to an air blowing source.

9. The device of claim 1, wherein the slope of the blade extends ahead of the front edge of the attachment feature by at least one and three quarter inches.

10. The device of claim 1, wherein the slope of the blade extends ahead of the front edge of the attachment feature by more than two inches.

11. The device of claim 1, wherein the blade is planar and tapers in width from front to back starting with a maximum width at the slope of the blade and tapering to a minimum width at a rearmost part of the blade distal from the end point of the blade.

12. The device of claim 1, wherein the attached blade section is linear.

13. The device of claim 1, wherein the slope is linear.

14. The device of claim 12, wherein the slope is linear.

15. A device adapted for coupling with an elongate element, the device comprising:

an attachment feature adapted for fitting around the elongate element, the attachment feature comprising a V shape extending along a center axis, the attachment feature having a front edge and an exterior surface; and a blade coupled to the exterior surface of the attachment feature, the blade extending downward from the exterior surface of the attachment feature perpendicular to the center axis and also extending ahead of the attachment feature, the blade having a slope of the blade which is linear and oriented parallel to the center axis of the attachment feature, an opposite side of the blade and converging toward the slope of the blade to form a point of the blade.

16. The device of claim 15, wherein the elongate element is an air moving tube.

17. The device of claim 16, wherein the air moving tube is coupled to a vacuum suction source.

18. The device of claim 15, wherein the attachment feature further comprises a strapping element, the strapping element adapted to press the elongate element against an interior surface of the attachment feature.

19. The device of claim 18, wherein the strapping element is adapted to detachably couple the elongate element with the attachment feature.

20. The device of claim 16, wherein the air moving tube is coupled to an air blowing source.

21. The device of claim 15, wherein the blade is detachably coupled to the attachment feature.

22. The device of claim 15, wherein the blade is detached from the attachment feature and a brush is detachably coupled to the attachment feature.

* * * * *